(12) United States Patent
Coppens et al.

(10) Patent No.: US 11,377,785 B2
(45) Date of Patent: Jul. 5, 2022

(54) FLUORINE-FREE FIBROUS TREATING COMPOSITIONS, TREATED SUBSTRATES, AND TREATING METHODS

(71) Applicant: 3M INNOVATIVE PROPERTIES COMPANY, St. Paul, MN (US)

(72) Inventors: Dirk M. Coppens, Beveren (BE); Rudolf J. Dams, Antwerp (BE)

(73) Assignee: 3M Innovative Properties Company, St Paul, MN (US)

( * ) Notice: Subject to any disclaimer, the term of this patent is extended or adjusted under 35 U.S.C. 154(b) by 0 days.

(21) Appl. No.: 16/323,736

(22) PCT Filed: Aug. 8, 2017

(86) PCT No.: PCT/US2017/045876
§ 371 (c)(1),
(2) Date: Feb. 6, 2019

(87) PCT Pub. No.: WO2018/031534
PCT Pub. Date: Feb. 15, 2018

(65) Prior Publication Data
US 2019/0177908 A1 Jun. 13, 2019

Related U.S. Application Data

(60) Provisional application No. 62/374,409, filed on Aug. 12, 2016.

(51) Int. Cl.
| | | |
|---|---|---|
| *D06M 15/263* | (2006.01) |
| *D21H 19/20* | (2006.01) |
| *C08F 220/18* | (2006.01) |
| *C08G 18/62* | (2006.01) |
| *C08G 18/80* | (2006.01) |
| *C09D 133/14* | (2006.01) |
| *D06M 15/267* | (2006.01) |
| *D06M 15/59* | (2006.01) |
| *C08G 18/28* | (2006.01) |
| *D06M 15/564* | (2006.01) |
| *C08G 18/67* | (2006.01) |
| *C09D 175/04* | (2006.01) |
| *C08F 220/00* | (2006.01) |
| *C08G 18/76* | (2006.01) |
| *C08L 75/04* | (2006.01) |
| *C08G 18/71* | (2006.01) |
| *C08G 18/24* | (2006.01) |
| *C09D 133/00* | (2006.01) |
| *C08G 18/81* | (2006.01) |
| *C09D 133/08* | (2006.01) |
| *C09D 133/10* | (2006.01) |
| *C09D 175/14* | (2006.01) |
| *C09D 179/08* | (2006.01) |
| *D06M 15/572* | (2006.01) |
| *D21H 19/12* | (2006.01) |
| *D21H 19/30* | (2006.01) |
| *D21H 21/16* | (2006.01) |
| *D06M 101/30* | (2006.01) |
| *D06M 101/34* | (2006.01) |

(52) U.S. Cl.
CPC ......... *D06M 15/263* (2013.01); *C08F 220/00* (2013.01); *C08G 18/24* (2013.01); *C08G 18/288* (2013.01); *C08G 18/2825* (2013.01); *C08G 18/62* (2013.01); *C08G 18/672* (2013.01); *C08G 18/71* (2013.01); *C08G 18/7664* (2013.01); *C08G 18/8077* (2013.01); *C08G 18/8116* (2013.01); *C08L 75/04* (2013.01); *C09D 133/00* (2013.01); *C09D 133/08* (2013.01); *C09D 133/10* (2013.01); *C09D 175/04* (2013.01); *C09D 175/14* (2013.01); *C09D 179/08* (2013.01); *D06M 15/267* (2013.01); *D06M 15/564* (2013.01); *D06M 15/572* (2013.01); *D06M 15/59* (2013.01); *D21H 19/12* (2013.01); *D21H 19/20* (2013.01); *D21H 19/30* (2013.01); *D21H 21/16* (2013.01); *D06M 2101/30* (2013.01); *D06M 2101/34* (2013.01); *D06M 2200/12* (2013.01)

(58) Field of Classification Search
CPC ..... C08F 220/34; C08F 220/00; C09D 133/14
See application file for complete search history.

(56) References Cited

U.S. PATENT DOCUMENTS

| | | |
|---|---|---|
| 2,941,988 A | 6/1960 | Wolf |
| 3,862,989 A | 1/1975 | Hansen |
| 3,896,251 A | 7/1975 | Landucci |
| 4,495,243 A | 1/1985 | Kishi |
| 4,692,503 A | 9/1987 | Das |

(Continued)

FOREIGN PATENT DOCUMENTS

| | | |
|---|---|---|
| DE | 19858817 | 6/2000 |
| EP | 0 448 399 | 9/1991 |

(Continued)

OTHER PUBLICATIONS

Computer-generated English-language translation of JP-2010132844-A.*

(Continued)

*Primary Examiner* — Vu A Nguyen

(57) ABSTRACT

A fluorine-free treating composition that includes Component A and at least one of Components B and C, wherein: Component (A) includes one or more polymeric compounds derived from the polymerization of at least one (meth) acrylate monomer comprising at least one hydrocarbon group having from 1 to 60 carbon atoms; Component (B) includes one or more compounds derived from reaction, in one or more steps, of components comprising: (i) at least one isocyanate-reactive oligomer comprising 2 to 20 repeating units, or an alcohol having at least one linear or branched hydrocarbon group having from 16 to 40 carbon atoms and optionally one or more ester groups; (ii) at least one polyisocyanate; (iii) optionally at least one additional isocyanate-reactive compound; and (iv) optionally at least one isocyanate blocking agent; and Component (C) includes one or more polycarbodiimide compounds.

10 Claims, No Drawings

(56) References Cited

U.S. PATENT DOCUMENTS

| | | | |
|---|---|---|---|
| 5,061,756 A | 10/1991 | Hassel | |
| 5,225,480 A | 7/1993 | Tseng | |
| 5,276,175 A | 1/1994 | Dams | |
| 5,350,631 A | 9/1994 | Tseng | |
| 5,604,268 A | 2/1997 | Randen | |
| 7,189,772 B2* | 3/2007 | Bauer | C08G 18/283 |
| | | | 524/366 |
| 7,354,458 B2 | 4/2008 | Sandner | |
| 7,750,093 B2 | 7/2010 | Elsbernd | |
| 8,440,779 B2 | 5/2013 | Audenaert | |
| 8,703,894 B2 | 4/2014 | Duschek | |
| 8,742,022 B2 | 6/2014 | Pokorny | |
| 8,969,492 B2* | 3/2015 | Fuchs | C08F 220/18 |
| | | | 526/89 |
| 9,434,844 B2* | 9/2016 | Walls | C09D 5/16 |
| 2003/0162860 A1* | 8/2003 | Ohno | C08G 18/8022 |
| | | | 522/173 |
| 2005/0085573 A1 | 4/2005 | Sandner | |
| 2007/0117948 A1 | 5/2007 | Loehden | |
| 2007/0293625 A1* | 12/2007 | Sauer | C08G 18/7657 |
| | | | 524/589 |
| 2010/0190397 A1 | 7/2010 | Duschek | |
| 2014/0295724 A1 | 10/2014 | Sworen | |
| 2015/0119497 A1 | 4/2015 | Matsui et al. | |
| 2017/0022657 A1 | 1/2017 | Sielemann | |

FOREIGN PATENT DOCUMENTS

| | | | | |
|---|---|---|---|---|
| JP | 11-060667 | 3/1999 | | |
| JP | 2002-069854 | 8/2002 | | |
| JP | 2003-277636 | 10/2003 | | |
| JP | 2003-301138 | 10/2003 | | |
| JP | 2010-132844 | 6/2010 | | |
| JP | 2010132844 A * | 6/2010 | | C08G 18/62 |
| JP | 2012-025820 | 2/2012 | | |
| JP | 2012-111791 | 6/2012 | | |
| JP | 2015-040365 | 3/2015 | | |
| JP | 2017-218713 | 12/2017 | | |
| JP | 2017-222967 | 12/2017 | | |
| WO | WO 2013-162704 | 10/2013 | | |
| WO | WO 2015-178471 | 11/2015 | | |
| WO | WO 2016-130352 | 8/2016 | | |
| WO | WO 2016-130415 | 8/2016 | | |
| WO | WO 2016-130503 | 8/2016 | | |
| WO | WO 2016-146437 | 9/2016 | | |

OTHER PUBLICATIONS

Kissa, Fluorinated Surfactantsand Repellents, 516-551 (2001).
Noll, Chemistry and Technology of Silicones, 585-595 (2012).
Organic Coatings and Applied Polymer Science Proceedings, vol. 48, Division of Organic Coatings and Plastics Chemistry at the American Chemical Society, 185th National Meeting, Seattle, Washington, Mar. 1983, pp. 998-1002.
Radhakrishnan, "Synthesis and Characterization of New Urethane-Acrylic Polymers," Angewandte Makromoleculare Chemie, vol. 187, 1991, pp. 1-10.
International Search Report for PCT International Application No. PCT/US2017/045876, dated Nov. 21, 2017, 5 pages.

* cited by examiner

FLUORINE-FREE FIBROUS TREATING COMPOSITIONS, TREATED SUBSTRATES, AND TREATING METHODS

CROSS-REFERENCE TO RELATED APPLICATIONS

The present application claims the benefit of U.S. Patent Application Ser. No. 62/374,409, filed Aug. 12, 2016, which is incorporated herein by reference.

BACKGROUND

Compositions for treating fibrous substrates to enhance the water-repellency of the substrates are known and described in the literature, for example, in "Fluorinated Surfactants and Repellents," E. Kissa, Surfactant Science Series, vol. 97, Marcel Dekker, New York, Chapter 12, p. 516-551, or in "Chemistry and Technology of Silicones," by W. Noll, Academic Press, New York, Chapter 10, p. 585-595. Substrates that are treated with such fluorinated repellents typically have high durable water repellency properties. Fluorinated treating agents, however, suffer from some disadvantages, including their production price, and they may be subject to some potential environmental concerns. In recent years, fluorine-free alternative repellents have received increased interest. Such repellents may provide good initial water repellency to fibrous substrates, but typically durability is not satisfactory. Accordingly, there is a continual need for compositions that provide high water repellency, in particular high initial water repellency, and in certain situations, high water-repellent durability, especially compositions that are fluorine-free.

SUMMARY OF THE DISCLOSURE

The present disclosure provides fluorine-free fibrous treating compositions, treated fibrous substrates, and treating methods.

In one embodiment, the present disclosure provides a fluorine-free treating composition that includes:

Component (A) including one or more polymeric compounds derived from the polymerization of at least one (meth)acrylate monomer comprising at least one hydrocarbon group having from 1 to 60 carbon atoms; and at least one of Component (B) and Component (C), wherein:

Component (B) includes one or more compounds derived from reaction, in one or more steps, of components comprising:
(i) at least one isocyanate-reactive oligomer comprising 2 to 20 repeating units, or an alcohol having at least one linear or branched hydrocarbon group having from 16 to 40 carbon atoms and optionally one or more ester groups;
(ii) at least one polyisocyanate;
(iii) optionally at least one additional isocyanate-reactive compound; and
(iv) optionally at least one isocyanate blocking agent;
wherein the isocyanate-reactive oligomer is made by the radical-initiated reaction of at least one (meth)acrylate monomer in the presence of a mercaptan, wherein the at least one (meth)acrylate monomer comprises at least one hydrocarbon group having from 1 to 60 carbon atoms; and Component (C) includes one or more polycarbodiimide compounds.

In another embodiment the present disclosure relates to a method of treating a fibrous substrate, wherein the method includes applying a fluorine-free treating composition in an amount sufficient to make the fibrous substrate water repellent (and in certain embodiments, durably water repellent).

In such compositions and methods, the treating composition includes Component A and at least one of Components B and C. That is, in certain compositions, treating compositions include Component A and Component B. In other compositions, treating compositions include Component A and Component C. In other compositions, treating compositions include Components A, B, and C. The present disclosure also provides a fibrous substrate treated with such composition. In certain embodiments, the fibrous substrate is selected from the group of textile, leather, carpet, paper, and fabrics.

It has surprisingly been found that fibrous substrates treated with compositions comprising Component A and at least one of Components B and C have high initial water repellency properties, more particularly, high water repellency properties under dynamic circumstances as can be seen in the Spray Rating and Bundesmann Test results elaborated in the Example Section. Surprisingly high durable repellency was obtained as indicated by good water repellency properties even after repeated launderings. Surprisingly the remarkable repellent properties were obtained after tumble drying, and without the need for ironing. It is of further advantage that these properties can be obtained with low treatment levels, thus not affecting the breathability and/or soft hand of the treated fibrous substrates.

Herein, a "fluorine-free" treating composition means that a treating composition includes less than 1 weight percent (1 wt-%) fluorine in a treating composition based on solids, whether in a concentrate or ready-to-use treating composition. In certain embodiments, a "fluorine-free" treating composition means that a treating composition includes less than 0.5 wt %, or less than 0.1 wt %, or less than 0.01 wt-%, fluorine. The fluorine may be in the form of organic or inorganic fluorine-containing compounds.

The term "oligomer" includes compounds with at least 2 repeating units and up to 20 repeating units. According to a particular embodiment, the oligomer has 3 to 15 repeating units. According to another embodiment, the oligomer has 4 to 15 repeating units. In certain embodiments, an "oligomer" has a weight average molecular weight of up to 20,000 Daltons.

The term "polymeric compound" includes compounds with greater than 20 repeating units. In certain embodiments, a "polymeric compound" has a weight average molecular weight of greater than 20,000 Daltons.

The term "residue" means that part of the original organic molecule remaining after reaction.

The term "hydrocarbon" refers to any substantially fluorine-free organic group that contains hydrogen and carbon. Such hydrocarbon groups may be cyclic (including aromatic), linear, or branched. Suitable hydrocarbon groups include alkyl groups, alkylene groups, arylene groups, and the like. Unless otherwise indicated, hydrocarbon groups typically contain from 1 to 60 carbon atoms. In some embodiments, hydrocarbon groups contain 4 to 60 carbon atoms, 12 to 60 carbon atoms, 12 to 50 carbon atoms, 12 to 40 carbon atoms, or 16 to 40 carbon atoms. In some embodiments, hydrocarbon groups contain 1 to 30 carbon atoms, 1 to 20 carbon atoms, 1 to 10 carbon atoms, 1 to 6 carbon atoms, 1 to 4 carbon atoms, or 1 to 3 carbon atoms.

The term "alkyl" refers to a monovalent group that is a residue of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 60 carbon atoms. In some embodiments, the alkyl groups contain 1 to 30 carbon atoms, 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, octadecyl (also referred to as stearyl), docosanyl (also referred to as behenyl), adamantyl, norbornyl, and the like.

The term "alkylene" refers to a divalent group that is a residue of an alkane and includes groups that are linear, branched, cyclic, bicyclic, or a combination thereof. Unless otherwise indicated, the alkylene group typically has 1 to 60 carbon atoms. In some embodiments, the alkylene group has 1 to 30 carbon atoms, 1 to 20 carbon atoms, 1 to 10 carbon atoms, 2 to 10 carbon atoms, 1 to 6 carbon atoms, or 1 to 4 carbon atoms. Examples of "alkylene" groups include methylene, ethylene, 1,3-propylene, 1,2-propylene, 1,4-butylene, 1,4-cyclohexylene, 1,6-hexamethylene, and 1,10-decamethylene.

The term "arylene" refers to a divalent group that is aromatic and, optionally, carbocyclic. The arylene has at least one aromatic ring. Optionally, the aromatic ring can have one or more additional carbocyclic rings that are fused to the aromatic ring. Any additional rings can be unsaturated, partially saturated, or saturated. Unless otherwise specified, arylene groups often have 5 to 20 carbon atoms, 5 to 18 carbon atoms, 5 to 16 carbon atoms, 5 to 12 carbon atoms, 6 to 12 carbon atoms, or 6 to 10 carbon atoms.

The term (meth)acrylate refers to acrylates and methacrylates.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the phrases "at least one" and "one or more." The phrases "at least one of" and "comprises at least one of" followed by a list refers to any one of the items in the list and any combination of two or more items in the list.

The term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The term "room temperature" refers to a temperature of 20° C. to 25° C. or 22° C. to 25° C.

Herein, when a group is present more than once in a formula described herein, each group is "independently" selected, whether specifically stated or not. For example, when more than one Q group is present in a formula, each Q group is independently selected. Furthermore, subgroups contained within these groups are also independently selected.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure provides fluorine-free treating compositions for fibrous substrates, treated fibrous substrates, and treating methods.

Treating compositions of the present disclosure are useful for treating a fibrous substrate to enhance the substrate's water repellency. As used herein, a fibrous substrate is water repellent if it demonstrates a minimum initial spray rating of at least 80, as determined by the Spray Rating Test described in the Examples Section. In certain embodiments, the initial spray rating is at least 90, or at least 100, as determined by the Spray Rating Test described in the Examples Section.

In certain embodiments, the fibrous substrates are treated such that they become durably water repellent. As used herein, a fibrous substrate is durably water repellent if it demonstrates a spray rating of at least 50 after 10 launderings, when treated with 1% solids, preferably 0.6% solids, on fibrous substrate, using a treating composition of the present disclosure, as determined by the Spray Rating Test with launderings (and optional ironing), as described in the Examples Section. In certain embodiments, the spray rating is at least 70 after 10 launderings, or at least 80 after 10 launderings, or at least 80 after 20 launderings, when treated with 1% solids, preferably 0.6% solids, on fibrous substrate, using a treating composition of the present disclosure, as determined by the Spray Rating Test with launderings (and optional ironing), as described in the Examples Section.

Typically, an amount of treating composition is used to obtain a desired initial spray rating level and/or a desired spray rating level after laundering multiple times. In certain embodiments, the amount of treating composition is at least 0.1 weight percent (wt-%), or at least 0.2 wt-%, or at least 0.3 wt-%, or at least 0.4 wt-%, or at least 0.5 wt-%, or at least 0.6 wt-%, SOF (solids on fibrous substrate, e.g., fabric). In certain embodiments, the amount of treating composition is up to 2 wt-%, or up to 1.5 wt-%, or up to 1 wt-% SOF (solids on fibrous substrate, e.g., fabric).

Exemplary fibrous substrates include textile, leather, carpet, paper, and fabrics (nonwoven, woven, or knitted).

Treating compositions of the present disclosure may be in the form of a concentrate, which may include up to 80 weight percent (wt-%) water, based on the total weight of the concentrated treating composition. Alternatively, treating compositions of the present disclosure may be in the form of a ready-to-use formulation, which may include more than 80 wt-% water, or at least 85 wt-% water, or at least 90 wt-% water, or at least 95 wt-% water, or at least 98 wt-% water, based on the total weight of the ready-to-use treating composition. In certain embodiments, a ready-to-use treating composition of the present disclosure includes up to 99 wt-% water, based on the total weight of the ready-to-use treating composition.

Treating compositions of the present disclosure include Component A and at least one of Components B and C. That is, in certain embodiments, treating compositions include Component A and Component B. In certain embodiments, treating compositions include Component A and Component C. In certain embodiments, treating compositions include Component A, Component B, and Component C.

Component A includes one or more polymeric compounds derived from the polymerization of at least one (meth)acrylate monomer including at least one hydrocarbon group (in certain embodiments, a linear or branched hydrocarbon group, and in certain embodiments, a linear hydrocarbon group) having from 1 to 60 carbon atoms (in certain embodiments, from 4 to 60 carbon atoms, or from 12 to 60 carbon atoms, or from 12 to 50 carbon atoms, or from 12 to 40 carbon atoms, or from 16 to 40 carbon atoms). In certain embodiments, Component A includes one or more polymeric compounds derived from the polymerization of at least one (meth)acrylate monomer including at least one hydrocarbon group (in certain embodiments, a linear or branched hydrocarbon group, and in certain embodiments, a linear hydrocarbon group) having from 1 to 60 carbon atoms (in certain embodiments, from 4 to 60 carbon atoms, or from 12 to 60 carbon atoms, or from 12 to 50 carbon atoms, or from 12 to 40 carbon atoms, or from 16 to 40 carbon atoms) and at least one isocyanate-derived group.

Component B includes one or more compounds derived from reaction, in one or more steps, of components comprising:

(i) at least one isocyanate-reactive (i.e., functionalized) oligomer having 2 to 20 repeating units, or an alcohol having at least one linear or branched hydrocarbon group having from 16 to 40 carbon atoms and optionally one or more ester groups;

(ii) at least one polyisocyanate (which may be an aromatic polyisocyanate);

(iii) optionally at least one additional isocyanate-reactive compound; and (iv) optionally at least one isocyanate blocking agent;

wherein the isocyanate-reactive oligomer is made by the radical-initiated reaction of at least one (meth)acrylate monomer in the presence of a mercaptan, wherein the at least one (meth)acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms). In certain embodiments of this reaction mixture of the isocyanate-reactive oligomer for making the one or more compounds of Component B, the at least one (meth)acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms), and at least one isocyanate-derived group.

Component C includes one or more polycarbodiimide compounds (i.e., a compound that includes one or more groups of the formula (—N=C=N—)). In certain embodiments, the one or more polycarbodiimide compounds of Component C are derived from a carbodiimidization reaction, in one or more steps, of components comprising:

(i) at least one isocyanate-reactive (i.e., functionalized) oligomer comprising 2 to 20 repeating units, or an alcohol having at least one linear or branched hydrocarbon group having from 16 to 40 carbon atoms and optionally one or more ester groups;

(ii) at least one polyisocyanate; and (iii) optionally at least one additional isocyanate-reactive compound;

wherein the isocyanate-reactive oligomer is made by the radical-initiated reaction of at least one (meth)acrylate monomer in the presence of a mercaptan, wherein the at least one (meth)acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms). In certain embodiments of this reaction mixture of the isocyanate-reactive oligomer for making the one or more polycarbodiimide compounds of Component C, the at least one (meth)acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms), and at least one isocyanate-derived group.

Component A may be present in a treating composition in an amount of at least 1 weight percent (wt-%), or at least 5 wt-%, or at least 10 wt-%, or at least 20 wt-%, or at least 30 wt-%, or at least 40 wt-%, based on the total weight of Component A and Components B and/or C. Component A may be present in a treating composition in an amount of up to 60 wt-%, or up to 70 wt-%, or up to 80 wt-%, or up to 90 wt-%, or up to 95 wt-%, or up to 99 wt-%, based on the total weight of Component A and Components B and/or C.

Component B, Component C, or both may be used in combination with Component A. Thus, Component B, Component C, or both may be present in a treating composition in an amount of at least 1 wt-%, based on the total weight of Component A and Components B and/or C. Thus, Component B, Component C, or both may be present in a treating composition in an amount of up to 99 wt-%, based on the total weight of Component A and Components B and/or C.

Component B may be present in a treating composition in an amount of 0 wt-%, or greater than 0 wt-%, or at least 1 wt-%, or at least 5 wt-%, or at least 10 wt-%, or at least 20 wt-%, or at least 30 wt-%, or at least 40 wt-%, based on the total weight of Component A and Components B and/or C. Component B may be present in a treating composition in an amount of up to 60 wt-%, or up to 70 wt-%, or up to 80 wt-%, or up to 90 wt-%, or up to 95 wt-%, or up to 99 wt-%, based on the total weight of Component A and Components B and/or C.

Component C may be present in a treating composition in an amount of 0 wt-%, or greater than 0 wt-%, or at least 1 wt-%, or at least 5 wt-%, or at least 10 wt-%, or at least 20 wt-%, or at least 30 wt-%, or at least 40 wt-%, based on the total weight of Component A and Components B and/or C. Component C may be present in a treating composition in an amount of up to 60 wt-%, or up to 70 wt-%, or up to 80 wt-%, or up to 90 wt-%, or up to 95 wt-%, or up to 99 wt-%, based on the total weight of Component A and Components B and/or C.

In certain embodiments, the treating composition of the present disclosure includes: from 1 wt-% to 99 wt-%, or from 5 wt-% to 95 wt-%, or from 10 wt-% to 90 wt-% of Component A, based on the total weight of Component A and Components B and/or C; and from 1 wt-% to 99 wt-%, or from 5 wt-% to 95 wt-%, or from 10 wt-% to 90 wt-% of Component B, Component C, or both, based on the total weight of Component A and Components B and/or C.

Component a Polymeric Compounds and Preparation Thereof

Component A includes one or more polymeric compounds derived from the polymerization of at least one (meth)acrylate monomer including at least one hydrocarbon group (in certain embodiments, a linear or branched hydrocarbon group, and in certain embodiments, a linear hydrocarbon group) having from 1 to 60 carbon atoms (in certain embodiments, from 4 to 60 carbon atoms, or from 12 to 60 carbon atoms, or from 12 to 50 carbon atoms, or from 12 to 40 carbon atoms, or from 16 to 40 carbon atoms). In certain embodiments, Component A includes one or more polymeric compounds derived from the polymerization of at least one (typically, one) (meth)acrylate monomer including at least one (typically, one) hydrocarbon group (in certain embodiments, a linear or branched hydrocarbon group, and in certain embodiments, a linear hydrocarbon group) having from 1 to 60 carbon atoms (in certain embodiments, from 4 to 60 carbon atoms, or from 12 to 60 carbon atoms, or from 12 to 50 carbon atoms, or from 12 to 40 carbon atoms, or from 16 to 40 carbon atoms), and at least one isocyanate-derived group (e.g., a urethane group or a urea group).

Such polymeric compounds may be homopolymers or copolymers (including terpolymers, tetrapolymers, and the like).

In certain embodiments, such polymeric compounds of Component A include greater than 20 repeating units, or at least 30 repeating units, or at least 50 repeating units, or at least 100 repeating units, or at least 200 repeating units, or at least 300 repeating units, or at least 400 repeating units, or at least 500 repeating units, or at least 600 repeating units, or at least 700 repeating units, or at least 800 repeating units, or at least 900 repeating units, or at least 1000 repeating units. In certain embodiments, such polymeric compounds include up to 10,000 repeating units.

In certain embodiments, such polymeric compounds of Component A have a weight average molecular weight of greater than 20,000 Daltons, or at least 30,000 Daltons, or at least 40,000 Daltons. In certain embodiments, such polymeric compounds have a weight average molecular weight of up to 200,000 Daltons. In certain embodiments, such polymeric compounds have a weight average molecular weight of up to 500,000 Daltons.

Herein (meth)acrylate monomers include acrylates and methacrylates. These monomers for making the compounds of Component A have a hydrocarbon group containing (in certain embodiments, a linear or branched hydrocarbon group, and in certain embodiments, a linear hydrocarbon group) from 1 to 60 carbon atoms.

Examples of such monomers can be represented by the following formula:

$$R^1-OC(O)-C(R^2)=CH_2 \quad \text{(Formula 0)}$$

wherein $R^1$ is a hydrocarbon group (in certain embodiments, a linear or branched hydrocarbon group, and in certain embodiments, a linear hydrocarbon group) having from 1 carbon atom (in some embodiments, at least 16 carbon atoms) and up to 60 carbon atoms; and $R^2$ represents H or $CH_3$. In certain embodiments, $R^1$ is a hydrocarbon group (in certain embodiments, a linear or branched hydrocarbon group, and in certain embodiments, a linear hydrocarbon group) that includes from 4 to 60 carbon atoms, or from 12 to 60 carbon atoms, or from 12 to 50 carbon atoms, or from 12 to 40 carbon atoms, or from 16 to 40 carbon atoms.

Representative examples include methyl (meth)acrylate, ethyl (meth)acrylate, butyl (meth)acrylate, isobutyl (meth)acrylate, octyl (meth)acrylate (also referred to as stearyl (meth)acrylate, lauryl (meth)acrylate, docosanyl (meth)acrylate (also referred to as behenyl (meth)acrylate), and the like.

In certain embodiments, the (meth)acrylate monomer includes at least one (typically, one) isocyanate-derived group (e.g., a urethane group or a urea group) and at least one (typically, one) hydrocarbon group (in certain embodiments, a linear or branched hydrocarbon group, and in certain embodiments, a linear hydrocarbon group) having from 1 to 60, or from 4 to 60 carbon atoms, or from 12 to 60 carbon atoms, or from 12 to 50 carbon atoms, or from 12 to 40 carbon atoms, or from 16 to 40 carbon atoms. Such monomers can be represented by at least one of the following formulas:

$$R^1-NH-C(O)O-L^1-OC(O)C(R^2)=CH_2 \quad \text{(Formula I);}$$

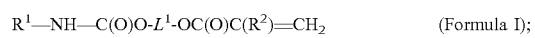

$$R^3-X^1-C(O)NH-L^2-OC(O)C(R^4)=CH_2 \quad \text{(Formula II); or}$$

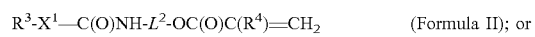

$$R^5-X^2-C(O)NH-Q-NH-C(O)O-L^3-OC(O)C(R^6)=CH_2 \quad \text{(Formula III).}$$

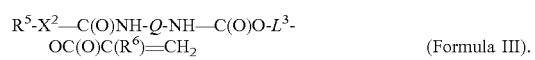

In Formulas I, II, and III, $R^1$, $R^3$, and $R^5$ are independently a hydrocarbon group (in certain embodiments, a linear or branched hydrocarbon group, and in certain embodiments, a linear hydrocarbon group) having from 1 carbon atom (in some embodiments, at least 16 carbon atoms) and up to 60 carbon atoms. In certain embodiments, $R^1$, $R^3$, and $R^5$ are independently a hydrocarbon group (in certain embodiments, a linear or branched hydrocarbon group, and in certain embodiments, a linear hydrocarbon group) that includes from 4 to 60 carbon atoms, or from 12 to 60 carbon atoms, or from 12 to 50 carbon atoms, or from 12 to 40 carbon atoms, or from 16 to 40 carbon atoms. In certain embodiments, $R^1$, $R^3$, and $R^5$ are straight chain (i.e., linear) hydrocarbon groups.

Examples of suitable hydrocarbon groups include a methyl (C1), ethyl (C2), butyl (C4), octyl (C8), lauryl (C12), hexadecyl (C16) group, octadecyl (C18) group, an arachidyl (C20) group, a behenyl (C22) group, a lignoceryl (C24) group, a ceryl (C26) group, a montanyl (C28) group, a myricyl (C30) group, a 2-dodecylhexadecyl (C28 branched) group, a 2-tetradecyloctadecyl (C32 branched) group, and long chain linear alkyl groups of 30 to 60 carbon atoms (available under the UNILIN brand). In certain embodiments, $R^1$, $R^3$, and $R^5$ are independently an octadecyl or a behenyl group.

In Formulas I, II, and III, $R^2$, $R^4$, and $R^6$ are independently H or $CH_3$.

In Formulas I, II, and III, $L^1$, $L^2$, and $L^3$ are independently an alkylene group having 2 to 10 carbon atoms, an arylene group (in certain embodiments, an arylene group having 5 to 12 carbon atoms), or a combination thereof.

Examples of such alkylene groups include $-CH_2CH_2-$, $-CH_2CH_2CH_2-$, $-CH_2CH_2CH_2CH_2-$, and the like.

Examples of such arylene groups include phenyl, naphthyl, and the like.

Examples of combinations of alkylene and arylene groups include benzyl, ethylphenyl, and the like. In certain embodiments, $L^1$, $L^2$, and $L^3$ are independently a branched or straight chain alkylene group (in certain embodiments, a straight chain, i.e., linear, alkylene group) having 2 to 10 carbon atoms.

In certain embodiments, $L^1$, $L^2$, and $L^3$ are independently selected from an ethylene group, a butylene group, or a propylene group.

In Formulas II and III, $X^1$ and $X^2$ are independently O, S, $-NH$, or $-N(R^7)$ wherein $R^7$ is a hydrocarbon group (in certain embodiments, an alkyl group) having 1 to 20 carbon atoms. Examples of $R^7$ hydrocarbon groups include alkyl groups such as methyl, ethyl, decyl, octadecyl, and the like.

In Formula III, Q is a divalent isocyanate residue (i.e., an aromatic or aliphatic diisocyanate without the 2 isocyanate functional groups). Examples of divalent isocyanate residues include 2,4-toluenyl and 4,4'-methylenebis(phenyl).

Examples of suitable (meth)acrylate monomers of Formula I include the reaction product of stearyl isocyanate with 2-hydroxyethyl (meth)acrylate (i.e., $C_{18}H_{37}-NHC(O)O-CH_2CH_2-OC(O)C(R^2)=CH_2$, wherein $R^2$ is H or $-CH_3$), the reaction product of stearyl isocyanate with 3-hydroxypropyl (meth)acrylate, and the reaction product of stearyl isocyanate with 4-hydroxybutyl (meth)acrylate.

Examples of suitable (meth)acrylate monomers of Formula II include the reaction product of isocyanatoethyl (meth)acrylate with stearyl alcohol (i.e., $C_{18}H_{37}-OC(O)NH-CH_2CH_2-OC(O)C(R^4)=CH_2$, wherein $R^4$ is H or $-CH_3$), the reaction product of isocyanatoethyl (meth)acrylate with behenylalcohol, the reaction product of isocyanatoethyl (meth)acrylate with 2-tetradecyloctadecanol, and the reaction product of isocyanatoethyl (meth)acrylate with octadecylamine.

Examples of suitable (meth)acrylate monomers of Formula III include the reaction product of 2,4-toluene diisocyanate (TDI) with stearyl alcohol and 2-hydroxyethyl (meth)acrylate (i.e., $C_{18}H_{37}-OC(O)NH-C_7H_6NHC(O)OCH_2CH_2-OC(O)CR^6=CH_2$) wherein $R^6$ is H or $-CH_3$), the reaction product of TDI with stearyl alcohol and 3-hydroxypropyl (meth)acrylate, the reaction product of TDI with stearyl alcohol and 4-hydroxybutyl (meth)acrylate, the reaction product of TDI with behenylalcohol and 2-hydroxyethyl (meth)acrylate, and the like.

In certain embodiments, the (meth)acrylate monomer comprising at least one (typically, one) isocyanate-derived group (e.g., urethane group or urea group) and at least one (typically, one) hydrocarbon group having at least 16 carbon atoms has at least one of the following formulas:

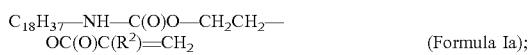

$C_{18}H_{37}-NH-C(O)O-CH_2CH_2-OC(O)C(R^2)=CH_2$ (Formula Ia);

$C_{18}H_{37}OC(O)NH-CH_2CH_2-OC(O)C(R^4)=CH_2$ (Formula IIa); or

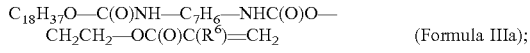

$C_{18}H_{37}O-C(O)NH-C_7H_6-NHC(O)O-CH_2CH_2-OC(O)C(R^6)=CH_2$ (Formula IIIa);

wherein $R^2$, $R^4$, and $R^6$ are independently H or $CH_3$.

Compounds of Formula Ia are within the scope of compounds of Formula I. Compounds of Formula IIa are within the scope of compounds of Formula II. Compounds of Formula IIIa are within the scope of compounds of Formula III, wherein Q in Formula III is an isocyanate residue ($-C_7H_6-$) derived from 2,4-toluenediisocyanate.

Techniques and conditions for making the (meth)acrylate monomers described herein would be well known to one of skill in the art. For example, a suitable (meth)acrylate monomer reactant (e.g., hydroxyethyl acrylate) and an isocyanate reactant (e.g., stearyl isocyanate) can be combined with or without an appropriate catalyst.

A catalyst in an appropriate amount (e.g., 500 ppm) may be used, but is not mandatory (particularly if higher temperatures are used). Exemplary catalysts include dibutyl tindilaurate (DBTDL) and bismuth neodecanoate (e.g., Shepherd Bicat 8108M, ABCR Bismuth (III) neodecanoate, superconductor grade, about 60% in neodecanoic acid (15-20% Bi), or Strem Chemicals Bismuth (III) neodecanoate, superconductor grade, about 60% in neodecanoic acid (15-20% Bi)).

The reaction to form a (meth)acrylate with an isocyanate-derived group can typically be carried out in a temperature range of 40° C. to 100° C., or 70° C. to 100° C., or 75° C. to 95° C. preferably under dry conditions (e.g., dry air). If no catalyst is used, a reaction temperature of 70° C. to 100° C. is preferred. Typically, the reaction is carried out in 1-24 hours, or 4-15 hours.

To prevent unwanted radical polymerization during the synthesis of the (meth)acrylate monomers, a stabilizer in an appropriate amount (e.g., 50 to 500 ppm), such as 3,5-di-tert-butyl-4-hydroxy-toluene (BHT), 4-methoxyphenol (MOP), or hydroquinone (HQ) may be used, but is not mandatory.

One or more (meth)acrylate monomers described above (e.g., those that include an isocyanate-derived group (e.g., a urethane group or a urea group) and a hydrocarbon group (in certain embodiments, a linear or branched hydrocarbon group, and in certain embodiments, a linear hydrocarbon group) having from 1 to 60 carbon atoms) may be used in various combinations to form polymeric compounds of the present disclosure. Thus, the polymeric compounds may be homopolymeric or copolymeric.

In certain embodiments, other ethylenically unsaturated monomers may be copolymerized with such (meth)acrylate monomers described above (e.g., those that include isocyanate-derived and hydrocarbon groups). For example, in certain embodiments, the reaction mixture for making the one or more polymeric compounds additionally includes a (meth)acrylate monomer with one or more functional groups capable of undergoing additional reactions (e.g., crosslinking, network building, curing, grafting, and the like). A blocked isocyanate group or N-methylol group in a treating composition of the present disclosure can react with hydroxy groups present in polyester fabrics, or amino groups present on polyamide fabrics, during curing/drying of the fabrics after application of the treating composition. A blocked isocyanate group in a treating composition of the present disclosure can react with hydroxy groups in other polymeric compounds of the treating composition leading to intermolecular crosslinking and network formation. An olefin group in a treating composition of the present disclosure can be used for grafting onto fibrous substrates. Other additional reactions of functional groups are well known to those skilled in the art.

Such groups capable of undergoing additional reactions include, for example, a polymerizable olefin group, an olefin group that can undergo a hydrosilation reaction, an epoxy group, a hydroxyl group, a halo group, a haloformyl group, an aziridino group, an acid group, a salt of an acid group, an amino group, a salt of an amino group, a quaternary ammonium group, a salt of a quaternary ammonium group, a blocked isocyanate group, a hydroxyalkyl group, a chlorinated hydroxyalkyl group, an N-methylol group, an acetoacetoxyalkyl group, or a combination thereof. In certain embodiments, the (meth)acrylate monomer with one or more functional groups capable of undergoing additional reactions include groups selected from blocked isocyanate groups, epoxy groups, chlorohydroxypropyl groups, hydroxyalkyl groups, N-methylol groups, acetoacetoxyalkyl groups, and combinations thereof.

Other modifying monomers that could be copolymerized with the (meth)acrylate monomers described above include, for example:

(a) other ethylenically unsaturated monomers such as olefinic hydrocarbons (including isoprene, butadiene, or chloroprene), vinyl-, allyl-, or vinylidene-halides (including vinylidene chloride or vinyl chloride), styrene and its derivatives, vinyl esters (including vinylacetate), allylesters (including allylacetate), alkylvinyl, or alkylallylethers (including octadecylvinylether), nitriles (including acrylonitrile), maleate or itaconate esters (including di-octadecylitaconate), and (meth)acrylamides (including octadecylacrylamide); and (b) (meth)acrylate monomers containing one or more functional groups capable of undergoing further reactions, such as crosslinking, network building, curing, grafting, and the like (such monomers include, for example, glycidyl methacrylate, allyl methacrylate, N-methylol acrylamide, 3-chloro-2-hydroxy propyl (meth)acrylate, the reaction product of AOI with 2-butanoneoxime, and the like).

In certain embodiments, the resulting polymeric compounds can be prepared by a free-radical polymerization.

In order to prepare the polymeric compounds, a free-radical initiator may be used to initiate the polymerization. Free-radical initiators include those known in the art and include, in particular, azo compounds such as 2,2'-azobis(2-methylbutyronitrile), 2,2'-azobisisobutyronitrile (AIBN) and 2,2'-azobis(2-cyanopentane), and the like, hydroperoxides such as cumene, t-butyl- and t-amyl-hydroperoxide, and the like, peroxyesters such as t-butylperbenzoate, di-t-butylperoxyphtalate, and the like, and diacylperoxides such as benzoyl peroxide, lauroyl peroxide, and the like.

The polymerization may be carried out in a wide variety of solvents suitable for organic free-radical reactions. Examples of suitable solvents include aliphatic and alicyclic hydrocarbons (e.g., hexane, heptane, cyclohexane), ethers (e.g., diethylether, glyme, diglyme, diisopropyl ether), esters (e.g., ethylacetate, butylacetate), ketones (e.g., acetone, methylethyl ketone, methyl isobutyl ketone), and mixtures thereof.

The polymerizations can also be carried out in aqueous media, such as in an emulsion polymerization or miniemulsion polymerization, using the appropriate emulsifiers and initiators known to those skilled in the art. Emulsifiers include nonionic, cationic, amphoteric, or anionic surfactants, such as sodium alkylsulphonates, sodium alkylbenzenesulphonates, sodium dialkylsulphosuccinates, (C12-C18) alkylalcohol-ethyleneoxide adducts, polyethoxylatednonylphenols, or alkylquaternary ammoniumethoxylates.

The polymerization reaction can be carried out at a temperature suitable for conducting a free-radical polymerization reaction. Particular temperatures and solvents for use can be easily selected by those skilled in the art based on considerations such as the solubility of reagents, the temperature required for the use of a particular initiator, molecular weight desired, and the like. While it is not practical to enumerate a particular temperature suitable for all initiators and all solvents, generally suitable temperatures are 30° C. to 150° C. In certain embodiments, the temperature is 55° C. to 90° C., or 75° C. to 80° C. Reaction times typically are within 1 to 24 hours, and often within 4 to 15 hours.

In certain embodiments, the polymeric compounds of Component A are derived from one or more polymerizable (meth)acrylate monomers comprising at least one hydrocarbon group (in certain embodiments, a linear or branched hydrocarbon group, and in certain embodiments, a linear hydrocarbon group) having from 1 to 60 carbon atoms in an amount of at least 70 wt-%, at least 75 wt-%, at least 80 wt-%, at least 85 wt-%, at least 90 wt-%, or at least 95 wt-%, based on the total weight of polymerizable monomers. In certain embodiments, the polymeric compounds of Component A are derived from one or more polymerizable (meth)acrylate monomers comprising at least one hydrocarbon group (in certain embodiments, a linear or branched hydrocarbon group, and in certain embodiments, a linear hydrocarbon group) having from 1 to 60 carbon atoms in an amount of up to 100 wt-%, based on the total weight of polymerizable monomers.

In certain embodiments, the polymeric compounds of Component A are derived from one or more polymerizable modifying monomers (a) and/or (b) (described above), and one or more polymerizable (meth)acrylate monomers comprising at least one hydrocarbon group (in certain embodiments, a linear or branched hydrocarbon group, and in certain embodiments, a linear hydrocarbon group) having from 1 to 60 carbon atoms. In certain embodiments, the polymeric compounds of Component A are derived from one or more polymerizable ethylenically unsaturated monomers (a) in an amount of up to 20 wt-%, or up to 10 wt-%, based on the total weight of polymerizable monomers. In certain embodiments, the polymeric compounds of Component A are derived from one or more (meth)acrylate monomers (b) in an amount of up to 10 wt-%, or up to 5 wt-%, based on the total weight of polymerizable monomers. Combinations of modifying monomers (a) and (b) can be used if desired.

In certain embodiments, the one or more polymeric compounds of Component A are selected from a homopolymer of octadecyl (meth)acrylate, a homopolymer of behenyl (meth)acrylate, a copolymer of octadecyl (meth)acrylate and glycidyl (meth)acrylate, and a copolymer of octadecyl (meth)acrylate and N-methylol (meth)acrylamide.

In certain embodiments, the one or more polymeric compounds of Component A are selected from a homopolymer of the reaction product of hydroxyethyl (meth)acrylate and stearyl isocyanate, a homopolymer of the reaction product of hydroxypropyl (meth)acrylate and stearyl isocyanate, a homopolymer of the reaction product of hydroxybutyl (meth)acrylate and stearyl isocyanate, and a homopolymer of the reaction product of stearyl alcohol and isocyanatoethyl (meth)acrylate.

In certain embodiments, the one or more polymeric compounds of Component A are selected from a copolymer of at least one of glycidyl (meth)acrylate, vinylidene chloride, and N-methylol acrylamide with at least one of the reaction products of:
  hydroxyethyl (meth)acrylate and stearyl isocyanate;
  hydroxypropyl (meth)acrylate and stearyl isocyanate;
  hydroxybutyl (meth)acrylate and stearyl isocyanate; and
  stearyl alcohol and isocyanato ethyl (meth)acrylate.

In certain embodiments, the one or more polymeric compounds of Component A are selected from a copolymer of the reaction product of isocyanato ethyl (meth)acrylate and 2-butanoneoxime.

Preparation and structures of other Component A compounds are further elaborated in International Publication No. WO2016/130415, which published on Aug. 18, 2016.

Component B Compounds and Preparation Thereof

Component B includes one or more compounds derived from reaction, in one or more steps, of components comprising:
  (i) at least one isocyanate-reactive oligomer (i.e., functionalized oligomer) comprising 2 to 20 repeating units, or an alcohol having at least one linear or branched hydrocarbon group having from 16 to 40 carbon atoms and optionally one or more ester groups;
  (ii) at least one polyisocyanate;
  (iii) optionally at least one additional isocyanate-reactive compound; and
  (iv) optionally at least one isocyanate blocking agent.

In certain embodiments, Component B includes one or more compounds derived from reaction, in one or more steps, of components comprising:
  (i) at least one isocyanate-reactive oligomer (i.e., functionalized oligomer) comprising 2 to 20 repeating units;
  (ii) at least one aromatic polyisocyanate; and
  (iii) at least one isocyanate blocking agent.

Typically, one or more compounds of component B used in treating compositions of the present disclosure may be prepared in a one-step reaction, a two-step reaction, or optionally three-step reaction, although it will generally not be required to separate reaction products after the individual steps. That is, the reaction may be carried out in three steps in a single reactor.

In certain embodiments, an alcohol having at least one linear or branched hydrocarbon group having from 16 to 40 carbon atoms and optionally one or more ester groups (e.g., ISOFOL 28, ISOFOL 32, ISOFOL 36, UNILIN 350, sorbitan tristearate, and the reaction product of 1 mol of citric acid and 3 moles of stearyl alcohol) is reacted with an equivalent amount of a polyisocyanate.

In certain embodiments, in a first step, an alcohol having at least one linear or branched hydrocarbon group having from 16 to 40 carbon atoms and optionally one or more ester groups is reacted with an isocyanate (typically, a polyisocyanate), optionally in the presence of an isocyanate-reactive compound, to form an isocyanate-containing compound. In a second step, the isocyanate-containing compound is further reacted with an isocyanate blocking agent.

In certain embodiments, in a first step, a functionalized oligomer having from 2 to 20 repeating units is prepared. In a second step, this functionalized oligomer is reacted with an isocyanate (typically, a polyisocyanate), optionally in the presence of an additional isocyanate-reactive compound.

In certain embodiments, in a first step, a functionalized oligomer having from 2 to 20 repeating units is prepared. In a second step, this functionalized oligomer is reacted with an isocyanate (typically, a poly-isocyanate) to form an isocyanate-containing oligomer (i.e., an oligomer having at least one isocyanate end group). Thus, the term "functionalized oligomer" means an oligomer that contains a functional group capable of reacting with an isocyanate. In an optional third step, the isocyanate-containing oligomer (i.e., oligomer with isocyanate end groups) is further reacted with an isocyanate blocking agent. Thus, the reaction product of the second step, i.e., the oligomer that includes at least one isocyanate group (e.g., an isocyanate end group), may be formed in the reaction mixture without being isolated (i.e., it is formed in situ).

Isocyanate-Reactive Oligomer and Preparation Thereof.

The isocyanate-reactive oligomers (i.e., functionalized oligomers) used for making the one or more compounds of Component B are made by the radical-initiated reaction of at least one (meth)acrylate monomer in the presence of a mercaptan, wherein the at least one (meth)acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms). In certain embodiments, the at least one (meth)acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms) and at least one isocyanate-derived group (e.g., a urethane group or a urea group).

Suitable (meth)acrylate monomers include those monomers described above for making the polymeric compounds of Component A. Methods of preparation of suitable (met) acrylate monomers are also described above with respect to Component A.

Such (meth)acrylate monomers may be used to make functionalized oligomers (i.e., oligomers that contain a functional group capable of reacting with an isocyanate) by reaction with a mercaptan in a free-radical oligomerization.

In certain embodiments, the mercaptan is functionalized with at least one isocyanate-reactive group. In certain embodiments, the mercaptan is functionalized with at least one alcohol or amine group. In certain embodiments, the mercaptan is not functionalized.

Examples of mercaptans include mono- or di-functional hydroxyl- or amino-functionalized mercaptans (as chain transfer agents), in order to prepare mono- or di-functionalized oligomers, respectively. Examples of monofunctional mercaptans (as chain transfer agents) include 2-mercapto-ethanol, 3-mercapto-2-butanol, 3-mercapto-2-propanol, 3-mercapto-1-propanol, and 2-mercapto-ethylamine. A particularly suitable monofunctional chain transfer agents is 2-mercaptoethanol. Examples of difunctional mercaptans (as chain transfer agents) include those having two hydroxyl or amino groups or one hydroxyl and one amino group. A suitable example of a difunctional chain transfer agent is 3-mercapto-1,2-propanediol (thioglycerol).

In certain embodiments, non-functional mercaptans are used, i.e., mercaptans that do not contain an additional isocyanate-reactive group (e.g., a hydroxy group). In order to make a functionalized oligomer with such mercaptans, the non-functional mercaptan is reacted with a mixture of (meth)acrylates wherein at least one (meth)acrylate has a functional group capable of reacting with an isocyanate group. Examples of non-functional mercaptans include octylmercaptan, dodecylmercaptan, octadecylmercaptopropionate, and octadecylmercaptan. Examples of functionalized (meth)acrylate capable of undergoing a reaction with an isocyanate group are 2-hydroxyethyl (meth)acrylate, 3-hydroxypropyl (meth)acrylate, and 4-hydroxybutyl (meth)acrylate.

Examples of functionalized oligomers made using non-functional mercaptans include the reaction product of 1 mole of octylmercaptan with 1 mole of 2-hydroxyethylacrylate and 11 moles of a monomer of Formula I, II, or III, or the reaction product of 1 mole of octadecylmercaptan with 1 mole of 4-hydroxybutylacrylate with 7 moles of a monomer of Formula I, II, or III.

In order to prepare the functionalized oligomers (i.e., isocyanate-reactive oligomers), a free-radical initiator may be used to initiate the oligomerization. Free-radical initiators include those known in the art and include, in particular, azo compounds such as 2,2'-azobis(2-methylbutyronitrile), 2,2'-azobisisobutyronitrile (AIBN) and 2,2'-azobis(2-cyanopentane), and the like, hydroperoxides such as cumene, t-butyl- and t-amyl-hydroperoxide, and the like, peroxyesters such as t-butylperbenzoate, di-t-butylperoxyphtalate, and the like, and diacylperoxides such as benzoyl peroxide, lauroyl peroxide, and the like.

The oligomerization reaction to form a functionalized (i.e., isocyanate-reactive) oligomer may be carried out in a wide variety of solvents suitable for organic free-radical reactions. Particularly suitable solvents are solvents that do not interfere with the isocyanate reactions in the subsequent step(s). The reactants can be present in the solvent at any suitable concentration, e.g., from about 5 percent to about 90 percent by weight, based on the total weight of the reaction mixture. Examples of suitable solvents include aliphatic and alicyclic hydrocarbons (e.g., hexane, heptane, cyclohexane), ethers (e.g., diethylether, glyme, diglyme, diisopropyl ether), esters (e.g., ethylacetate, butylacetate), ketones (e.g., acetone, methylethyl ketone, methyl isobutyl ketone), and mixtures thereof.

The oligomerization reaction to form a functionalized (i.e., isocyanate-reactive) oligomer can be carried out at a temperature suitable for conducting a free-radical oligomerization reaction. Particular temperatures and solvents for use can be easily selected by those skilled in the art based on considerations such as the solubility of reagents, the temperature required for the use of a particular initiator, molecular weight desired, and the like. While it is not practical to enumerate a particular temperature suitable for all initiators and all solvents, generally suitable temperatures are 30° C. and 150° C. In certain embodiments, the temperature is 55° C. and 90° C., or 75° C. and 80° C. Reaction times typically are within 1 to 24 hours, and often within 4 to 15 hours.

In certain embodiments, the functionalized (i.e., isocyanate-reactive) oligomer is made by the oligomerization of a (meth)acrylate monomer, optionally comprising at least one isocyanate-derived group (e.g., a urethane group or a urea group) and at least one hydrocarbon group (in certain embodiments, a linear or branched hydrocarbon group, and in certain embodiments, a linear hydrocarbon group) having from 1 to 60 carbon atoms (in certain embodiments, from 4 to 60, or from 12 to 60, or from 12 to 50, or from 12 to 40, or from 16 to 40 carbon atoms), in the presence of a mercaptan, wherein the molar ratio of the mercaptan with the (meth)acrylate is 1:4 to 1:20, or a molar ratio of the mercaptan with the (meth)acrylate is 1:8 to 1:16.

In certain embodiments, the functionalized (i.e., isocyanate-reactive) oligomer has at least one of the following formulas:

 (Formula IV);

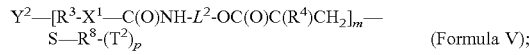 (Formula V);

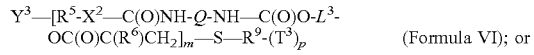 (Formula VI); or

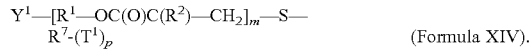 (Formula XIV).

In Formulas IV, V, VI, and XIV, $Y^1$, $Y^2$, and $Y^3$, respectively, are independently H or an initiator residue. In these representations, it would be clear to one of skill in the art that the structures provide the building blocks for the oligomers, not necessarily the arrangement or orientation of the various groups. For example, the Y groups could be bonded to the carbon having $R^2$, $R^4$, or $R^6$ bonded thereto, or to the $CH_2$ group, in the starting monomeric unit. Typically, if Y is an initiator residue, it is bonded to the $CH_2$ group of the starting monomeric unit. For example, Formula IV can also be represented as $Y^1$—[$CH_2$—$C(R^*)(R^2)$]$_m$—S—$R^7$-($T^1$)$_p$ wherein $R^*$ is $R^1$—NH—C(O)O-$L^1$-OC(O)—.

The initiator residue of $Y^1$, $Y^2$, and $Y^3$ may be the residue of a free-radical initiator, such as azo compounds, such as 2,2'-azobis(2-methylbutyronitrile), 2,2'-azobisisobutyronitrile (AIBN) and 2,2'-azobis(2-cyanopentane) and the like, hydroperoxides such as cumene, t-butyl- and t-amyl-hydroperoxide, peroxyesters such as t-butylperbenzoate and di-t-butylperoxyphtalate, diacylperoxides such as benzoyl peroxide and lauroyl peroxide. For example, if the free radical initiator used in making the oligomers is 2,2'-azobis(2-methylbutyronitrile) (V-59 initiator), which has the following structure $H_3CH_2C$—$C(CH_3)(CN)$—N=N—$C(CH_3)$(CN)—$CH_2CH_3$, the residue is believed to be —$C(CH_3)$(CN)—$CH_2CH_3$, although there may be other fragments of the initiator forming the residue.

In Formulas IV, V, VI, and XIV, $R^1$, $R^3$, and $R^5$ are as described in Component A in Formulas 0, I, II, and III.

In Formulas IV, V, VI, and XIV, $R^2$, $R^4$, and $R^6$, respectively, are independently H or $CH_3$.

In Formulas IV, V, and VI, $L^1$, $L^2$, and $L^3$ are as described in Component A in Formulas I, II, and III.

In Formulas V and VI, $X^1$ and $X^2$ are independently O, S, —NH, or —N($R^{10}$), wherein $R^{10}$ is a hydrocarbon group (in certain embodiments, an alkyl group) having 1 to 20 carbon atoms, as described in Component A in Formulas II and III.

In Formula VI, Q is a divalent isocyanate residue, as described in Component A in Formula III.

In Formulas IV, V, VI, and XIV, each m is independently an integer of 2 to 20. In certain embodiments, m is an integer of 4 to 20. The "m" units are repeats of the monomers of Formulas 0, I, II, and III.

In Formulas IV, VI, and XIV, $R^7$, $R^8$, and $R^9$ are independently a divalent or trivalent linking group having 1 to 10 carbon atoms.

In Formulas IV, V, VI, and XIV, $T^1$, $T^2$, and $T^3$ are is independently —OH, —$NH_2$, or —NH($R^{11}$), wherein $R^{11}$ is a hydrocarbon group (in certain embodiments, an alkyl group) having 1 to 10 carbon atoms.

In Formulas IV, V, VI, and XIV, each p is independently 1 or 2.

In Formulas IV, V, VI, and XIV, S is sulfur.

In certain embodiments, the functionalized oligomer has at least one of the following formulas:

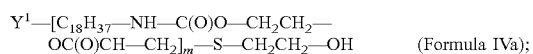 (Formula IVa);

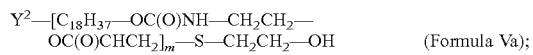 (Formula Va);

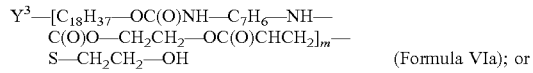 (Formula VIa); or

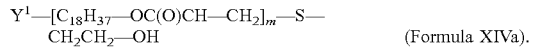 (Formula XIVa).

In Formulas IVa, Va, VIa, and XIVa, $Y^1$, $Y^2$, and $Y^3$ are independently an initiator residue as described above. In these representations, it would be clear to one of skill in the art that the structures provide the building blocks for the oligomers, not necessarily the arrangement or orientation of the various groups. For example, the Y groups could be bonded to the carbon having $R^2$, $R^4$, or $R^6$ bonded thereto, or to the $CH_2$ group, in the starting monomeric unit. Typically, if Y is an initiator residue, it is bonded to the $CH_2$ group of the starting monomeric unit. For example, Formula IVa can also be represented as $Y^1$—[$CH_2$—CH(R*)]$_m$—S—$CH_2CH_2H_2$—OH wherein R* is $C_{18}H_{37}$—NH—C(O)O—$CH_2CH_2$—OC(O)—.

In Formulas IVa, Va, VIa, and XIVa, each m is independently an integer from 4 to 20.

In Formulas IVa, Va, VIa, and XIVa, S is sulfur.

Compounds of Formula IVa are within the scope of compounds of Formula IV. Compounds of Formula Va are within the scope of compounds of Formula V. Compounds of Formula VIa are within the scope of compounds of Formula VI. Compounds of Formula XIVa are within the scope of compounds of Formula XIV.

Examples of oligomers of Formula IV include (SI-HOEA)$_8$, (SI-HOEA)$_{12}$, and (SI-HOPA)$_8$ wherein $Y^1$ is a residue of the V-59 initiator. Examples of oligomers of Formula V include (SA-AOI)$_8$ and (SA-MOI)$_8$. Examples of oligomers of Formula VI include (SA-TDI-HOEA)$_8$, where "TDI" in the oligomer is —$C_7H_6$— (i.e., the divalent isocyanate residue of TDI), which is Formula VIa wherein $Y^3$ is the residue of the V-59 initiator. Preparation and structure of the oligomers are further elaborated in the Examples Section.

Herein, acronyms, such as HOEA, SI, AOI, MOI, etc., are used both to represent the reactants (e.g., monomers) and the corresponding residues in the oligomers as a result of oligomerization.

Other modifying monomers that could be copolymerized with the (meth)acrylate monomers that react with mercaptans to make the isocyanate-reactive oligomers used to make the compounds of Component B include, for example:

(a) other ethylenically unsaturated monomers such as olefinic hydrocarbons (including isoprene, butadiene, or chloroprene), vinyl-, allyl- or vinylidene-halides (including vinylidene chloride or vinyl chloride), styrene and its derivatives, vinyl esters (including vinylacetate), allylesters (including allylacetate), alkylvinyl, or alkylallylethers (including octadecylvinylether), nitriles (including acrylonitrile), maleate or itaconate esters (including di-octadecylitaconate), and (meth)acrylamides (including octadecyl (meth)acrylamide); and (b) functional monomers, such as 2-hydroxyethylacrylate, and the like.

In certain embodiments, the isocyanate-reactive oligomers used to make the compounds of Component B are derived from one or more polymerizable (meth)acrylate monomers comprising at least one hydrocarbon group having from 1 to 60 carbon atoms in an amount of at least 70 wt-%, at least 75 wt-%, at least 80 wt-%, at least 85 wt-%, at least 90 wt-%, or at least 95 wt-%, based on the total weight of polymerizable monomers.

In certain embodiments, the isocyanate-reactive oligomers used to make the compounds of Component B are derived from one or more polymerizable (meth)acrylate monomers comprising at least one hydrocarbon group having from 1 to 60 carbon atoms in an amount of up to 100 wt-%, based on the total weight of polymerizable monomers. In certain embodiments, the isocyanate-reactive oligomers used to make the compounds of Component B are derived from one or more polymerizable modifying monomers (a) and/or (b) (described above), and one or more polymerizable (meth)acrylate monomers comprising at least one hydrocarbon group having from 1 to 60 carbon atoms. In certain embodiments, the isocyanate-reactive oligomers used to make the compounds of Component B are derived from one or more polymerizable ethylenically unsaturated monomers (a) in an amount of up to 20 wt-%, or up to 10 wt-%, based on the total weight of polymerizable monomers. In certain embodiments, the isocyanate-reactive oligomers used to make the compounds of Component B are derived from one or more functional monomers (b) in an amount of up to 10 wt-%, or up to 5 wt-%, based on the total weight of copolymerizable monomers. A combination of modifying monomers (a) and (b) can be used if desired.

In certain embodiments, the weight average molecular weight of the functionalized oligomers is at least 600, or at least 1500, or at least 2000 Daltons. In certain embodiments, the weight average molecular weight of the functionalized oligomers is up to 20,000, or up to 10,000, or up to 5,000 Daltons.

Condensation Reaction of Functionalized Oligomers to Form Isocyanate-Containing Oligomers.

In a second step, an isocyanate-containing oligomer (i.e., an isocyanate oligomer having at least one isocyanate end group) is prepared by a condensation reaction of the functionalized (i.e., isocyanate-reactive) oligomer with an excess of a polyisocyanate. The reaction product of such condensation reaction is typically a mixture of isocyanate-containing oligomers.

Polyisocyanates include di-isocyanates, tri-isocyanates, and higher functional isocyanates, including polymeric isocyanates. They may be aliphatic (including alicyclic) and cyclic (including aromatic). Examples of diisocyanates include 4,4'-methylenediphenylenediisocyanate (MDI), 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,4'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate; alicyclic diisocyanates such as 3-isocyanatomethyl-3,5,5-trimethylcyclohexylisocyanate; 3-isocyanatomethyl-3,5,5-trimethylcyclohexylisocyanate; aliphatic diisocyanates such as 1,6-hexamethylenediisocyanate, 2,2,4-trimethyl-1,6-hexamethylenediisocyanate, and 1,2-ethylenediisocyanate; cyclic diisocyanates such as isophorone diisocyanate (IPDI) and dicyclohexylmethane-4,4'-diisocyanate. Examples of triisocyanates include aliphatic triisocyanates such as 1,3,6-hexamethylenetriisocyanate and aromatic triisocyanates such as tri-(4-isocyanatophenyl)-methane. An example of a polymeric isocyanate includes polymethylenepolyphenylisocyanate (PAPI). An example of an aliphatic polyisocyanate is available under the tradename Desmodur N 100 from Bayer MaterialScience LLC, Pittsburgh, Pa., which is based on hexamethylene diisocyanate (HDI).

Particularly suitable isocyanates are aromatic isocyanates, including MDI and PAPI.

In addition to the functionalized (isocyanate-reactive) oligomer, at least one additional isocyanate-reactive compound may be used in making the isocyanate-containing oligomers.

Such additional isocyanate-reactive compounds may include: a hydrocarbon group (in certain embodiments, a linear or branched hydrocarbon group, and in certain embodiments, a linear hydrocarbon group) having 2 to 60 carbon atoms; a polydimethylsiloxane segment having a weight average molecular weight of at least 200; a divalent polyoxyalkylene group comprising 2 to 100 alkylene oxide repeating units, wherein the alkyleneoxide unit has 2 to 10 carbon atoms; or a combination thereof.

Such additional isocyanate-reactive compounds are typically compounds containing one, two, or more isocyanate-reactive groups and include mono-, di-, and poly-functional alcohols, thiols, and amines. The additional isocyanate-reactive compounds are non-fluorinated. A single compound or a mixture of different compounds may be used.

Examples include alkanols, such as methanol, ethanol, n-propylalcohol, isopropyl alcohol, n-butyl alcohol, isobutyl alcohol, t-butyl alcohol, n-amyl alcohol, t-amyl alcohol, 2-ethylhexanol, glycidol, (iso)stearyl alcohol, behenyl alcohol, branched long chain alkanols, such as ISOFOL alcohols (2-alkyl alkanols having C-14 to C-32 alkyl chains, available from Sasol, Germany), alcohols comprising poly(oyalkylene) groups, such as methyl or ethyl ether of polyethyleneglycol, hydroxyl-terminated methyl or ethyl ether of random or block copolymer of ethyleneoxide and/or propyleneoxide and polysiloxane (e.g., polydimethylsiloxane) group-containing alcohols. Further examples include diols, triols, and polyols such as 1,4-butanediol, 1,6-hexanediol, 1-10-decanediol, 4,4'-isopropylidene diphenol (Bisphenol A), glycerol, pentaerythritol, dipentaerythritol; polyester diols, such as polycaprolactone diol, fatty acid dimer diols and poly(oxy)alkylenediols with an oxyalkylene group having 2 to 4 carbon atoms, such as —OCH$_2$CH$_2$—, —O(CH$_2$)$_4$—, —OCH$_2$CH$_2$CH$_2$—, —OCH(CH$_3$)CH$_2$—, and —OCH(CH$_3$)CH(CH$_3$)— (the oxyalkylene units in said poly(oxyalkylene) may be the same, as in polypropyleneglycol, or present as a mixture), and ester diols, such as glycerol monostearate and polysiloxane-containing (e.g., polydimethylsiloxane-containing) diols.

Further suitable isocyanate-reactive compounds include amino-containing compounds, such as octadecylamine, di(octadecyl)amine, 1,6-hexamethylenediamine, amino-terminated polyethyleneoxide or propyleneoxide or copolymers thereof, amino-terminated methyl or ethylethers of polyethyleneoxide or polypropyleneoxide or copolymers thereof and amino group-terminated polysiloxanes, for example, polydimethylsiloxanes.

Still further suitable isocyanate-reactive compounds include thiol-containing compounds, such as octadecylmercaptan, dodecylmercaptan, octadecylmercaptopropionate, 1,4-butanedithiol, and 1,6-hexanedithiol.

In certain embodiments, the additional isocyanate-reactive difunctional compound has the following formula:

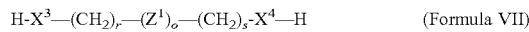

H-X$^3$—(CH$_2$)$_r$—(Z$^1$)$_o$—(CH$_2$)$_s$-X$^4$—H     (Formula VII)

In Formula VII, X$^3$ and X$^4$ are independently S, —NH, —N(R$^{10}$) or O, wherein R$^0$ is a hydrocarbon group (in certain embodiments, an alkyl group) having 1 to 20 carbon atoms. Examples of R$^{10}$ hydrocarbon groups include alkyl groups such as methyl, ethyl, decyl, octadecyl, and the like.

In Formula VII, r and s are independently integers from 1 to 12 (and in certain embodiments, 1 to 10).

In Formula VII, o is 0 or 1.

In Formula VII, Z$^1$ is selected from: a branched or straight chain alkylene group having 1 to 20 carbon atoms; a divalent polydimethylsiloxane group comprising 2 to 100 dimethylsiloxane repeating units; a divalent alkylene oxide group comprising 2 to 100 alkylene oxide repeating units; and a combination thereof. Examples of branched or straight chain alkylene groups include —C$_2$H$_4$—, —C$_3$H$_6$—, —C$_4$H$_8$—, and the like. Examples of divalent polydimethylsiloxane groups include —CH$_2$CH$_2$CH$_2$(Si(CH$_3$)$_2$O)$_q$—CH$_2$CH$_2$CH$_2$—, wherein q is an integer from 2 to 100. Examples of divalent alkylene oxide groups include —(CH$_2$CH$_2$O)$_q$—, wherein q is an integer from 2 to 100.

Examples of compounds of Formula VII include ethyleneglycol, 1,10-decanediol, 1,6-hexamethylenediamine, polyethyleneglycols with molecular weight (MW) of 200 to 1000, and the like.

The isocyanate-reactive compounds may be used alone or in combination. An isocyanate-reactive compound can be present in an amount of up to 50 mole-%, up to 40 mole-%, up to 30 mole-%, or up to 20 mole-%, based on the total amount of isocyanate functionalities. If used, an isocyanate-reactive compound can be present in an amount of at least 5 mole-%, or up to 10 mole-%, based on the total amount of isocyanate functionalities.

This second step of forming the isocyanate-containing oligomer by a condensation reaction may be carried out under conventional conditions well-known to those skilled in the art. In certain embodiments, the condensation reaction is carried out under dry conditions in a polar solvent such as ethylacetate, acetone, methyl isobutyl ketone, and the like. Suitable reaction temperatures will be easily determined by those skilled in the art based on the particular reagents, solvents, and catalysts being used. While it is not practical to enumerate particular temperatures suitable for all situations, generally suitable temperatures are room temperature to 120° C.

In certain embodiments the condensation reaction is carried out without catalyst present. In certain embodiments the condensation reaction is carried out with catalyst present;

these catalyst are well known to those skilled in the art and include, for example, tin-catalysts, such as dibutyltindilaurate or tinoctoate.

In certain embodiments, the weight average molecular weight of the isocyanate-containing oligomers is at least 600, at least 1500, or at least 2000 Daltons. In certain embodiments, the weight average molecular weight of the isocyanate-containing oligomers is up to 20,000, up to 10,000, or up to 5,000 Daltons.

The condensation reaction typically results in a mixture of isocyanate-containing oligomers. These compounds may be used directly in a treating composition of the present disclosure, or they may be blocked and then used in a treating composition of the present disclosure.

Optional Isocyanate Blocking Agents.

In certain embodiments, Component B can have blocked isocyanate groups. Such blocked isocyanate groups are the result of a reaction of an isocyanate blocking agent with an isocyanate group.

Such blocked isocyanates are particularly preferred because they impart a durable property when such blocked compound is applied to a fibrous substrate. This is generally because the blocking agent is removable from the isocyanate under the thermal conditions employed upon curing a fibrous substrate treated with a compound containing the blocked isocyanato group.

Conventional isocyanate blocking agents include arylalcohols (e.g., phenol, cresols, nitrophenols, o- and p-chlorophenol, naphthols, 4-hydroxybiphenyl); $C_2$ to $C_8$ alkanone oximes (e.g., acetoneoxime, butanoneoxime); arylthiols (e.g., thiophenol); organic active hydrogen compounds (e.g., diethyl malonate, acetylacetone, ethyl acetoacetate, ethyl cyanoacetate, epsilon-caprolactam); sodium bisulfite; and hydroxylamine.

Particularly preferred blocked isocyanates include those blocked with oxime isocyanate blocking agents such as $C_2$ to $C_8$ alkanone oximes, particularly butanoneoxime. That is, preferred blocked isocyanate groups are oxime-derived groups. Such blocked isocyanates can be de-blocked at a relatively low temperature, for example, during the process of curing a fibrous substrate that has been treated with the compound comprising the blocked isocyanate group.

Various combinations of blocking agents can be used if desired to make compounds of the disclosure. In certain embodiments, if blocking agents are used, up to 70%, or up to 60%, of isocyanate equivalents are blocked by one or more blocking groups. In certain embodiments, if blocking agents are used, at least 10%, or at least 20%, or at least 30%, or at least 40%, of isocyanate equivalents are blocked by one or more blocking groups This blocking step of blocking the isocyanate-containing oligomer under conventional conditions is well-known to those skilled in the art. In certain embodiments, the blocking reaction is carried out under dry conditions in a polar solvent such as ethylacetate, acetone, methyl isobutyl ketone, and the like. Suitable reaction temperatures will be easily determined by those skilled in the art based on the particular reagents, solvents, and catalysts being used. While it is not practical to enumerate particular temperatures suitable for all situations, generally suitable temperatures are room temperature to 120° C.

Preparation and structure of the Component B compounds are further elaborated in International Publication No. WO2016/130503, which published on Aug. 18, 2016.

Component C Polycarbodiimides and Preparation Thereof

Component C includes one or more polycarbodiimide compounds (i.e., a compound that includes one or more groups of the formula (N=C=N)). In certain embodiments, the one or more polycarbodiimide compounds of Component C are derived from a carbodiimidization reaction, in one or more steps, of components comprising:

(i) at least one isocyanate-reactive (i.e., functionalized) oligomer comprising 2 to 20 repeating units, or an alcohol having at least one linear or branched hydrocarbon group having from 16 to 40 carbon atoms and optionally one or more ester groups;

(ii) at least one polyisocyanate; and (iii) optionally at least one additional isocyanate-reactive compound;

wherein the isocyanate-reactive oligomer is made by the radical-initiated reaction of at least one (meth)acrylate monomer in the presence of at least one mercaptan (which may or may not be functionalized as described above with respect to Component B), wherein the at least one (meth) acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms). In certain embodiments of this reaction mixture of the isocyanate-reactive oligomer for making the one or more polycarbodiimide compounds of Component C, the at least one (meth)acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms) and at least one isocyanate-derived group.

Polycarbodiimide compounds made this way may include compounds with end groups that are not both a hydrocarbon group from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms).

Typically, a polycarbodiimide compound of the present disclosure, or mixtures thereof, may be prepared in a three-step reaction, although it will generally not be required to separate reaction products after the individual steps. That is, the reaction may be carried out in three steps in a single reactor.

In certain embodiments, an alcohol having at least one linear or branched hydrocarbon group having from 16 to 40 carbon atoms and optionally one or more ester groups (e.g., ISOFOL 28, ISOFOL 32, ISOFOL 36, UNILIN 350, sorbitan tristearate, and the reaction product of 1 mol citric acid and 3 moles of stearyl alcohol) is reacted with an isocyanate to form an isocyanate-containing compound. In a second step, the isocyanate-containing compound is further reacted in a carbodiimidization reaction to form a carbodiimide.

In certain embodiments, in a first step, a functionalized oligomer having at least two repeating units is prepared. In a second step, this functionalized oligomer is reacted with an isocyanate to form an isocyanate-containing oligomer (i.e., an oligomer having at least one isocyanate end group and at least two repeating units). Thus, the term "functionalized oligomer" means an oligomer that contains a functional group capable of reacting with an isocyanate. In a third step, the isocyanate-containing oligomer (i.e., oligomer with isocyanate end groups) is further reacted in a carbodiimidization reaction to form a polycarbodiimide. Thus, the reaction product of the second step, i.e., the oligomer that includes at least one isocyanate end group and at least two repeating units, may be formed in the reaction mixture without being isolated (i.e., it is formed in situ).

The isocyanate-reactive oligomers (i.e., functionalized oligomers) used for making the one or more polycarbodiimide compounds of Component C can be made as described above for Component B using (meth)acrylate monomers as described above for Component A. Also, the isocyanate-containing oligomers (i.e., oligomers with isocyanate end groups) that further undergo a carbodiimidization reaction can be made as described above for Component B.

In certain embodiments, the polycarbodiimides of the present invention may be made by following exemplary reaction scheme:

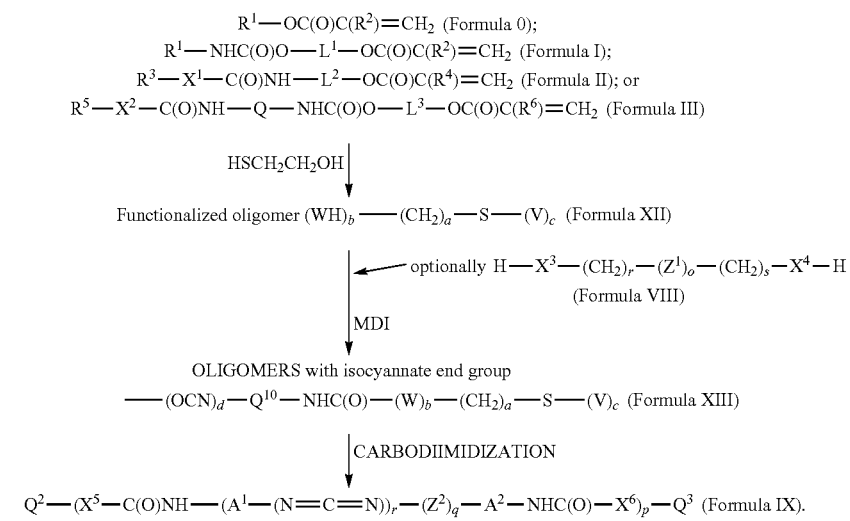

In this schematic, which is exemplary only and not intended to be representative of all embodiments herein, the structures for Formulas 0, I, II, and III are defined above, the structures for Formulas VIII and IX are defined below, and in the structures of Formulas XII and XIII the following apply:

W is independently NH, N($R^6$), or O wherein $R^6$ is a hydrocarbon group (in certain embodiments, a linear or branched hydrocarbon group, and certain embodiments, a linear hydrocarbon group) having 1 to 20 carbon atoms;

S is sulfur;

V is selected from:
$R^1$—OC(O)CH($R^2$)—CH$_2$—;
$R^1$—NHC(O)O-$L^1$-OC(O)CH($R^2$)—CH$_2$—;
$R^3$—$X^1$—C(O)NH-$L^2$-OC(O)CH($R^4$)—CH$_2$—;
$R^5$—$X^2$—C(O)NH-$Q^1$-NHC(O)O-$L^3$-OC(O)CH($R^6$)—CH$_2$—; and
a combination thereof;

a is an integer from 1 to 10;
b is an integer from 1 to 5;
c is an integer from 2 to 20;
d is an integer from 1 to 5;

$R^1$, $R^3$, and $R^5$ are independently a hydrocarbon group (in certain embodiments, a linear or branched hydrocarbon group, and in certain embodiments, a linear hydrocarbon group) having from 1 to 60 carbon atoms, or from 4 to 60 carbon atoms, or from 12 to 60 carbon atoms, or from 12 to 50 carbon atoms, or from 12 to 40 carbon atoms, or from 16 to 40 carbon atoms (in certain embodiments, $R^1$, $R^3$, and $R^5$ are straight chain (i.e., linear) hydrocarbon groups);

$R^2$, $R^4$, and $R^6$ are independently H or CH$_3$;

$L^1$, $L^2$, and $L^3$ are independently a branched or straight chain alkylene group having 2 to 10 carbon atoms, an arylene group (in certain embodiments, an arylene group having 5 to 12 carbon atoms), or a combination thereof;

$X^1$ and $X^2$ are independently O, S, —NH, or —N($R^7$), wherein $R^7$ is a hydrocarbon group (in certain embodiments, a linear or branched hydrocarbon group, and in certain embodiments, a linear hydrocarbon group) having 1 to 20 carbon atoms; and $Q^1$ and $Q^{10}$ are independently an isocyanate residue.

In a first step to make the polycarbodiimide compounds of Component C, a functionalized oligomer having at least two repeating units is prepared. Embodiments and method of making such functionalized oligomers are as disclosed above with respect to Component B.

The oligomerization reaction to form a functionalized oligomer may be carried out in a wide variety of solvents suitable for organic free-radical reactions. Particularly suitable solvents are solvents that do not interfere with the isocyanate reactions in the subsequent steps to form the polycarbodiimide. The reactants can be present in the solvent at any suitable concentration, e.g., from about 5 percent to about 90 percent by weight, based on the total weight of the reaction mixture. Examples of suitable solvents include aliphatic and alicyclic hydrocarbons (e.g., hexane, heptane, cyclohexane), ethers (e.g., diethylether, glyme, diglyme, diisopropyl ether), esters (e.g., ethylacetate, butylacetate), ketones (e.g., acetone, methylethyl ketone, methyl isobutyl ketone), and mixtures thereof.

The oligomerization reaction to form a functionalized oligomer can be carried out at a temperature suitable for conducting a free-radical oligomerization reaction. Particular temperatures and solvents for use can be easily selected by those skilled in the art based on considerations such as the solubility of reagents, the temperature required for the use of a particular initiator, molecular weight desired, and the like. While it is not practical to enumerate a particular temperature suitable for all initiators and all solvents, generally suitable temperatures are 30° C. to 150° C. In certain embodiments, the temperature is 55° C. to 90° C., or 75° C. to 80° C. Reaction times typically are within 1 to 24 hours, and often within 4 to 15 hours.

In a second step, the isocyanate-reactive oligomer is reacted with an excess of a polyisocyanate. Polyisocyanates can be di-, tri-, or higher functional isocyanates. Polyisocyanates may also include polymeric compounds with 4 or more isocyanates or nonpolymeric compounds with 4 or more isocyanates. The reaction product of such condensation reaction is typically a mixture of isocyanate-containing oligomers.

Examples of diisocyanates include 4,4'-methylenediphenylenediisocyanate (MDI), 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,4'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate; alicyclic diisocyanates such as 3-isocyanatomethyl-3,5,5-trimethyl-cyclohexylisocyanate; 3-isocyanatomethyl-3,5,5-trimethyl-cyclohexylisocyanate; aliphatic diisocyanates such as 1,6-hexamethylenediisocyanate, 2,2,4-trimethyl-1,6-hexamethylenediisocyanate, and 1,2-ethylenediisocyanate; cyclic diisocyanates such as isophorone diisocyanate (IPDI) and dicyclohexylmethane-4,4'-diisocyanate. Examples of triisocyanates include aliphatic triisocyanates such as 1,3,6-hexamethylenetriisocyanate and aromatic triisocyanates such as tri-(4-isocyanatophenyl)-methane. Examples of polymeric isocyanates include polymethylenepolyphenylisocyanate (PAPI).

Particularly suitable isocyanates are aromatic isocyanates, including MDI and PAPI. Particularly suitable diisocyanates are aromatic isocyanates, including MDI.

In certain embodiments, in addition to the functionalized (isocyanate-reactive) oligomer, at least one additional isocyanate-reactive compound may be used in making the isocyanate-containing oligomers. In certain embodiments, up to 50 weight percent (wt-%), or up to 30 wt-%, or up to 20 wt-%, based on the weight of the reactant solids, of such isocyanate-reactive compounds may be used in making the isocyanate-containing oligomers and resultant polycarbodiimides.

Such additional isocyanate-reactive compounds may include: a hydrocarbon group (in certain embodiments, a linear or branched hydrocarbon group, and in certain embodiments, a linear hydrocarbon group) having 2 to 60 carbon atoms; a polydimethylsiloxane segment having a weight average molecular weight of at least 200; a divalent polyoxyalkylene group comprising 2 to 100 alkylene oxide repeating units, wherein the alkyleneoxide unit has 2 to 10 carbon atoms; or a combination thereof.

Such additional isocyanate-reactive compounds are typically compounds containing one or two isocyanate-reactive groups and include mono- and di-, tri-, and poly-functional alcohols, thiols, and amines. The additional isocyanate-reactive compounds are non-fluorinated. A single compound or a mixture of different compounds may be used.

Examples include alkanols, such as methanol, ethanol, n-propylalcohol, isopropyl alcohol, n-butyl alcohol, isobutyl alcohol, t-butyl alcohol, n-amyl alcohol, t-amyl alcohol, 2-ethylhexanol, glycidol, (iso)stearyl alcohol, behenyl alcohol, branched long chain alkanols, such as ISOFOL alcohols (2-alkyl alkanols having C-14 to C-32 alkyl chains, available from Sasol, Germany), alcohols comprising poly(oyalkylene) groups, such as methyl or ethyl ether of polyethyleneglycol, hydroxyl-terminated methyl or ethyl ether of random or block copolymer of ethyleneoxide and/or propyleneoxide and polysiloxane (e.g., polydimethylsiloxane) group-containing alcohols. Further examples include diols, such as 1,4-butanediol, 1,6-hexanediol, 1-10-decanediol, 4,4'-isopropylidene diphenol (Bisphenol A), glycerol, pentaerythritol, dipentaerythritol; polyester diols, such as polycaprolactone diol, fatty acid dimer diols and poly(oxy) alkylenediols with an oxyalkylene group having 2 to 4 carbon atoms, such as —OCH$_2$CH$_2$—, —O(CH$_2$)$_4$—, —OCH$_2$CH$_2$CH$_2$—, —OCH(CH$_3$)CH$_2$—, and —OCH(CH$_3$)CH(CH$_3$)— (the oxyalkylene units in said poly(oxyalkylene) may be the same, as in polypropyleneglycol, or present as a mixture), and ester diols, such as glycerol monostearate and polysiloxane-containing (e.g., polydimethylsiloxane-containing) diols.

Further suitable isocyanate-reactive compounds include amino-containing compounds, such as octadecylamine, di(octadecyl)amine, 1,6-hexamethylenediamine, amino-terminated polyethyleneoxide or propyleneoxide or copolymers thereof, amino-terminated methyl or ethylethers of polyethyleneoxide or polypropyleneoxide or copolymers thereof and amino group-terminated polysiloxanes, for example, polydimethylsiloxanes.

Still further suitable isocyanate-reactive compounds include thiol-containing compounds, such as octadecylmercaptan, dodecylmercaptan, octadecylmercaptopropionate, 1,4-butanedithiol, and 1,6-hexanedithiol.

In certain embodiments, the additional isocyanate-reactive difunctional compound has the following formula:

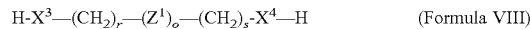
H-X$^3$—(CH$_2$)$_r$—(Z$^1$)$_o$—(CH$_2$)$_s$-X$^4$—H    (Formula VIII)

In Formula VIII, X$^3$ and X$^4$ are independently S, —NH, —N(R$^{10}$), or O, wherein R$^{10}$ is a hydrocarbon group (in certain embodiments, an alkyl group) having 1 to 20 carbon atoms. Examples of R$^{10}$ hydrocarbon groups include alkyl groups such as methyl, ethyl, decyl, octadecyl, and the like.

In Formula VIII, r and s are independently integers from 1 to 12 (and in certain embodiments, 1 to 10).

In Formula VIII, o is 0 or 1.

In Formula VIII, Z$^1$ is selected from: a branched or straight chain alkylene group having 1 to 20 carbon atoms; a divalent polydimethylsiloxane group comprising 2 to 100 dimethylsiloxane repeating units; a divalent alkylene oxide group comprising 2 to 100 alkylene oxide repeating units; and a combination thereof. Examples of branched or straight chain alkylene groups include —C$_2$H$_4$—, —C$_3$H$_6$—, —C$_4$H$_8$—, and the like. Examples of divalent polydimethylsiloxane groups include —CH$_2$CH$_2$CH$_2$(Si(CH$_3$)$_2$O)$_q$—CH$_2$CH$_2$CH$_2$—, wherein q is an integer from 2 to 100. Examples of divalent alkylene oxide groups include —(CH$_2$CH$_2$O)$_q$—, wherein q is an integer from 2 to 100.

Examples of compounds of Formula VIII include ethyleneglycol, 1,10-decanediol, 1,6-hexamethylenediamine, polyethyleneglycols with MW of 200 to 1000, and the like.

The isocyanate-reactive compounds may be used alone or in combination.

Alternatively, isocyanate-reactive compounds, such as the difunctional compounds of Formula VIII may be consumed in a carbodimidization reaction (step 3, discussed below).

This second step of forming the isocyanate-containing oligomer by a condensation reaction may be carried out under conventional conditions well-known to those skilled in the art. In certain embodiments, the condensation reaction is carried out under dry conditions in a polar solvent such as ethylacetate, acetone, methyl isobutyl ketone, and the like. Suitable reaction temperatures will be easily determined by those skilled in the art based on the particular reagents, solvents, and catalysts being used. While it is not practical to enumerate particular temperatures suitable for all situations, generally suitable temperatures are room temperature to 120° C.

In certain embodiments the condensation reaction is carried out without catalyst present. In certain embodiments the condensation reaction is carried out with catalyst present; these catalyst are well known to those skilled in the art and include, for example, tin-catalysts, such as dibutyltindilaurate or tinoctoate.

Carbodiimidization Reaction.

In a third step, polycarbodiimide compounds (Component C) used in the compositions of the present disclosure may be formed by a carbodiimidization reaction in the presence of a suitable catalyst.

Representative examples of suitable catalysts are described, for example, in U.S. Pat. Nos. 2,941,988, 3,862,989, and 3,896,251. Examples include 3-methyl-1-phenyl-2-phospholene-1-oxide (MPPO), 1-ethyl-3-phospholine, 1-ethyl-3-methyl-3-phospholine-1-oxide, 1-ethyl-3-methyl-3-phospholine-1-sulfide, 1-ethyl-3-methyl-phospholidine, 1-ethyl-3-methyl-phospholidine-1-oxide, 3-methyl-1-phenyl-3-phospholine-1-oxide and bicyclic terpene alkyl or hydrocarbyl aryl phosphine oxide or camphene phenyl phosphine oxide.

The particular amount of catalyst used will depend to a large extent on the reactivity of the catalyst itself and the isocyanate. A concentration range of 0.05-5 parts of catalyst per 100 parts of oligomer having at least one isocyanate group is generally suitable.

This third step of carbodiimidization may be carried out under conventional conditions well-known to those skilled in the art. In certain embodiments, the carbodiimidication reaction is carried out under dry conditions in a polar solvent such as ethylacetate, acetone, methyl isobutyl ketone, and the like. Suitable reaction temperatures will be easily determined by those skilled in the art based on the particular reagents, solvents, and catalysts being used. While it is not practical to enumerate particular temperatures suitable for all situations, generally suitable temperatures are 70° C. to 100° C. In certain embodiments, the reaction is carried out at a temperature of 75° C. to 95° C.

In one embodiment of the three step process, steps 2 and 3 are carried out at the same time. That is, the condensation reaction (step 2) and carbodiimide reaction (step 3) are done at the same time.

In certain embodiments, a polycarbodiimide compound has the following formula:

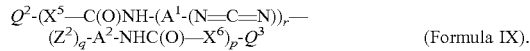

(Formula IX).

In Formula IX, $X^5$ and $X^6$ are independently S, —NH, —N($R^{11}$), or O, wherein $R^{11}$ is a hydrocarbon group (e.g., an alkyl group) having 1 to 20 carbon atoms. In certain embodiments of Formula IX, $X^5$ and $X^6$ are independently —NH, —N($R^{11}$), or O, wherein $R^{11}$ is a hydrocarbon group (e.g., an alkyl group) having 1 to 20 carbon atoms. Examples of $R^{11}$ alkyl groups include methyl, ethyl, octyl, and octadecyl. In certain embodiments of Formula IX, $X^5$ and $X^6$ are both O (oxygen).

In Formula IX, $A^1$ and $A^2$ are independently the residue of an organic diisocyanate compound obtained by removing the isocyanate groups therefrom. Examples of such diisocyanates include 4,4'-methylenebis(phenyl isocyanate), polymethylene polyphenylisocyanate, or 2,4-toluene diisocyanate. In certain embodiments of Formula IX, $A^1$ and $A^2$ are independently the residue of an organic diisocyanate compound selected from 4,4'-methylenebis(phenyl isocyanate), polymethylene polyphenylisocyanate, and a mixture thereof. In this context, a "residue" is obtained by removing the isocyanate groups form the organic diisocyanate compounds. In certain embodiments of Formula IX, $A^1$ and $A^2$ are independently the residue of 4,4'-methylenebis(phenyl isocyanate) obtained by removing the isocyanate groups therefrom.

In Formula IX, q=0 or 1. In certain embodiments, q is 0.

In Formula IX, p is an integer from 1 to 10. In certain embodiments, p is 1.

In Formula IX, r is an integer from 1 to 20. In certain embodiments of Formula IX, r is an integer from 2 to 10. In certain embodiments, r is an integer from 4 to 10.

In Formula IX, $Z^2$ is a divalent group of the formula:

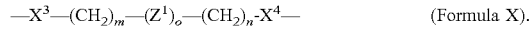

(Formula X).

In Formula X (which is the divalent $Z^2$ group of Formula IX), $X^3$ and $X^4$ are independently S, —NH, —N($R^{11}$), or O, wherein $R^{11}$ is a hydrocarbon group (e.g., an alkyl group) having 1 to 20 carbon atoms. Examples of $R^{11}$ alkyl groups include methyl, ethyl, octyl, and octadecyl.

In Formula X (which is the divalent $Z^2$ group of Formula IX), m and n are independently integers from 1 to 12 (and in certain embodiments, 1 to 10).

In Formula X (which is the divalent $Z^2$ group of Formula IX), o is 0 or 1.

In Formula X (which is the divalent $Z^2$ group of Formula IX), $Z^1$ is selected from: a branched or straight chain alkylene group having 1 to 20 carbon atoms; a divalent polydimethylsiloxane group comprising 2 to 100 dimethylsiloxane repeating units; a divalent alkylene oxide group comprising 2 to 100 alkylene oxide repeating units; and a combination thereof.

In Formula IX, $Q^2$ and $Q^3$ are independently selected from: a hydrocarbon group (in certain embodiments, a linear or branched hydrocarbon group) having at least 2, at least 4, at least 8, at least 16, or at least 18, carbon atoms (and in certain embodiments up to 60 carbon atoms, up to 50 carbon atoms, up to 40 carbon atoms, or up to 30 carbon atoms); and a group having the formula:

(Formula XI).

In certain embodiments of compounds of Formula IX, $Q^2$ and $Q^3$ are independently a hydrocarbon group (in certain embodiments, a linear or branched hydrocarbon group) having at least 2 carbon atoms, at least 4 carbon atoms, at least 8 carbon atoms, at least 16 carbon atoms, or at least 18 carbon atoms (and in certain embodiments up to 60 carbon atoms, up to 50 carbon atoms, up to 40 carbon atoms, or up to 30 carbon atoms). Examples of such hydrocarbon groups include an octadecyl (C18) group, isostearyl (C18), an arachidyl (C20) group, a behenyl (C22) group, a lignoceryl (C24) group, a ceryl (C26) group, a montanyl (C28) group, or a myricyl (C30) group, a 2-dodecylhexadecyl (C28 branched) group, a 2-tetradecyloctadecyl (C32 branched) group, long chain linear alkyl groups of 30 to 60 carbon atoms (available under the UNILIN brand). In certain embodiments, such hydrocarbon groups are selected from an octadecyl group, an isostearyl group, a behenyl group, and a 2-tetradecyloctadecyl group.

In certain embodiments of compounds of Formula IX, $Q^2$ and $Q^3$ are independently a group having the formula —(CH$_2$)$_a$—S—U (Formula XI).

In Formula XI (which is one of the $Q^2$ and/or $Q^3$ groups of Formula IX), "a" is an integer from 1 to 10. In certain embodiments, the value of "a" is 2.

In Formula XI (which is one of the $Q^2$ and/or $Q^3$ groups of Formula IX), S is sulfur.

In Formula XI (which is one of the $Q^2$ and/or $Q^3$ groups of Formula IX), U is selected from: an oligomer comprising 2 to 20 repeating units of (meth)acrylate monomers, each repeating unit independently comprising an alkyl group having at least 16 carbon atoms (and in certain embodiments up to 60 carbon atoms, up to 50 carbon atoms, up to 40 carbon atoms, or up to 30 carbon atoms); an oligomer comprising 2 to 20 repeating units of urethane-containing (meth)acrylate monomers, each repeating unit independently comprising an alkyl group having at least 16 carbon atoms (and in certain embodiments up to 60 carbon atoms, up to 50 carbon atoms, up to 40 carbon atoms, or up to 30 carbon atoms); an oligomer comprising 2 to 20 repeating units of urea-containing (meth)acrylate monomers, each repeating unit independently comprising an alkyl group having at least 16 carbon atoms (and in certain embodiments up to 60 carbon atoms, up to 50 carbon atoms, up to 40 carbon atoms, or up to 30 carbon atoms); and a combination thereof.

In Formula XI (which is one of the $Q^2$ and/or $Q^3$ groups of Formula IX), U is an oligomer comprising 2 to 20 repeating units of monomers selected from: isobutyl (meth)acrylate; octadecyl (meth)acrylate; behenyl (meth)acrylate; a (meth)acrylate having up to 30 carbon atoms in a hydrocarbon chain; the reaction product of octadecyl isocyanate with 4-hydroxybutyl (meth)acrylate; the reaction product of octadecyl isocyanate with 2-hydroxyethyl (meth)acrylate; the reaction product of octadecyl isocyanate with 3-hydroxypropyl (meth)acrylate; the reaction product of octadecanol with 2-isocyanatoethyl (meth)acrylate; the reaction product of behenyl alcohol with 2-isocyantoethyl (meth)acrylate; the reaction product of 2,4-toluenediisocyanate with octadecanol and 2-hydroxyethyl (meth)acrylate; the reaction product of 2,4-toluenediisocyanate with behenyl alcohol and 2-hydroxyethyl (meth)acrylate; the reaction product of 2,4-toluenediisocyanate with octadecanol and 4-hydroxybutyl (meth)acrylate; the reaction product of 2,4-toluenediisocyanate with behenyl alcohol and 4-hydroxybutyl (meth)acrylate; the reaction product of 2,4-toluenediisocyanate with octadecanol and 3-hydroxypropyl (meth)acrylate; the reaction product of 2,4-toluenediisocyanate with behenyl alcohol and 3-hydroxypropyl (meth)acrylate; and a combination thereof.

In Formula XI (which is one of the $Q^2$ and/or $Q^3$ groups of Formula IX), U is an oligomer comprising 2 to 20 repeating units of monomers selected from octadecyl (meth)acrylate, behenyl (meth)acrylate, 2-tetradecyloctadecyl (meth)acrylate, and a combination thereof.

In certain embodiments, U is an oligomer of 4 to 20 repeating units of octadecyl (meth)acrylate.

In certain embodiments, U is an oligomer of 4 to 20 repeating units of the reaction product of octadecanol with 2-isocyanato ethyl (meth)acrylate.

In certain embodiments of Formula XI (which is one of the $Q^2$ and/or $Q^3$ groups of Formula IX), U is an oligomer of 4, 6, 8, 10, or 12 acrylate monomers represented by the formula:

$R^3$—NHC(O)O-$L^1$-OC(O)C($R^2$)=CH$_2$ (Formula I), wherein:
$R^3$ is a hydrocarbon group (in certain embodiments, a linear or branched hydrocarbon group, and in certain embodiments, a linear hydrocarbon group) having 18 carbon atoms;
$L^1$ is an alkylene group with 2 carbon atoms; and
$R^2$ is H.

In certain embodiments, a polycarbodiimide compound of Formula IX may be used in a treating composition or method, wherein: $X^5$ and $X^6$ are each O; $A^1$ and $A^2$ are each the residue of 4,4'-methylenebis(phenyl isocyanate) obtained by removing the isocyanate groups therefrom; q=0; p is 1; r is an integer from 4 to 10; and $Q^2$ and $Q^3$ independently have the formula (CH$_2$)$_a$—S—U (Formula XI), wherein a is 2, S is sulfur, and U is an oligomer of 4 to 20 repeating units of octadecyl (meth)acrylate.

In certain embodiments, a polycarbodiimide compound of Formula IX may be used in a treating composition or method, wherein: $X^5$ and $X^6$ are each O; $A^1$ and $A^2$ are each the residue of 4,4'-methylenebis(phenyl isocyanate) obtained by removing the isocyanate groups therefrom; q=0; p is 1; r is an integer from 4 to 10; and $Q^2$ and $Q^3$ independently have the formula (CH$_2$)$_a$—S—U (Formula XI), wherein a is 2, S is sulfur, and U is an oligomer of 4 to 20 repeating units of the reaction product of octadecanol with 2-isocyanato ethyl (meth)acrylate.

Specific examples of polycarbodiimide compounds of Formula IX may be derived from a carbodiimidization reaction of an isocyanage-containing oligomer that includes at least one isocyanate end group and at least two repeating units, wherein each of the repeating units includes at least one hydrocarbon group (in certain embodiments, a linear or branched hydrocarbon group, and in certain embodiments, a linear hydrocarbon group) having 1 to 60, preferably 4 to 60, more preferably 12 to 60, and even more preferably 16 to 40 carbon atoms. Such oligomer with isocyanate end groups may be made from a diisocyanate and an isocyanate-reactive acrylate oligomer in the presence of a catalyst that causes subsequent carbodiimidization. In such examples, the oligomer that includes at least one isocyanate end group and at least two repeating units is formed in the reaction mixture without being isolated (i.e., it is formed in situ).

For example, a polycarbodiimide compound may be made from a carbodiimidization reaction of reaction product(s) of 4,4'-methylenebis(phenyl isocyanate) (MDI) and a functionalized acrylate oligomer. Such isocyanate and functionalized acrylate oligomer may be present in the reaction mixture in a molar ratio of 2:1 to 10:1.

Examples of functionalized acrylate oligomers used to make the isocyanate-containing oligomer include those made, for example, by reaction of an oligomerization reaction mixture comprising: (1) mercaptoethanol and octadecyl (meth)acrylate in a molar ratio of 1:4 to 1:20; (2) mercaptoethanol and a reaction product of octadecyl isocyanate (i.e., stearyl isocyanate) with 2-hydroxyethyl (meth)acrylate, wherein the mercaptoethanol and the reaction product (e.g., 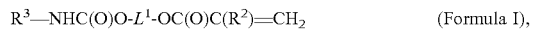) are reacted in a molar ratio of 1:4 to 1:20; and (3) mercaptoethanol and a reaction product of octadecanol (i.e., stearyl alcohol) with 2-isocyanato ethyl (meth)acrylate, wherein the mercaptoethanol and the reaction product (a monomer of Formula III, $R^4$—$X^1$—C(O)NH-$L^2$-OC(O)C($R^2$)=CH$_2$, wherein $R^4$ is stearyl, $X^1$=O, $L^2$=ethyl, and $R^2$=H) are reacted in a molar ratio of 1:4 to 1:20.

Preparation and some structures of the Component C compounds are further elaborated in International Publication No. WO2016/130352, which published on Aug. 18, 2016.

Treating Compositions

A treating composition includes Component A and at least one of Components B and C, used as an aqueous composition, in particular, an aqueous dispersion in water. That is, in certain compositions, treating compositions include Component A and Component B and/or Component C, used as an aqueous composition, in particular, an aqueous dispersion in water.

Components A and B, Components A and C, or Components A, B, and C, may be dispersed in water using a surfactant or mixture of surfactants in an amount sufficient to stabilize the dispersion. If one or more of the components (e.g., the oligomers of Component B) are made in solution in a solvent, it can be dispersed in water through vigorously mixing and homogenizing with the help of a surfactant or emulsifier and subsequent homogenization, for example, by a Manton Gaulin homogenizer or ultrasound homogenizer. An organic solvent-free dispersion can then be obtained by subsequent distillation of the solvent.

A typical dispersion will contain water in an amount of 70 to 20000 parts by weight based on 100 parts by weight of Components A and B and/or C. In certain embodiments, the surfactant or mixture of surfactants is present in an amount of 1 to 25 parts by weight, or 5 to 15 parts by weight, based on 100 parts by weight of Components A and B and/or C.

Treating compositions of the present disclosure can include conventional cationic, nonionic, anionic, and/or zwitterionic (i.e., amphoteric) surfactants (i.e., emulsifiers). A mixture of surfactants may be used, e.g., containing nonionic and ionic surfactants. Suitable nonionic surfactants can have high or low HLB values, such as TERGITOL's, TWEEN's, and the like. Suitable cationic surfactants include mono- or bi-tail ammonium salts. Suitable anionic surfactants include sulfonic and carboxylic aliphatic compounds and their salts, such as sodium dodecylbenzene sulphonate (available from Rhodia, France), and the like. Suitable amphoteric surfactants include cocobetaines, sulphobetaines, amine-oxides, and the like.

In certain embodiments, surfactants suitable for use in the treating compositions of the present disclosure are described in International Publication No. WO 2013/162704.

A treating composition of the present disclosure may include at least one paraffin wax. In certain embodiments, the paraffin wax has a melting point of 40° C. to 75° C. In certain embodiments, the paraffin wax has a melting point of 60° C. to 75° C.

When present in a treating composition of the present disclosure, the total amount of one or more paraffin waxes is an amount of 30 wt-% to 70 wt-%, and the total amount of one or more isocyanate-containing or blocked isocyanate-containing oligomers or mixture of such compounds is an amount of 30 wt-% to 70 wt-%. In certain embodiments, the total amount of one or more paraffin waxes is an amount of 50 wt-% to 70 wt-%, and the total amount of one or more isocyanate-containing or blocked isocyanate-containing oligomers or mixture of such compounds is an amount of 30 wt-% to 50 wt-%. These amounts are based on the total weight of a treating composition (in a ready-to-use or a concentrated form).

Also, treating compositions of the present disclosure may further include one or more of a coalescing solvent, an anti-freeze solvent, an emulsifier, or a stabilizer against one or more microorganisms.

In certain preferred embodiments, a fluorine-free treating composition of the present disclosure includes:

Component (A) comprising one or more polymeric compounds derived from the polymerization of at least one (meth)acrylate monomer of the following formulas:

$$R^1\text{—OC(O)—C}(R^2)\text{=CH}_2 \qquad \text{(Formula 0); or}$$

$$R^1\text{—NH—C(O)O-}L^1\text{-OC(O)C}(R^2)\text{=CH}_2 \qquad \text{(Formula I);}$$

wherein:
each $R^1$ is independently a straight chain hydrocarbon group having from 12 to 60 carbon atoms (in some embodiments, from 12 to 50 carbon atoms, or from 12 to 40 carbon atoms, or from 16 to 40 carbon atoms);
each $R^2$ is independently H or $CH_3$; and
$L^1$ is a branched or straight chain alkylene group having 2 to 10 carbon atoms, an arylene group (in certain embodiments, an arylene group having 5 to 12 carbon atoms), or a combination thereof;
and
Component (C) comprising one or more polycarbodiimide compounds of the following formula:

$$Q^2\text{-}(X^5\text{—C(O)NH-}(A^1\text{-(N=C=N)})_r\text{—}(Z^2)_q\text{-}A^2\text{-NHC(O)—}X^6)_p\text{-}Q^3 \qquad \text{(Formula IX)}$$

wherein:
$X^5$ and $X^6$ are each O;
$A^1$ and $A^2$ each represents the residue of an organic di-isocyanate compound;
q is 0;
p is 1;
r is 3;
$Q^2$ and $Q^3$ are independently selected from:
a hydrocarbon group (in certain embodiments, a linear or branched hydrocarbon group) having at least 2, at least 4, at least 8, at least 16, or at least 18, carbon atoms (and in certain embodiments up to 60 carbon atoms, up to 50 carbon atoms, up to 40 carbon atoms, or up to 30 carbon atoms); and
a group having the formula:

$$\text{—(CH}_2)_a\text{—S—U} \qquad \text{(Formula XI) as described above.}$$

In certain of these embodiments, a fluorine-free treating composition of the present disclosure includes Component (A) as described above and Component (C), wherein $Q^2$ and $Q^3$ are independently a hydrocarbon group (in certain embodiments, a linear or branched hydrocarbon group) having at least 2, at least 4, at least 8, at least 16, or at least 18, carbon atoms (and in certain embodiments up to 60 carbon atoms, up to 50 carbon atoms, up to 40 carbon atoms, or up to 30 carbon atoms).

In certain of these embodiments, a fluorine-free treating composition of the present disclosure includes Component (A) as described above and Component (C) comprising one or more polycarbodiimide compounds of the following formula:

$$Q^2\text{-}(X^5\text{—C(O)NH-}(A^1\text{-(N=C=N)})_r\text{—}(Z^2)_q\text{-}A^2\text{-NHC(O)—}X^6)_p\text{-}Q^3 \qquad \text{(Formula IX)}$$

wherein:
$X^5$ and $X^6$ are each O;
$A^1$ and $A^2$ each represents the residue of an organic di-isocyanate compound;
q is 0;
p is 1;
r is 3;
$Q^2$ is represented by —(CH$_2$)$_a$—S—U (Formula XI), wherein a=2 and U is an oligomer of 4 or 6 acrylate monomers represented by the formula:

$$R^3\text{—NHC(O)O-}L^1\text{-OC(O)C}(R^2)\text{=CH}_2 \qquad \text{(Formula I),}$$

wherein:
$R^3$ is a hydrocarbon group (in certain embodiments, a linear or branched hydrocarbon group, and in certain embodiments, a linear hydrocarbon group) having 18 carbon atoms;
$L^1$ is an alkylene group with 2 carbon atoms; and
$R^2$ is H;

$Q^3$ is either $Q^2$ or a hydrocarbon group (in certain embodiments, a linear or branched hydrocarbon group) with at least 18 carbon atoms (more specifically, e.g., a C18 (n- or iso-stearyl) alcohol residue or a C32 branched alcohol residue).

In such preferred embodiments, the one or more polymeric compounds of Component A may be derived from the polymerization of at least one (meth)acrylate monomer of the following formulas:

$$C_{18}H_{37}\text{—OC(O)C}(R^2)\text{=}CH_2 \qquad \text{(Formula 0a); or}$$

$$C_{18}H_{37}\text{—NH—C(O)O—CH}_2CH_2\text{—}$$
$$\text{OC(O)C}(R^2)\text{=}CH_2 \qquad \text{(Formula Ia);}$$

wherein $R^2$, $R^4$, and $R^6$ are independently H or $CH_3$.

EXEMPLARY EMBODIMENTS

Embodiment 1 is a fluorine-free treating composition (preferably for use in treating a fibrous substrate to be water repellent) comprising:

Component (A) comprising one or more polymeric compounds derived from the polymerization of at least one (meth)acrylate monomer comprising at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms); and at least one of Component (B) and Component (C), wherein:

Component (B) comprises one or more compounds derived from reaction, in one or more steps, of components comprising:

(i) at least one isocyanate-reactive oligomer comprising 2 to 20 repeating units, or an alcohol having at least one linear or branched hydrocarbon group having from 16 to 40 carbon atoms and optionally one or more ester groups;

(ii) at least one polyisocyanate (which may be an aromatic polyisocyanate);

(iii) optionally at least one additional isocyanate-reactive compound; and (iv) optionally at least one isocyanate blocking agent;

wherein the isocyanate-reactive oligomer is made by the radical-initiated reaction of at least one (meth)acrylate monomer in the presence of at least one mercaptan (which may or may not be functionalized), wherein the at least one (meth)acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms); and Component (C) comprises one or more polycarbodiimide compounds.

Embodiment 2 is the fluorine-free treating composition of embodiment 1 comprising:

from 1 wt-% to 99 wt-% of Component A, based on the total weight of Component A and Components B and/or C; and from 1 wt-% to 99 wt-% of Component B, Component C, or both, based on the total weight of Component A and Components B and/or C.

Embodiment 3 is the fluorine-free treating composition of embodiment 2 comprising:

10 wt-% to 90 wt-% of Component A, based on the total weight of Component A and Components B and/or C; and 10 wt-% to 90 wt-% of Component B, Component C, or both, based on the total weight of Component A and Components B and/or C.

Embodiment 4 is the fluorine-free treating composition of embodiment 3 comprising:

20 wt-% to 80 wt-% Component A, based on the total weight of Component A and Components B and/or C; and 20 wt-% to 80 wt-% Component B, Component C, or both, based on the total weight of Component A and Components B and/or C.

Embodiment 5 is the fluorine-free treating composition of embodiment 4 comprising:

40 wt-% to 60 wt-% Component A, based on the total weight of Component A and Components B and/or C; and 40 wt-% to 60 wt-% Component B, Component C, or both, based on the total weight of Component A and Components B and/or C.

Embodiment 6 is the fluorine-free treating composition of any of the previous embodiments wherein the one or more polymeric compounds of Component A have a weight average molecular weight of greater than 20,000 Daltons.

Embodiment 7 is the fluorine-free treating composition of any of the previous embodiments wherein the one or more polymeric compounds of Component A have greater than 20 repeating units of at least one (meth)acrylate monomer.

Embodiment 8 is the fluorine-free treating composition of any one of embodiments 1 through 7 wherein the one or more polymeric compounds of Component A are derived from the polymerization of at least one (meth)acrylate monomer comprising at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms) and at least one isocyanate-derived group.

Embodiment 9 is the fluorine-free treating composition of any one of embodiments 1 through 7 wherein the one or more polymeric compounds of Component A are derived from the polymerization of at least one (meth)acrylate monomer having the following formula:

$$R^1\text{—OC(O)—C}(R^2)\text{=}CH_2 \qquad \text{(Formula 0)}$$

or the fluorine-free treating composition of embodiment 8 wherein the one or more polymeric compounds of Component A are derived from the polymerization of at least one (meth)acrylate monomer having at least one of the following formulas:

$$R^1\text{—NH—C(O)O-}L^1\text{-OC(O)C}(R^2)\text{=}CH_2 \qquad \text{(Formula I);}$$

$$R^3\text{-}X^1\text{—C(O)NH-}L^2\text{-OC(O)C}(R^4)\text{=}CH_2 \qquad \text{(Formula II); and}$$

$$R^5\text{-}X^2\text{—C(O)NH-}Q\text{-NHC(O)O-}L^3\text{-}$$
$$\text{OC(O)C}(R^6)\text{=}CH_2 \qquad \text{(Formula III);}$$

wherein:

$R^1$, $R^3$, and $R^5$ are independently a hydrocarbon group (in certain embodiments, a linear or branched hydrocarbon group, and in certain embodiments, a linear hydrocarbon group) having from 1 carbon atom (in some embodiments, at least 16 carbon atoms) and up to 60 carbon atoms (in some embodiments, $R^1$, $R^3$, and $R^5$ are straight chain hydrocarbon groups);

$R^2$, $R^4$, and $R^6$ are independently H or $CH_3$;

$L^1$, $L^2$, and $L^3$ are independently a branched or straight chain alkylene group having 2 to 10 carbon atoms, an arylene group (in some embodiments, an arylene group having 5 to 12 carbon atoms), or a combination thereof;

$X^1$ and $X^2$ are independently O, S, —NH, or —N(R'), wherein $R^7$ is a hydrocarbon group (in certain embodiments, a linear or branched hydrocarbon group, and in certain embodiments, a linear hydrocarbon group) having 1 to 20 carbon atoms; and Q is an isocyanate residue.

Embodiment 10 is the fluorine-free treating composition of embodiment 9 wherein the one or more polymeric compounds of Component A are derived from the polymerization of at least one (meth)acrylate monomer having at least one of the following formulas:

$R^1$-NH—C(O)O-$L^1$-OC(O)C($R^2$)=$CH_2$ (Formula I);

$R^3$-$X^1$—C(O)NH-$L^2$-OC(O)C($R^4$)=$CH_2$ (Formula II); and $R^5$-$X^2$—C(O)NH-Q-NHC(O)O-$L^3$-OC(O)C($R^6$)=$CH_2$ (Formula III);

wherein:

$R^1$, $R^3$, and $R^5$ are independently a hydrocarbon group (in certain embodiments, a linear or branched hydrocarbon group, and in certain embodiments, a linear hydrocarbon group) having from 1 carbon atom (in some embodiments, at least 16 carbon atoms) and up to 60 carbon atoms (in some embodiments, $R^1$, $R^3$, and $R^5$ are straight chain hydrocarbon groups);

$R^2$, $R^4$, and $R^6$ are independently H or $CH_3$;

$L^1$, $L^2$, and $L^3$ are independently a branched or straight chain alkylene group having 2 to 10 carbon atoms, an arylene group (in some embodiments, an arylene group having 5 to 12 carbon atoms), or a combination thereof;

$X^1$ and $X^2$ are independently O, S, —NH, or —N($R^7$), wherein $R^7$ is a hydrocarbon group (in certain embodiments, a linear or branched hydrocarbon group, and in certain embodiments, a linear hydrocarbon group) having 1 to 20 carbon atoms; and Q is an isocyanate residue.

Embodiment 11 is the fluorine-free treating composition of embodiments 9 and 10 wherein $R^1$, $R^3$, and $R^5$ are independently a hydrocarbon group (in certain embodiments, a linear or branched hydrocarbon group, and in certain embodiments, a linear hydrocarbon group) having 16 to 40 carbon atoms.

Embodiment 12 is the fluorine-free treating composition of embodiment 11 wherein $R^1$, $R^3$, and $R^5$ are independently an octadecyl or behenyl group.

Embodiment 13 is the fluorine-free treating composition of any one of embodiments 9 through 12 wherein $L^1$, $L^2$, and $L^3$ are independently an alkylene group having 2 to 10 carbon atoms.

Embodiment 14 is the fluorine-free treating composition of embodiment 13 wherein $L^1$, $L^2$, and $L^3$ are independently selected from an ethylene group, a butylene group, or a propylene group.

Embodiment 15 is the fluorine-free treating composition of 8 through 14 wherein the isocyanate-derived group present in the (meth)acrylate monomer used in the polymerization of the one or more polymeric compounds of Component A is a urethane group or a urea group.

Embodiment 16 is the fluorine-free treating composition of any one of embodiments 1 through 15 wherein the one or more polymeric compounds of Component A additionally include units derived from a (meth)acrylate monomer with one or more functional groups capable of undergoing additional reactions.

Embodiment 17 is the fluorine-free treating composition of embodiment 16 wherein the functional groups capable of undergoing additional reactions are selected from a polymerizable olefin group, an olefin group that can undergo a hydrosilation reaction, an epoxy group, a hydroxyl group, a halo group, a haloformyl group, an aziridino group, an acid group, a salt of an acid group, an amino group, a salt of an amino group, a quaternary ammonium group, a salt of a quaternary ammonium group, a blocked isocyanate group, a hydroxyalkyl group, a chlorinated hydroxyalkyl group, an N-methylol group, an acetoacetoxyalkyl group, and a combination thereof.

Embodiment 18 is the fluorine-free treating composition of any one of embodiments 1 through 7 wherein the one or more polymeric compounds of Component A are selected from a homopolymer of octadecyl (meth)acrylate, a homopolymer of behenyl (meth)acrylate, a copolymer of octadecyl (meth)acrylate and glycidyl (meth)acrylate, and a copolymer of octadecyl (meth)acrylate and N-methylol (meth)acrylamide.

Embodiment 19 is the fluorine-free treating composition of any one of embodiments 1 through 7 wherein the one or more polymeric compounds of Component A are selected from a homopolymer of the reaction product of hydroxyethyl (meth)acrylate and stearyl isocyanate, a homopolymer of the reaction product of hydroxypropyl (meth)acrylate and stearyl isocyanate, a homopolymer of the reaction product of hydroxybutyl (meth)acrylate and stearyl isocyanate, and a homopolymer of the reaction product of stearyl alcohol and isocyanatoethyl (meth)acrylate.

Embodiment 20 is the fluorine-free treating composition of any one of embodiments 1 through 7 wherein the one or more polymeric compounds of Component A are selected from a copolymer of at least one of glycidyl (meth)acrylate, vinylidene chloride, and N-methylol acrylamide with at least one of the reaction products of:

hydroxyethyl (meth)acrylate and stearyl isocyanate;
hydroxypropyl (meth)acrylate and stearyl isocyanate;
hydroxybutyl (meth)acrylate and stearyl isocyanate; and
stearyl alcohol and isocyanato ethyl (meth)acrylate.

Embodiment 21 is the fluorine-free treating composition of embodiment 16 or 17 wherein the one or more polymeric compounds of Component A are selected from a copolymer of the reaction product of isocyanato ethyl (meth)acrylate and 2-butanoneoxime.

Embodiment 22 is the fluorine-free treatment composition of any one of embodiments 1 through 21 wherein the one or more compounds of Component B are derived from reaction, in one or more steps, of components comprising:

(i) at least one isocyanate-reactive oligomer (i.e., functionalized oligomer) comprising 2 to 20 repeating units;

(ii) at least one aromatic polyisocyanate; and (iii) at least one isocyanate blocking agent;

wherein the isocyanate-reactive oligomer is made by the radical-initiated reaction of at least one (meth)acrylate monomer in the presence of at least one mercaptan (which may or may not be functionalized), wherein the at least one (meth)acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbons, or from 16 to 40 carbon atoms).

Embodiment 23 is the treating composition of any one of embodiments 1 through 22 wherein the isocyanate-reactive oligomer for making the one or more compounds of Component B is made by the radical-initiated reaction of at least and at least one (meth)acrylate monomer one mercaptan (which may or may not be functionalized), wherein the at least one (meth)acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms), and at least one isocyanate-derived group.

Embodiment 24 is the fluorine-free treating composition of any one of embodiments 1 through 23 wherein Component B comprises a blocked isocyanate group.

Embodiment 25 is the fluorine-free treating composition of embodiment 24 wherein the blocked isocyanate group is an oxime-derived group.

Embodiment 26 is the treating composition of any one of embodiments 1 through 25 wherein the one or more polycarbodiimide compounds of Component C are derived from a carbodiimidization reaction, in one or more steps, of components comprising:

(i) at least one isocyanate-reactive oligomer (i.e., functionalized oligomer) comprising 2 to 20 repeating units, or an alcohol having at least one linear or branched hydrocarbon group having from 16 to 40 carbon atoms and optionally one or more ester groups;

(ii) at least one polyisocyanate (which may be an aromatic polyisocyanate); and (iii) optionally at least one additional isocyanate-reactive compound;

wherein the isocyanate-reactive oligomer is made by the radical-initiated reaction of at least one (meth)acrylate monomer at least one mercaptan (which may or may not be functionalized), wherein the at least one (meth)acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms).

Embodiment 27 is the treating composition of embodiment 26 wherein the isocyanate-reactive oligomer for making the one or more polycarbodiimide compounds of Component C is made by the radical-initiated reaction of at least one (meth)acrylate monomer in the presence of a mercaptan (which may or may not be functionalized), wherein the at least one (meth)acrylate monomer comprises at least one hydrocarbon group (in certain embodiments, a linear or branched hydrocarbon group, and in certain embodiments, a linear hydrocarbon group) having from 1 to 60 carbon atoms (in some embodiments, from 4 to 60 carbon atoms, or from 12 to 60 carbon atoms, or from 12 to 50 carbon atoms, or from 12 to 40 carbon atoms, or from 16 to 40 carbon atoms), and at least one isocyanate-derived group.

Embodiment 28 is the fluorine-free treating composition of any one of embodiments 1 through 27 wherein the (meth)acrylate monomer for making the isocyanate-reactive oligomers used to make the one or more compounds of Component B and/or Component C has at least one of the following formulas:

$$R^1-OC(O)-C(R^2)=CH_2 \quad \text{(Formula 0)}$$

$$R^1-NH-C(O)O-L^1-OC(O)C(R^2)=CH_2 \quad \text{(Formula I);}$$

$$R^3-X^1-C(O)NH-L^2-OC(O)C(R^4)=CH_2 \quad \text{(Formula II); or}$$

$$R^5-X^2-C(O)NH-Q-NH-C(O)O-L^3-OC(O)C(R^6)=CH_2 \quad \text{(Formula III);}$$

wherein:

$R^1$, $R^3$, and $R^5$ are independently a hydrocarbon group (in certain embodiments, a linear or branched hydrocarbon group, and in certain embodiments, a linear hydrocarbon group) having from 1 to 60 carbon atoms;

$R^2$, $R^4$, and $R^6$ are independently H or $CH_3$;

$L^1$, $L^2$, and $L^3$ are independently a branched or straight chain alkylene group having 2 to 10 carbon atoms, an arylene group (in some embodiments, an arylene group having 5 to 12 carbon atoms), or a combination thereof;

$X^1$ and $X^2$ are independently O, S, —NH, or —N($R^7$), wherein $R^7$ is a hydrocarbon group (in certain embodiments, a linear or branched hydrocarbon group, and in certain embodiments, a linear hydrocarbon group) having 1 to 20 carbon atoms; and Q is a divalent isocyanate residue.

Embodiment 29 is the fluorine-free treating composition of any one of embodiments 1 through 28 wherein the isocyanate-reactive oligomer used to make the one or more compounds of Component B and/or Component C is made by the oligomerization of a (meth)acrylate monomer in the presence of a mercaptan (which may or may not be functionalized), wherein the molar ratio of the mercaptan to the (meth)acrylate is 1:4 to 1:20 (or, in certain embodiments, 1:8 to 1:16).

Embodiment 30 is the fluorine-free treating composition of any one of embodiments 1 through 29 wherein the one or more polycarbodiimide compounds of Component C has the following formula:

$$Q^2-(X^5-C(O)NH-(A^1-(N=C=N))_r-(Z^2)_q-A^2-NHC(O)-X^6)_p-Q^3 \quad \text{(Formula IX)}$$

wherein:

$X^5$ and $X^6$ are each O;

$A^1$ and $A^2$ each represents the residue of an organic di-isocyanate compound;

q is 0;

p is 1;

r is 3; and $Q^2$ and $Q^3$ are independently selected from: a hydrocarbon group (in certain embodiments, a linear or branched hydrocarbon group) having at least 2 carbon atoms; and a group having the formula:

$$-(CH_2)_a-S-U \quad \text{(Formula XI)}$$

wherein:

a is an integer from 1 to 10;

S is sulfur; and

U is selected from:

an oligomer comprising 2 to 20 repeating units of (meth)acrylate monomers, each repeating unit independently comprising an alkyl group having at least 16 carbon atoms;

an oligomer comprising 2 to 20 repeating units of urethane-containing (meth)acrylate monomers, each repeating unit independently comprising an alkyl group having at least 16 carbon atoms;
an oligomer comprising 2 to 20 repeating units of urea-containing (meth)acrylate monomers, each repeating unit independently comprising an alkyl group having at least 16 carbon atoms; and
a combination thereof.

Embodiment 31 is the fluorine-free treating composition of embodiment 30 wherein $Q^2$ and $Q^3$ are independently selected from a hydrocarbon group (in certain embodiments, a linear or branched hydrocarbon group) having 2 to 60 carbon atoms.

Embodiment 32 is the fluorine-free treating composition of any one of the previous embodiments wherein the (meth) acrylate monomer used in the preparation of the compounds of Components A, B, and/or C comprises at least one hydrocarbon group (in certain embodiments, a linear or branched hydrocarbon group, and in certain embodiments, a linear hydrocarbon group) having from 12 to 60 carbon atoms.

Embodiment 33 is a fluorine-free treating composition (preferably for use in treating a fibrous substrate to be water repellent) comprising:

Component (A) comprising one or more polymeric compounds derived from the polymerization of at least one (meth)acrylate monomer of the following formulas:

$R^1$—OC(O)—C($R^2$)=CH$_2$ (Formula 0);

$R^1$-NH—C(O)O-$L^1$-OC(O)C($R^2$)=CH$_2$ (Formula I); or $R^3$-$X^1$—C(O)NH-$L^2$-OC(O)C($R^4$)=CH$_2$ (Formula II);

wherein:
each $R^1$ and $R^3$ is independently a straight chain hydrocarbon group having from 12 to 60 carbon atoms (in some embodiments, from 12 to 50 carbon atoms, or from 12 to 40 carbon atoms, or from 16 to 40 carbon atoms);
each $R^2$ and $R^4$ is independently H or $CH_3$;
$X^1$ is O; and
each $L^1$ and $L^2$ is independently a branched or straight chain alkylene group having 2 to 10 carbon atoms, an arylene group (in certain embodiments, an arylene group having 5 to 12 carbon atoms), or a combination thereof;
and
Component (C) comprising one or more polycarbodiimide compounds of the following formula:

$Q^2$-($X^5$—C(O)NH-($A^1$-(N=C=N))$_r$—($Z^2$)$_q$-$A^2$-NHC(O)—$X^6$)$_p$-$Q^3$ (Formula IX)

wherein:
$X^5$ and $X^6$ are each O;
$A^1$ and $A^2$ each represents the residue of an organic di-isocyanate compound;
q is 0;
p is 1;
r is 3; and
$Q^2$ is represented by —(CH$_2$)$_a$—S—U (Formula XI), wherein a=2 and U is an oligomer of 4 or 6 acrylate monomers represented by the formula:
$R^3$—NHC(O)O-$L^1$-OC(O)C($R^2$)=CH$_2$ (Formula II),
wherein:
$R^3$ is a hydrocarbon group (in certain embodiments, a linear or branched hydrocarbon group, and in certain embodiments, a linear hydrocarbon group) having 18 carbon atoms;
$L^1$ is an alkylene group with 2 carbon atoms; and
$R^2$ is H; and $Q^3$ is either $Q^2$ or a hydrocarbon group (in certain embodiments, a linear or branched hydrocarbon group) with at least 18 carbon atoms (more specifically, e.g., a C18 (n- or iso-stearyl) alcohol residue or a C32 branched alcohol residue).

Embodiment 34 is a fluorine-free treating composition (preferably for use in treating a fibrous substrate to be water repellent) comprising:

Component (A) comprising one or more polymeric compounds derived from the polymerization of at least one (meth)acrylate monomer of the following formulas:

$R^1$—OC(O)—C($R^2$)=CH$_2$ (Formula 0);

$R^1$-NH—C(O)O-$L^1$-OC(O)C($R^2$)=CH$_2$ (Formula I); or $R^3$-$X^1$—C(O)NH-$L^2$-OC(O)C($R^4$)=CH$_2$ (Formula II);

wherein:
each $R^1$ and $R^3$ is independently a straight chain hydrocarbon group having from 12 to 60 carbon atoms (in some embodiments, from 12 to 50 carbon atoms, or from 12 to 40 carbon atoms, or from 16 to 40 carbon atoms);
each $R^2$ and $R^4$ is independently H or $CH_3$;
$X^1$ is O; and
each $L^1$ and $L^2$ is independently a branched or straight chain alkylene group having 2 to 10 carbon atoms, an arylene group (in certain embodiments, an arylene group having 5 to 12 carbon atoms), or a combination thereof;
and
Component (C) comprising one or more polycarbodiimide compounds of the following formula:

$Q^2$-($X^5$—C(O)NH-($A^1$-(N=C=N))$_r$—($Z^2$)$_q$-$A^2$-NHC(O)—$X^6$)$_p$-$Q^3$ (Formula IX)

wherein:
$X^5$ and $X^6$ are each O;
$A^1$ and $A^2$ each represents the residue of an organic di-isocyanate compound;
q is 0;
p is 1;
r is 3; and
$Q^2$ and $Q^3$ are independently a hydrocarbon group (in certain embodiments, a linear or branched hydrocarbon group) having at least 2, at least 4, at least 8, at least 16, or at least 18, carbon atoms (and in certain embodiments up to 60 carbon atoms, up to 50 carbon atoms, up to 40 carbon atoms, or up to 30 carbon atoms).

Embodiment 35 is a fluorine-free treating composition comprising:

Component (A) comprising one or more polymeric compounds derived from the polymerization of at least one (meth)acrylate monomer of the following formulas:

$R^1$—OC(O)—C($R^2$)=CH$_2$ (Formula 0);

$R^1$—NH—C(O)O-$L^1$-OC(O)C($R^2$)=CH$_2$ (Formula I); or $R^3$-$X^1$—C(O)NH-$L^2$-OC(O)C($R^4$)=CH$_2$ (Formula II);

wherein:
each $R^1$ and $R^3$ is independently a straight chain hydrocarbon group having from 12 to 60 carbon atoms (in some embodiments, from 12 to 50 carbon atoms, or from 12 to 40 carbon atoms, or from 16 to 40 carbon atoms);
each $R^2$ and $R^4$ is independently H or $CH_3$;
$X^1$ is O; and each $L^1$ and $L^2$ is independently a branched or straight chain alkylene group having 2 to 10 carbon atoms, an arylene group (in certain embodiments, an arylene group having 5 to 12 carbon atoms), or a combination thereof;
and Component (B) comprising one or more compounds derived from reaction, in one or more steps, of components comprising:
 (i) at least one isocyanate-reactive oligomer comprising 4 to 12 repeating units of at least one (meth)acrylate monomer represented by the Formula (0) and (I);
 (ii) at least one aromatic polyisocyanate;
 (iii) at least one additional isocyanate reactive compound comprising at least one branched or straight hydrocarbon group having from 12 to 60 carbon atoms (in some embodiments from 12 to 50 carbon atoms or from 12 to 40 carbon atoms or from 16 to 40 carbon atoms); and
 (iv) at least one isocyanate blocking group.

Embodiment 36 is the fluorine-free treating composition of any of embodiments 33 through 35 wherein the one or more polymeric compounds of Component A are derived from the polymerization of at least one (meth)acrylate monomer of the following formulas:

 (Formula 0a); or

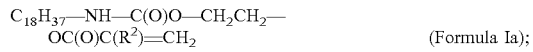 (Formula Ia);

wherein $R^2$, $R^4$, and $R^6$ are independently H or CH$_3$.

Embodiment 37 is the fluorine-free treating composition of any one of embodiments 1 through 36 wherein the composition is an aqueous dispersion optionally comprising one or more additives selected from a paraffin wax, a surfactant, a coalescing solvent, an anti-freeze solvent, an emulsifier, and a stabilizer against one or more microorganisms.

Embodiment 38 is a method of treating a fibrous substrate comprising applying to the fibrous substrate a composition of any one of embodiments 1 through 37 in an amount sufficient to make the fibrous substrate water repellent (and in some embodiments, durably water repellent).

Embodiment 39 is a fibrous substrate treated by the method of embodiment 38.

Embodiment 40 is the fibrous substrate of embodiment 39 which is selected from the group of textile, leather, carpet, paper, and fabrics.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

| MATERIALS LIST | | |
|---|---|---|
| Material | Description | Source |
| ODA | Octadecyl acrylate, monomer | Sigma-Aldrich, Belgium |
| HOEA | 2-Hydroxyethyl acrylate, monomer | Sigma-Aldrich, Belgium |
| HOEMA | 2-Hydroxyethyl methacrylate, monomer | Sigma-Aldrich, Belgium |
| VCl2 | 1,2-dichloroethene, monomer | Sigma-Aldrich, Belgium |
| NMAM | N-methylolacrylamid, monomer | Sigma-Aldrich, Belgium |
| ISOFOL 28 alcohol | 2-alkyl alkanol having a C28 alkyl chain | Sasol, Germany |
| ISOFOL 32 alcohol | 2-alkyl alkanol having C32 alkyl chain | Sasol, Germany |
| ISOFOL 36 alcohol | 2-alkyl alkanol having C36 alkyl chain | Sasol, Germany |
| Sorbitan tristearate | Octadecanoic acid [(2R,3S,4R)-2-[1,2-bis(1-oxooctadecoxy)ethyl]-4-hydroxy-3-tetrahydrofuranyl] ester, available as Span 65 | Sigma-Aldrich, Belgium |
| Citric acid | 2-Hydroxypropane-1,2,3-tricarboxylic acid | Sigma-Aldrich, Belgium |
| GMA | Glycidyl methacrylate | Sigma-Aldrich, Belgium |
| 2-mercaptoethanol | 2-mercaptoethanol, chain transfer agent | Sigma-Aldrich, Belgium |
| SI (stearyl isocyanate) | Octadecyl isocyanate | Sigma-Aldrich, Belgium |
| V-50 | 2,2'-Azobis(2-methylpropionamidine) dihydrochloride | Commercially available under the trade designation "VAZO V-50" from Wako Pure Chemical Industries, Ltd., Germany |
| V-59 | 2,2'-Azobis(2-methylbutyronitrile), initiator | Commercially available under the trade designation "VAZO V-59" from Wako Pure Chemical Industries, Ltd., Germany |
| VAZO-67 | Azonitrile free radical initiator | Commercially available under the trade name "VAZO-67" from DuPont, Wilmington, DE |
| Ethylacetate | ethylacetate, solvent | Sigma-Aldrich, Belgium |
| LA | Lauryl acrylate, dodecyl acrylate, reactant | Sigma-Aldrich, Belgium |

MATERIALS LIST

| Material | Description | Source |
|---|---|---|
| SA, stearylalcohol | Octadecyl alcohol, reactant | Sigma-Aldrich, Belgium |
| DBTDL | Dibutyltin dilaurate, catalyst | Sigma-Aldrich, Belgium |
| AOI | isocyanatoethylacrylate | Showa Denko, Japan |
| MEKO | 2-butanoneoxime, blocking agent | Sigma-Aldrich, Belgium |
| ARMOCARE VGH-70 | Ester based quaternary, emulsfier | Commercially available under the trade designation "ARMOCARE VGH-70" from Akzo Nobel, Stenungsund, Sweden |
| PAPI | Polymethylenepolyphenylisocyanate | Covestro, Germany |
| N100 | Aliphatic polyisocyanate resin based on hexamethylene diisocyanate (HDI) | Covestro, Germany |
| Ethoquad C-12 | Quaternized coco amine ethoxylate, emulsifier | Commercially available under the trade designation "Ethoquad C-12" from Akzo Nobel, Stenungsund, Sweden |
| TERGITOL TMN-6 | Nonionic emulsifier | Dow Chemical, Midland, MI |
| TERGITOL 15-S-30 | Nonionic emulsifier | Dow Chemical, Midland, MI |
| MDI | 4,4'-methylenebis(phenyl isocyanate) | Sigma-Aldrich, Belgium |
| PES Microfiber | Polyester fabric | Chyang Sheng Dyeing and Finishing Company Ltd., Taiwan |
| PA Microfiber | Polyamide fabric, style 6145 | Sofinal NV, Belgium |
| MPPO | 3-methyl-1-phenyl-2-phospholene 1-oxide, 85% technical grade, carbodiimidization catalyst | Sigma-Aldrich, Belgium |
| ISOPAR L | Isoparaffinic fluid | ExxonMobil Chem |

Test Methods

Spray Rating (SR)

The spray rating of a treated fibrous substrate is a value indicative of the dynamic repellency of the treated substrate to water that impinges on the treated substrate. The repellency was measured by Test Method 22-2005, published in the 2001 Technical Manual of the American Association of Textile Chemists and Colorists (AATCC), and is expressed in terms of a 'spray rating' of the tested fibrous substrate. The spray rating was obtained by spraying 250 milliliters (mL) water on the substrate from a height of 15 centimeters (cm). The wetting pattern is visually rated using a 0 to 100 scale, where 0 means complete wetting and 100 means no wetting at all. Spray rating was measured initially (IN SR) and after the fibrous substrate was laundered 10 or 20 times.

The laundering procedure consisted of placing a 400-900 cm² sheet of treated fibrous substrate in a washing machine (Miele Novotronic T490) along with ballast sample (1.9 killogram (kg) of 8-ounce fabric). A commercial detergent ("Sapton," available from Henkel, Germany, 60 grams (g)) was added. The fibrous substrate and ballast load were washed using a short wash cycle at 40° C., followed by a rinse cycle and centrifuging. The sample was not dried between repeat cycles. After the 10 or 20 washing cycles the samples were dried in a Miele T-356 tumble drier, setting 'Extra dry'. The samples were conditioned overnight at room temperature before the spray rating was tested. The results of spray rating are indicated as SR 10L and SR 20L respectively.

As indicated in the examples, the dried test samples were optionally ironed at 180° C. during 3 seconds. The samples were conditioned overnight at room temperature before the spray rating was tested. The results of spray rating are indicated as SR 10L IR and SR 20L IR respectively.

Bundesmann Test

In an alternative way to evaluate dynamic water repellency performance, the impregnating effect of rain on treated fibrous substrates was determined using the Bundesmann Test Method (DIN 53888). In this test, the treated fibrous substrates were subjected to a simulated rainfall, while the back of the substrate was being rubbed. The appearance of the upper exposed surface was checked visually after 1, 5, and 10 minutes and was given a rating between 1 (complete surface wetting) and 5 (no water remains on the surface). Besides the observation of the wetting pattern, also the water absorption (recorded as '% ABS') and the amount of water that penetrated the treated substrate (recorded as 'ml pen') was measured. Well-treated samples give low absorption and penetration values.

Treatment Procedure Via Padding Process: Water-Based Dispersions

Before application to the fibrous substrates (e.g., textile or fabric substrates), the 30% polymer dispersions were diluted with DI-water to obtain a treatment dispersions having a concentration of 20 g/liter active material leading to 0.6% solids on fibrous substrate. The treatments were applied onto the fibrous substrates, by immersing the substrates in the treatment dispersion and agitating until the substrate was saturated. The saturated fibrous substrate was then run through a padder/roller to remove excess of the dispersion and to obtain a certain Percent (%) Wet Pick Up (WPU) (100% WPU means that after this process the substrate absorbed 100% of its own weight of the treatment dispersion before drying). After application of the treatment dispersion, the treated substrates were dried and cured for 2 minutes at 180° C. unless otherwise indicated. The dried samples were conditioned overnight at room temperature before testing.
Treatment Procedure Via Padding Process: Solutions in Solvent Before application to the fibrous substrates (e.g., textile or fabric substrates), the 30% polymer dispersions were diluted with ISOPAR L to obtain a treatment solution having a concentration of 0.6% solids in solution. The treatments were applied onto the fibrous substrates, by immersing the substrates in the treatment solution and agitating until the substrate was saturated. The saturated fibrous substrate was then run through a padder/roller to remove excess of the dispersion and to obtain 0.6% solids on fibrous substrate. After application of the treatment solution, the treated substrates were dried for 30 minutes at 80° C. The dried samples were conditioned overnight at room temperature before testing.

EXAMPLES

Preparation of (Meth)Acrylate Monomers

SI-HOEA Made from Stearyl Isocyanate and 2-Hydroxyethyl Acrylate

In a 1-liter round-bottomed 3-necked reaction flask, 295.5 g of stearyl isocyanate (SI) (1 mole) was mixed with 116 g of 2-hydroxyethyl acrylate (HOEA) (1 mole). At room temperature a clear solution was obtained. The reaction quickly started after the addition of 5 drops of DBTDL, the temperature of the reaction mixture spontaneously increased, and a white insoluble material started to form in the mixture. Temperature was raised to 80° C. and the reaction was continued for 3 hours (hrs) at 80° C. After this period, the FTIR (Fourier Transform Infrared) spectrum showed all NCO disappeared. The structure of the final material was confirmed by NMR (Nuclear Magnetic Resonance) to be $C_{18}H_{37}NHC(O)OCH_2CH_2OC(O)CH=CH_2$, which is Formula Ia. At room temperature a hard solid waxy material was obtained, referenced as "SI-HOEA."
SA-AOI Made from Stearyl Alcohol (SA) and Isocyanato Ethylacrylate (AOI)

In a 250-mL three-necked flask was placed 54 g (0.2 mol) stearyl alcohol (SA), 28.2 g AOI (0.2 mol), 35 g ethylacetate, and 1 drop of DBTDL. The mixture was reacted for 5 hours at 84° C. under nitrogen atmosphere. IR indicated that all isocyanate groups were reacted and that the urethane acrylate was formed. A clear solution at 84° C. was obtained of the "SA-AOI" urethane acrylate, which has the following structure:

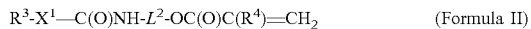

$$R^3-X^1-C(O)NH-L^2-OC(O)C(R^4)=CH_2 \quad \text{(Formula II)}$$

wherein:
R³ is a hydrocarbon group having 18 carbon atoms;
R⁴ is H;
L² is an alkylene group having 2 carbon atoms; and
X¹ is O.

Using the same procedure the following related urethane acrylate was prepared: "AOI-MEKO," but using MEKO instead of stearyl alcohol. AOI-MEKO represents an acrylate with a blocked isocyanate group having a 2-butanone oxime residue ($-N=C(CH_3)CH_2CH_3$).
Preparation of Polymeric Compounds (Component A)
(Weight Ratio, Unless Otherwise Indicated)
a. Water-Based Dispersions (Component A)
1. Mini-emulsion
PolyODA
(Polyoctadecyl acrylate or pODA) was prepared via mini-emulsion. Therefore, in a first step, a dispersion was made by first dispersing 50 g octadecylacrylate in a mixture of 1.3 g Ethoquad C12, 3 g TERGITOL TMN-6 and 1.5 g TERGITOL 15-S-30, and 128 g D.I. water via ultrasone at a temperature of 50° C.

This 'monomer' dispersion was then polymerized, after the addition of 0.3 g V-50 initiator, degassing and reacting in a 75° C. preheated launder-o-meter for 6 hrs.
PolyODMA, PolyIsoBMA, PolyBEA, PolyBEMA, PolyLA, PolyISOFOL 32A, and Poly(ODA/GMA 90/10)

PolyODMA (polyoctadecyl methacrylate or pODMA), polyIsoBMA (polyisobutyl methacrylate of pIsoBMA), polyBEA (polybehenyl acrylate or pBEA), polyBEMA (polybehenyl methacrylate of pBEMA), polyLA (polylauryl acrylate or pLA), and polyISOFOL 32A (poly ISOFOL 32 acrylate or pISOFOL 32A) were prepared according to the same procedure as outlined above for the synthesis of polyoctadecyl acrylate.

Poly(ODA/GMA 90/10), copolymer of octadecyl acrylate and glycidyl methacrylate in weight ratio 90/10, was prepared according to the same procedure as outlined above for the synthesis of polyoctadecyl acrylate, but using 45 g ODA and 5 g GMA.

pODA, pODMA, pIsoBMA, pBEA, pBEMA, pLA, pISOFOL 32A, and p(ODA/GMA 90/10) are polymeric compounds derived from the polymerization of at least one (meth)acrylate monomer according to the following structure:

$$R^1-OC(O)-C(R^2)=CH_2 \quad \text{(Formula 0)}$$

wherein:
R¹ represents a branched or straight chain hydrocarbon group having from 4 to 32 carbon atoms;
R² represents H or CH₃;
Poly(SI-HOEA)

Poly(SI-HOEA) (or p(SI-HOEA)) was prepared according to the same procedure, except that the first dispersion was done at a temperature of 95° C. instead of 50° C. and the polymerization was done at 95° C. instead of 75° C. The polymer of SI-HOEA prepared via mini emulsion is referred to as p(SI-HOEA), which is a polymeric compound derived from the polymerization of an acrylate wherein the acrylate has the following structure:

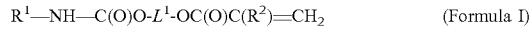

$$R^1-NH-C(O)O-L^1-OC(O)C(R^2)=CH_2 \quad \text{(Formula I)}$$

wherein:
R¹ is a hydrocarbon group having 18 carbon atoms;
R² is H; and
L¹ is an alkylene group having 2 carbon atoms.
2. Solvent Polymerization with Post Emulsification Step To distinguish the materials made with mini-emulsion from the materials made with solvent polymerization and post emulsification, the latter materials are labeled with an asterisk (*).
Poly(SI-HOEA)*

In an alternative embodiment, SI-HOEA was polymerized in solvent after which a water based dispersion was obtained via post emulsification. The so obtained polymer is referred to as p(SI-HOEA)*.

Therefore, in a glass bottle, 60 g of "SI-HOEA" was mixed with 90 g of ethylacetate and 0.25 g of V-59 initiator. The bottle was purged with nitrogen, closed, and placed overnight in a pre-heated launder-o-meter at 75° C. This resulted in a viscous clear yellowish polymer solution at 75° C. This polymer solution was then dispersed in water by mixing it at 60° C. with a water phase, consisting of 154 g deionized (DI) water, 1.6 g Ethoquad C-12, 3.6 g TERGITOL TMN-6, and 1.8 g TERGITOL 15-S-30. This premix was then ultrasonicated with a 'Branson Sonifier' for 6 minutes at maximum setting. Then, the ethylacetate was removed by vacuum distillation to result in a stable solvent-free dispersion, which was diluted to 30% solids with deionized water (DI-water). The material is referred to as "p(SI-HOEA)*".

p(SI-HOEA)* is a polymeric compound derived from the polymerization of an acrylate wherein the acrylate has the following structure:

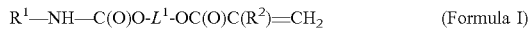

$$R^1\text{—NH—C(O)O-}L^1\text{-OC(O)C}(R^2)\!\!=\!\!CH_2 \quad \text{(Formula I)}$$

wherein:
$R^1$ is a hydrocarbon group having 18 carbon atoms;
$R^2$ is H; and
$L^1$ is an alkylene group having 2 carbon atoms.

Water-based dispersions of following polymers were prepared by polymerizing the monomers in solvent and applying post emulsification step.

Poly(SA-AOI/AOI-MEKO 90/10)*

In a 250-mL three-necked flask fitted with a stirrer, heating mantle, cooler, and thermometer were placed 90 g of above-prepared "SA-AOI" urethane acrylate, 10 g of above-prepared "AOI-MEKO" urethane acrylate, 100 g ethylacetate, and 0.4 g VAZO-67. The mixture was degassed 3 times using aspirator vacuum and nitrogen pressure. The mixture was heated to 75° C. under a nitrogen atmosphere for 6 hours followed by addition of 0.1 g VAZO-67 and continued reaction for 16 hours.

The material is referred to as p(SA-AOI/AOI-MEKO)* and is a polymeric compound derived from a co-polymerization of acrylates wherein:

1) the "SA-AOI" urethane acrylate has the following structure:

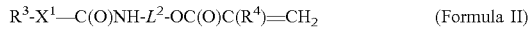

$$R^3\text{-}X^1\text{—C(O)NH-}L^2\text{-OC(O)C}(R^4)\!\!=\!\!CH_2 \quad \text{(Formula II)}$$

wherein:
$R^3$ is a hydrocarbon group having 18 carbon atoms;
$R^4$ is H;
$L^2$ is an alkylene group 2 carbon atoms; and
$X^1$ is O; and 2) the "AOI-MEKO" urethane acrylate is an acrylate with blocked isocyanate groups.

Poly(SI-HOEA/VC12/NMAM 70/20/10)*

In a 250-mL glass bottle were placed 70 g of above-prepared "SI-HOEA" urethane acrylate, 10 g NMAM, 100 g ethylacetate, and 0.4 g VAZO-67. The mixture was degassed 3 times using aspirator vacuum and nitrogen pressure. Then, 20 g of VC12 was added. The mixture was heated to 75° C. under a nitrogen atmosphere overnight in an Launder-o-meter.

The material is referred to as p(SI-HOEMA/VC12/NMAM)* and is a polymeric compound derived from a co-polymerization of acrylates wherein:
the "SI-HOEMA" urethane acrylate has the following structure:

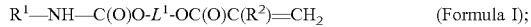

$$R^1\text{—NH—C(O)O-}L^1\text{-OC(O)C}(R^2)\!\!=\!\!CH_2 \quad \text{(Formula I)};$$

wherein:
$R^1$ is a hydrocarbon group having 18 carbon atoms;
$R^2$ is $CH_3$; and
$L^1$ is an alkylene group having 2 carbon atoms;
VC12 is a vinyl comonomer; and
NMAM is an acrylamid comonomer.

Emulsification of p(SA-AOI/AOI-MEKO 90/10)* and p(SI-HOEMA/VC12/NMAM)*

In a 1000-mL three-necked flask, fitted with a stirrer, heating mantle, thermometer and cooler were placed 200 g of a 50% solids in ethyl acetate-containing reaction mixture. The mixture was heated up to 70° C. and mixed until a clear solution in ethyl acetate was obtained. In a 1000-mL beaker were placed 3 g TERGITOL 15-S-30, 6 g TERGITOL TMN-6, 3.7 g ARMOCARE VGH-70, and 400 g DI-water. This mixture was warmed up to about 70° C. and then added under vigorous stirring to the above mentioned organic solution in the 1000 ml three-necked flask. A pre-emulsion was obtained at 70° C. This pre-emulsion was passed 3 times through a pre-heated 2-step Manton-Gaulin homogenizer at 300 bar pressure. Solvent was stripped off at temperature of about 45 to 50° C. and vacuum of about 20-30 mm Hg. A stable dispersion at about 20% solids in water resulted. Particle size was 120-180 nm.

b. Solvent-Based Compositions (Component A)

PolyODA(S) (Polyoctadecyl acrylate) Solvent Version

In a 250-mL three-necked flask fitted with a stirrer, heating mantle, cooler, and thermometer were placed 40 g ODA, 60 g ethylacetate and 0.2 g VAZO-59. The mixture was degassed 3 times using aspirator vacuum and nitrogen pressure. The mixture was heated overnight at 75° C. in a launder-O-meter. The so obtained polyoctadecyl acrylate as 40% solids in ethylacetate is referred to as pODA(S).

Preparation of Compounds for Component B, Comprising Isocyanate Reactive Oligomers (Equivalent Ratios)

(SA-AOI)$_{12}$/SA/PAPI/MEKO (0.6/0.6/3/1.8)

In a three-necked flask of 250-mL fitted with a stirrer, heating mantle, cooler and thermometer were placed 54 g (0.2 mol) SA, 28.2 g AOI (0.2 mol), 35 g ethylacetate, and 1 drop of DBTDL. The reaction mixture was reacted for 5 hrs at 85° C. under nitrogen atmosphere. IR check showed that all isocyanate had reacted. The mixture was cooled to 60° C. and 1.3 g 2-mercaptoethanol (0.017 mol), and 0.2 g VAZO-67 were added. The mixture was degassed 3 times using aspirator vacuum and nitrogen and then heated up to about 70° C. A vigorous exotherm took off up to 88° C. The reaction was continued for 3 hrs at 85° C. under nitrogen. Then, 0.06 g VAZO-67 was added and the reaction continued for 16 hrs. A clear solution of the hydroxyl functionalized oligomer was diluted by using 60 g ethylacetate and cooled to 60° C. under nitrogen. Then, 11.6 g (0.085 equiv) of PAPI was added, as well as 4.6 g SA (0.017 mol) and reacted for 16 hrs at 85° C. As a last step, 4.4 g (0.051 mol) MEKO was added and reacted for 2 hrs at 82° C. IR analysis indicated that all isocyanate had reacted away. A clear, amber brown colored solution was obtained at 82° C.

Compound (SA-AOI)$_{12}$/SA/PAPI/MEKO (0.6/0.6/3/1.8) is a fluorine-free compound derived from a three step reaction of:

(i) an isocyanate-reactive oligomer, having 12 repeating units, made by the radical initiated reaction of 1 mole of 2-mercaptoethanol and 12 moles of an acrylate monomer comprising a urethane group and a hydrocarbon group having 18 carbon atoms;
(ii) a polymeric isocyanate, PAPI;
(iii) a monomeric isocyanate-reactive compound, stearyl alcohol, SA; and
(iv) an isocyanate blocking agent, MEKO.

(isoBMA)$_8$/SA/PAPI/MEKO (0.6/0.6/3/1.8)

In a three-necked flask of 500-mL fitted with a stirrer, heating mantle, cooler and thermometer were placed 90.9 g (0.64 mol) isoBMA, 6.2 g (0.08 mol) 2-mercaptoethanol, 33 g EtOAc and 0.2 g VAZO-67. The mixture was degassed 3 times using aspirator vacuum and nitrogen and then heated up to about 70° C. A vigorous exotherm took off up to 88° C. The reaction was continued for 3 hrs at 85° C. under nitrogen. Then 0.06 g VAZO-67 was added and the reaction continued for 16 hrs. A clear solution of the hydroxy functionalized oligomer (0.08 mol (isoBMA)$_8$-OH) was diluted by using 100 g ethylacetate and cooled to 60° C. under nitrogen. Then 54 g (0.4 NCO equivalents) of PAPI was added, as well as 21.6 g SA (0.08 mol) and reacted for 16 hrs at 85° C. As a last step, 20.9 g MEKO (0.24 mol) was added and reacted for 2 hrs at 82° C. IR analysis indicated that all isocyanate had reacted away. A clear, amber brown colored solution was obtained at 82° C.

Compound (isoBMA)$_8$/SA/PAPI/MEKO (0.6/0.6/3/1.8) is a fluorine-free compound derived from a three step reaction of:
(i) an isocyanate-reactive oligomer, having 8 repeating units, made by the radical initiated reaction of 1 mole of 2-mercaptoethanol and 8 moles of an acrylate monomer having a hydrocarbon group having 4 carbon atoms, and according to the formula $$R^1\text{—OC(O)—C}(R^2)\text{=CH}_2 \qquad \text{(Formula 0)}$$

wherein:
R$^1$ represents a branched hydrocarbon group having from 4 carbon atoms;
R$^2$ represents CH$_3$;
(ii) a polymeric isocyanate, PAPI;
(iii) a monomeric isocyanate-reactive compound, stearyl alcohol, SA; and
(iv) an isocyanate blocking agent, MEKO.

(ODA)$_4$/SA/PAPI/MEKO (0.6/0.6/3/1.8)

Compound (ODA)$_4$/SA/PAPI/MEKO (0.6/0.6/3/1.8) was prepared according to the same procedure as given for (isoBMA)$_8$/SA/PAPI/MEKO (0.6/0.6/3/1.8) above, but using 110.2 g (0.08 mol)(ODA)$_4$ instead of (isoBMA)$_8$.

Compound (ODA)$_4$/SA/PAPI/MEKO (0.6/0.6/3/1.8) is a fluorine-free compound derived from a three step reaction of:
(i) an isocyanate-reactive oligomer, having 4 repeating units, made by the radical initiated reaction of 1 mole of 2-mercaptoethanol and 4 moles of an acrylate monomer having a hydrocarbon group having 18 carbon atoms, and according to the formula:

$$R^1\text{—OC(O)—C}(R^2)\text{=CH}_2 \qquad \text{(Formula 0)}$$

wherein:
R$^1$ represents a branched hydrocarbon group having from 18 carbon atoms; and
R$^2$ represents H;
(ii) a polymeric isocyanate, PAPI;
(iii) a monomeric isocyanate-reactive compound, stearyl alcohol, SA; and
(iv) an isocyanate blocking agent, MEKO.

(SI-HOEA)$_8$/PAPI 1/1

In a three-necked flask of 250-mL fitted with a stirrer, heating mantle, cooler and thermometer were placed 67.3 g (0.02 mol) (SI-HOEA)$_8$, 80 g ethylacetate, and 2.7 g (0.02 equiv) of PAPI. The mixture was reacted for 16 hrs at 85° C. IR analysis indicated that all isocyanate had reacted away. A clear, amber brown colored solution was obtained at 82° C.

Compound (SI-HOEA)$_8$/PAPI (3/1) is a fluorine-free compound derived from a two step reaction of:
(i) an isocyanate-reactive oligomer, having 8 repeating units, made by the radical initiated reaction of 1 mole of 2-mercaptoethanol and 8 moles of an acrylate monomer comprising a hydrocarbon group having 18 carbon atoms and an isocyanate-derived group, according to the formula:

$$R^1\text{—NH—C(O)O-}L^1\text{-OC(O)C}(R^2)\text{=CH}_2 \qquad \text{(Formula I)}$$

wherein:
R$^1$ is a hydrocarbon group having 18 carbon atoms;
R$^2$ is H; and
L$^1$ is an alkylene group having 2 carbon atoms.
and
(ii) a polymeric isocyanate, PAPI.

(SI-HOEA)$_6$/SA/N100/MEKO (0.6/0.6/3/1.8)

Compound (SI-HOEA)$_6$/SA/N100/MEKO (0.6/0.6/3/1.8) was prepared according to the same procedure as given for (isoBMA)$_8$/SA/PAPI/MEKO (0.6/0.6/3/1.8) above, but using 50.9 g (0.02 mol (SI-HOEA)$_6$ instead of (isoBMA)$_8$ and using 13.0 g (0.1 equiv) of N100 instead of PAPI.

Compound (SI-HOEA)$_6$/SA/N100/MEKO (0.6/0.6/3/1.8) is a fluorine-free compound derived from a three step reaction of:
(i) an isocyanate-reactive oligomer, having 6 repeating units, made by the radical initiated reaction of 1 mole of 2-mercaptoethanol and 6 moles of an acrylate monomer comprising a hydrocarbon group having 18 carbon atoms and an isocyanate-derived group, according to the formula:

$$R^1\text{—NH—C(O)O-}L^1\text{-OC(O)C}(R^2)\text{=CH}_2 \qquad \text{(Formula I)}$$

wherein:
R$^1$ is a hydrocarbon group having 18 carbon atoms;
R$^2$ is H; and
L$^1$ is an alkylene group having 2 carbon atoms;
(ii) a polymeric isocyanate, N100;
(iii) a monomeric isocyanate-reactive compound, stearyl alcohol, SA; and
(iv) an isocyanate blocking agent, MEKO.

(SI-HOEA)$_6$/SA/PAPI/MEKO (0.6/0.6/3/1.8)

Compound (SI-HOEA)$_6$/SA/PAPI/MEKO (0.6/0.6/3/1.8) was prepared according to the same procedure as given above for (isoBMA)$_8$/SA/PAPI/MEKO (0.6/0.6/3/1.8), but using 50.9 g (0.02 mol (SI-HOEA)$_6$ instead of (isoBMA)$_8$.

Compound (SI-HOEA)$_6$/SA/PAPI/MEKO (0.6/0.6/3/1.8) is a fluorine-free compound derived from a three step reaction of:
(i) an isocyanate-reactive oligomer, having 6 repeating units, made by the radical initiated reaction of 1 mole of 2-mercaptoethanol and 6 moles of an acrylate monomer comprising a hydrocarbon group having 18 carbon atoms and an isocyanate-derived group, according to the formula:

$$R^1\text{—NH—C(O)O-}L^1\text{-OC(O)C}(R^2)\text{=CH}_2 \qquad \text{(Formula I)}$$

wherein:
R$^1$ is a hydrocarbon group having 18 carbon atoms;
R$^2$ is H; and
L$^1$ is an alkylene group having 2 carbon atoms;
(ii) a polymeric isocyanate, PAPI;
(iii) a monomeric isocyanate-reactive compound, stearyl alcohol, SA; and
(iv) an isocyanate blocking agent, MEKO.

Preparation of Component B comprising compounds derived from an alcohol having at least one linear or branched hydrocarbon group having from 16 to 40 carbon atoms and optionally one or more ester groups (equivalent ratio's):

UNILIN 350/SA/PAPI/MEKO (0.6/0.6/3/1.8)

In a three necked flask of 500 ml fitted with a stirrer, heating mantle, cooler and thermometer were placed 27 g (0.1 mol) SA, 40.8 g (0.1 mol) UNILIN 350, 68 g PAPI (0.5 equiv), 150 g ethylacetate and 1 drop of DBTDL. The reaction mixture was reacted for 16 hours at 83° C. under nitrogen atmosphere. Then 26.1 g (0.3 mol) MEKO was added and the mixture was reacted for another 2 hours at 83° C. A clear amber solution was obtained. IR indicated that all isocyanate had reacted.

Compound UNILIN 350/SA/PAPI/MEKO (0.6/0.6/3/1.8) is a fluorine-free compound derived from a three step reaction of:
(i) a hydrocarbon alcohol having a hydrocarbon group having from 22 to 24 carbon atoms
(ii) a polymeric isocyanate, PAPI;
(iii) a monomeric isocyanate-reactive compound, stearyl alcohol, SA; and
(iv) an isocyanate blocking agent, MEKO.

ISOFOL 36/PAPI (1/1)

In a three necked flask of 500 ml fitted with a stirrer, heating mantle, cooler and thermometer were placed 104.4 g (0.2 mol) of hexadecyleicosanol (ISOFOL 36), 27.2 g (0.2 equiv) PAPI, 130 g ethylacetate and 1 drop of DBTDL catalyst. The mixture was reacted for 16 hours at 82° C. under a nitrogen atmosphere. A clear amber solution was obtained. IR indicated that all isocyanate groups had reacted.

Compound ISOFOL 36/PAPI (1/1) is a fluorine-free compound derived from one step reaction of:
(i) a hydrocarbon alcohol having a hydrocarbon group having 36 carbon atoms and
(ii) a polymeric isocyanate, PAPI.

$SA_3$-Citric Acid/SA/PAPI/MEKO (0.6/0.6/3/1.8)

In a three necked flask of 500 ml fitted with a stirrer, heating mantle, Dean Stark trap, cooler and thermometer were placed 19.2 g (0.1 mol) citric acid, 81 g (0.3 mol) of SA, 30 g of toluene and 0.2 g of methane sulfonic acid. The reaction was heated to reflux and water was collected in the Dean Stark trap. After 8 hours reaction 5.3 g water was collected and the catalyst neutralized with 0.21 g trimethylamine. All toluene was stripped from the reaction using aspirator vacuum at about 80-90° C. Then 27 g (0.1 mol) SA, 68 g (0.5 equiv) PAPI and 120 g ethylacetate were added, as well as 1 drop of DBTDL. The mixture was reacted for 16 hours at 83° C. under nitrogen atmosphere. Then 26.1 g (0.3 mol) MEKO was added and the mixture was reacted for 2 hours at 83° C. A slightly hazy amber solution was obtained. IR analysis indicated that all isocyanate had reacted.

Compound $SA_3$-citric acid/SA/PAPI/MEKO (0.6/0.6/3/1.8) is a fluorine-free compound derived from a three step reaction of:
(i) an alcohol having three linear hydrocarbon groups having 18 carbon atoms and three ester groups three ester groups
(ii) a polymeric isocyanate, PAPI;
(iii) a monomeric isocyanate-reactive compound, stearyl alcohol, SA; and
(iv) an isocyanate blocking agent, MEKO.

Sorbitan Tristearate/SA/PAPI/MEKO (0.6/0.6/3/1.8)

In a three necked flask of 500 ml fitted with a stirrer, heating mantle, Dean Stark trap, cooler and thermometer were placed 80 g (0.1 equiv) of sorbitan tristearate and 200 g MIBK. The reaction was heated to reflux and 0.2 g water was collected in the trap. The mixture was cooled to 40° C. under a nitrogen atmosphere. Then 27 g (0.1 mol) SA, 68 g (0.5 equiv) PAPI and 1 drop of DBTDL were added.

The reaction was continued at 84° C. under a nitrogen atmosphere. Then 26.1 g (0.3 mol) MEKO was added and the reaction was continued for 2 hours at 85° C. A clear brown solution was obtained; IR indicated that all isocyanate groups were gone.

Compound Sorbitan tristearate/SA/PAPI/MEKO (0.6/0.6/3/1.8) is a fluorine-free compound derived from a three step reaction of:
(i) an alcohol having three linear hydrocarbon groups having 17 carbon atoms and three ester groupsesters
(ii) a polymeric isocyanate, PAPI;
(iii) a monomeric isocyanate-reactive compound, stearyl alcohol, SA; and
(iv) an isocyanate blocking agent, MEKO.

Emulsification procedure of Compounds B comprising an alcohol having at least one linear or branched hydrocarbon group having from 16 to 40 carbon atoms and optionally one or more ester groups:

In a three necked flask of 1000 ml, fitted with a stirrer, heating mantle, thermometer and cooler were placed 200 gram of a 50% solids reaction mixture in EtOAc. The mixture was heated up to 70° C. and mixed until a clear solution in EtOAc was obtained.

In a beaker of 1000 ml were placed 3 g Tergitol 15-S-30 nonionic emulsifier, 6 g Tergitol TMN-6 emulsifier and 3.7 g Armocare VGH-70 (70% solids) and 400 g DI-water. This mixture was also warmed up to about 70° C. and then added under vigourous stirring to the above mentioned organic solution in the 1000 ml three necked flask. A pre-emulsion was obtained at 70° C. This pre-emulsion was passed 3 times through a pre-heated 2-step Manton-Gaulin homogenizer at 300 bar pressure and about 65° C. Solvent was stripped of at temperature of about 45 to 50° C. and vacuum of about 30-40 mm Hg. A stable dispersion at about 20% solids in water resulted. All materials used in this invention were emulsified using this general procedure.

Preparation of Polycarbodiimide (PCD) Compounds (Component C) (Equivalent Ratio's) PCD-1

Polycarbodiimde PCD-1 is a water-based dispersion prepared and emulsified as per U.S. Pat. No. 8,440,779 as "PCD-5" by reacting $(ODA)_4$ oligomer and isostearyl alcohol followed by carbodiimidization and emulsification. The PCD-1 has the following structure:

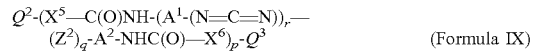

$$Q^2\text{-}(X^5\text{—}C(O)NH\text{-}(A^1\text{-}(N=C=N))_r\text{—} (Z^2)_q\text{-}A^2\text{-}NHC(O)\text{—}X^6)_p\text{-}Q^3 \quad \text{(Formula IX)}$$

wherein:
$X^5$ and $X^6$ are each O;
$A^1$ and $A^2$ each represents the residue of an organic di-isocyanate compound (MDI);
q is 0;
p is 1;
r is 3;
$Q^2$ is represented by —$(CH_2)_a$—S—U (Formula XI), wherein a=2 and U is an oligomer of 4 acrylate monomers having an alkyl group of 18 carbon atoms; and
$Q^3$ is a hydrocarbon group with 18 carbon atoms, more specifically an isostearyl alcohol residue.

PCD-2 $(SI\text{-}HOEA)_6/MDI$ (1/4)

In a first step, in a 1-liter round-bottomed 3-necked reaction flask fitted with a stirrer, thermometer, cooler and heating mantle, 411.5 g (1 mole) of SI-HOEA monomer was mixed with 13 g (⅙ mole) of 2-mercaptoethanol, 141.5 g ethylacetate, and Ig V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 2547, the structure confirmed by NMR to be Formula IVa where m is an average of 6 and $Y^1$ is the residue of the V-59 initiator.

In a second step, in a 500-mL round-bottomed 3-necked reaction flask fitted with a stirrer, thermometer, cooler and heating mantle, 66.9 g $(SI\text{-}HOEA)_6$ oligomer solution as prepared above, 9.8 g MDI (MW 250), 73.3 g ethylacetate, and 0.05 g MPPO (PCD catalyst) were mixed and reacted overnight at reflux temperature. An FTIR spectrum showed all NCO disappeared and reacted into urethane and polycarbodiimide (PCD). This resulted in a 40% solids polycarbodiimide solution.

A 150-gram solution of the polycarbodiimide prepared above was then dispersed in water by mixing it at 60° C. with a water phase, consisting of 154 g deionized (DI) water, 1.6 g Ethoquad C-12, 3.6 g TERGITOL TMN-6, and 1.8 g TERGITOL 15-S-30. This premix was then ultrasonically treated with a 'Branson Sonifier' for 6 minutes at maximum setting. Then the ethylacetate was removed by vacuum distillation to result in a stable solvent-free dispersion, which was diluted to 30% solids with deionized water (DI-water). This material is referred to as $(SI-HOEA)_6$-$(MDI-PCD)_3$-$(SI-HOEA)_6$, which is a polycarbodiimide (PCD-2) that has the following structure:

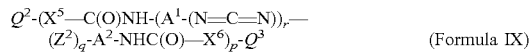
(Formula IX)

wherein:
$X^5$ and $X^6$ are each O;
$A^1$ and $A^2$ each represents the residue of an organic di-isocyanate compound (MDI);
q is 0;
p is 1;
r is 3; and
$Q^2$ and $Q^3$ each represent $—(CH_2)_a—S—U$ (Formula XI), wherein a=2 and U is an oligomer of 6 acrylate monomers, which are represented by the formula:

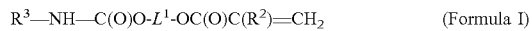
(Formula I)

wherein:
$R^3$ is a hydrocarbon group having 18 carbon atoms;
$L^1$ is an alkylene group with 2 carbon atoms; and
$R^2$ is H.

PCD-3 $(SI-HOEA)_{12}$/MDI (1/8)

In a 1-liter round-bottomed 3-necked reaction flask fitted with a stirrer, thermometer, cooler and heating mantle, 411.5 g (1 mole) of SI-HOEA monomer was mixed with 6.5 g (1/12 mole) of 2-mercaptoethanol, 139.3 g ethylacetate, and 1 g V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 5016, the structure confirmed by NMR to be Formula IVa where m is an average of 12 and $Y^1$ is the residue of the V-59 initiator. The reaction mixture was diluted by using 350.2 g ethylacetate and cooled to 30° C. under nitrogen. Then, 83.3 g MDI (0.33 mol) and 0.5 g MPPO catalyst were added. The mixture was heated up to 90° C. for 16 hours and a slightly hazy solution resulted. An IR analysis indicated that all isocyanate groups were reacted and that carbodiimide groups were formed. This material is referred to as $(SI-HOEA)_{12}$/MDI, which is a polycarbodiimde (PCD-3) that has the following structure:

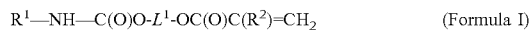
(Formula I)

wherein:
$R^1$ is a hydrocarbon group having 18 carbon atoms;
$R^2$ is H; and
$L^1$ is an alkylene group having 2 carbon atoms.

The reaction mixture above was then emulsified as follows: 200 g of the 50% solids reaction mixture in ethylacetate was added to a 1000 mL three-necked flask, fitted with a stirrer, heating mantle, thermometer, and cooler. The mixture was heated up to 70° C. and mixed until a clear solution was obtained. In a 1000-mL beaker were placed 3 g TERGITOL 15-S-30, 6 g TERGITOL TMN-6, and 3.7 g ARMOCARE VGH-70, and 400 g DI-water. This mixture was also warmed up to about 70° C. and then added under vigorous stirring to the above organic solution in the 1000-mL three-necked flask. A pre-emulsion was obtained at 70° C. This pre-emulsion was passed 3 times through a preheated 2-step Manton-Gaulin homogenizer at 300 bar pressure. Solvent was stripped off at a temperature of about 45° C. to 50° C. and vacuum of about 20-30 mm Hg. A stable dispersion at about 20% solids in water resulted. Particle size was 120-180 nm.

PCD-4

PCD-4 represents the same carbodiimide structure as PCD-1, but prepared in solvent. The carbodiimide was prepared according to U.S. Pat. No. 8,440,779 as "PCD-5", but in ethylacetate instead of MIBK. The carbodiimide was not emulsified, but used as 30% solids solution in ethylacetate.

PCD-5 $((isoBMA)_8$/isoSA)/MDI (1/4)

Polycarbodiimde PCD-5 was prepared and emulsified as per U.S. Pat. No. 8,440,779 as "PCD-5" by reacting (iso BMA)$_8$ oligomer and isostearyl alcohol with MDI followed by carbodiimidization and emulsification.

PCD-5 is referred to as $((isoBMA)_8$/isoSA)/MDI, and has the following structure:

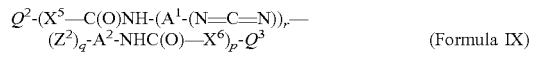
(Formula IX)

wherein:
$X^5$ and $X^6$ are each O;
$A^1$ and $A^2$ each represents the residue of an organic di-isocyanate compound (MDI);
q is 0;
p is 1;
r is 7;
$Q^2$ is represented by $—(CH_2)_a—S—U$ (Formula XI), wherein a=2 and U is an oligomer of 8 acrylate monomers having an alkyl group of 4 carbon atoms; and
$Q^3$ is a hydrocarbon group with 18 carbon atoms, more specifically an isostearyl alcohol residue.

PCD-6 $(SI-HOEA)_6$/MDI (1/4)

PCD-6 was prepared according to the procedure for PCD-3, but using 1/6 moles of 2-mercaptoethanol per mole of SI-HOEA. This material is referred to as $(SI-HOEA)_6$/MDI which is a polycarbodiimde (PCD-6) that has the following structure:

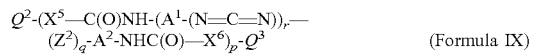
(Formula IX)

wherein:
$X^5$ and $X^6$ are each O;
$A^1$ and $A^2$ each represents the residue of an organic di-isocyanate compound (MDI);
q is 0;
p is 1;
r is 7;
$Q^2$ and $Q^3$ each represent $—(CH_2)_a—S—U$ (Formula XI), wherein a=2 and U is an oligomer of 6 acrylate monomers, which are represented by the formula:

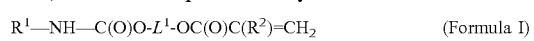
(Formula I)

wherein:
$R^1$ is a hydrocarbon group having 18 carbon atoms;
$R^2$ is H; and
$L^1$ is an alkylene group having 2 carbon atoms.

PCD-7 ISOFOL 28/MDI (1/4)

In a 500-mL round-bottomed 3-necked reaction flask fitted with a stirrer, thermometer, cooler and heating mantle were placed 49.2 g (0.12 mol) of ISOFOL 28 alcohol, 60 g ethylacetate, 120 g MDI (0.48 mol) and 0.1 g MPPO catalyst. The mixture was heated up to 90° C. for 16 hours and a slightly hazy solution resulted. An IR analysis indicated that all isocyanate groups were reacted and that carbodiimide groups were formed.

This material formed is referred to as (ISOFOL 28/MDI), which is a polycarbodiimde (PCD-7) that has the following structure

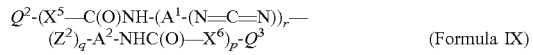
$$Q^2\text{-}(X^5\text{---}C(O)NH\text{-}(A^1\text{-}(N=C=N))_r\text{---}(Z^2)_q\text{-}A^2\text{-}NHC(O)\text{---}X^6)_p\text{-}Q^3 \qquad \text{(Formula IX)}$$

wherein:
$X^5$ and $X^6$ are each O;
$A^1$ and $A^2$ each represents the residue of an organic di-isocyanate compound (MDI);
q is 0;
p is 1;
r is 7; and
$Q^2$ and $Q^3$ each represent a hydrocarbon group having 28 carbon atoms.

PCD-8 (SI-HOEA/ODA 80/20)$_8$/MDI (1/4)

In a 3-necked flask of 500-mL fitted with a stirrer, thermometer, cooler and heating mantle were placed 82.2 g (0.2 mol) SI-HOEA monomer as prepared above, 16.2 g (0.05 mol) of ODA, 2.4 g (0.031 mol) mercaptoethanol and 20 g of ethylacetate. The mixture was warmed to 70° C. under nitrogen. Then 0.2 g VAZO-67 were added. An immediate exothermic effect was noticed resulting in an intense reflux. After 3 hours reaction at 85° C., another 0.05 g of VAZO-67 were added and the reaction continued for 16 hours at about 85° C. Then 31.2 g (0.0125 mol) MDI ware added together with 30 g EtOAc and 0.15 g MPPO catalyst. The reaction was continued for 16 hours at reflux (88° C.) while $C_{O2}$ was released. A slightly hazy solution resulted. An IR analysis indicated that all isocyanate groups were reacted and that carbodiimide groups were formed.

The material formed is referred to as (SI-HOEA/ODA 80/20)$_8$/MDI (1/4) which is a polycarbodiimde (PCD-8) that has the following structure

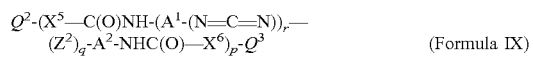
$$Q^2\text{-}(X^5\text{---}C(O)NH\text{-}(A^1\text{-}(N=C=N))_r\text{---}(Z^2)_q\text{-}A^2\text{-}NHC(O)\text{---}X^6)_p\text{-}Q^3 \qquad \text{(Formula IX)}$$

wherein:
$X^5$ and $X^6$ are each O;
$A^1$ and $A^2$ each represents the residue of an organic di-isocyanate compound (MDI);
q is 0;
p is 1;
r is 7;
$Q^2$ and $Q^3$ each represent —$(CH_2)_a$—S—U (Formula XI), wherein a=2 and U is an oligomer of 8 units derived from a mixture of acrylate monomers, which are an 80/20 blend of monomers represented by the formulas:

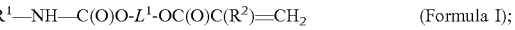
$$R^1\text{---}NH\text{---}C(O)O\text{-}L^1\text{-}OC(O)C(R^2)=CH_2 \qquad \text{(Formula I)};$$

wherein:
$R^1$ is a hydrocarbon group having 18 carbon atoms;
$L^1$ is an alkylene group with 2 carbon atoms; and
$R^2$ is H; and

$$R^1\text{---}OC(O)\text{---}C(R^2)=CH_2 \qquad \text{(Formula 0)}$$

wherein:
$R^1$ represents a hydrocarbon group having 18 carbon atoms; and
$R^2$ represents H.

Examples 1 to 15 (EX1 to EX15), Reference Examples REF1 to REF9

The water-based polymer dispersions of Examples 1 to 15, Reference Examples REF 1 to REF 9 as indicated in table 1, were applied to PES and PA fabrics according to the general procedure "Treatment Procedure via Padding Process, Water-based Dispersions" as given above. The treated samples were not ironed after tumble dry.

The treated fabrics were tested for their dynamic water repellent properties according to the "Spray Rating (SR)" test outlined above. The properties were tested initially and after 10 or 20 launderings. After the 10 or 20 washing cycles the textile samples were dried in a Miele T-356 tumble drier, setting 'Extra dry'. The samples were not ironed. The samples were conditioned overnight at room temperature before testing. The results of spray rating were indicated as SR IN (initial) and SR 10L and SR 20L respectively. The treated fabrics of Examples 12 and 13 and Reference Examples REF1 and REF9 were subjected to the Bundesmann Test as outlined above. The results are recorded in Table 2.

TABLE 1

Spray Ratings (0.6% SOF); Water-based Dispersions (PES: 76.4% WPU; PA: 74.9% WPU)

| Example | Treating Composition (Component C/Component A); (weight ratio) | PES SR IN | PA SR IN | PES SR 10L | PA SR 10L | PES SR 20L | PA SR 20L |
|---|---|---|---|---|---|---|---|
| EX1 | PCD-1/pODA; (80/20) | 100 | 100 | 100 | 100 | 100 | 100 |
| EX2 | PCD-1/pODA; (70/30) | 100 | 100 | 100 | 100 | 100 | 100 |
| EX3 | PCD-1/pODA; (65/35) | 100 | 100 | 100 | 100 | 100 | 100 |
| EX4 | PCD-1/pODA; (60/40) | 100 | 100 | 100 | 100 | 100 | 100 |
| EX5 | PCD-1/pODA; (50/50) | 90 | 100 | 100 | 100 | 100 | 100 |
| EX6 | PCD-1/pODA; (40/60) | 90 | 100 | 100 | 100 | 100 | 100 |
| EX7 | PCD-1/pODMA; (65/35) | 90 | 100 | 100 | 100 | 100 | 100 |
| EX8 | PCD-1/pBEA; (65/35) | 90 | 100 | 100 | 100 | 100 | 100 |
| EX9 | PCD-1/pBEMA; (65/35) | 90 | 100 | 100 | 100 | 85 | 100 |
| EX10 | PCD-1/pSI-HOEA; (90/10) | 95 | 100 | 100 | 100 | 100 | 100 |
| EX11 | PCD-1/pSI-HOEA; (80/20) | 100 | 100 | 100 | 100 | 100 | 100 |
| EX12 | PCD-1/pSI-HOEA; (65/35) | 100 | 100 | 100 | 100 | 100 | 100 |
| EX13 | PCD-2/pSI-HOEA; (65/35) | 100 | 100 | 100 | 100 | 100 | 100 |
| EX14 | PCD-1/pLA; (65/35) | 85 | 90 | 90 | 100 | 95 | 100 |
| EX15 | PCD-1/pIsoBMA; (65/35) | 80 | 80 | 100 | 100 | 100 | 100 |
| REF1 | PCD-1; (100/0) | 85 | 100 | 95 | 100 | 100 | 100 |
| REF2 | PCD-2; (100/0) | 85 | 100 | 95 | 100 | 100 | 100 |
| REF3 | pODA; (0/100) | 70 | 85 | 0 | 0 | 0 | 0 |

TABLE 1-continued

Spray Ratings (0.6% SOF); Water-based Dispersions
(PES: 76.4% WPU; PA: 74.9% WPU)

| Example | Treating Composition (Component C/Component A); (weight ratio) | PES SR IN | PA SR IN | PES SR 10L | PA SR 10L | PES SR 20L | PA SR 20L |
|---|---|---|---|---|---|---|---|
| REF4 | pODMA; (0/100) | 70 | 70 | 0 | 0 | 0 | 0 |
| REF5 | pBEA; (0/100) | 70 | 80 | 0 | 0 | 0 | 0 |
| REF6 | pBEMA; (0/100) | 70 | 70 | 0 | 0 | 0 | 0 |
| REF7 | pSI-HOEA; (0/100) | 100 | 100 | 85 | 70 | 85 | 50 |
| REF8 | pLA; (0/100) | 70 | 70 | 70 | 50 | 70 | 0 |
| REF9 | pIsoBMA; (0/100) | 80 | 70 | 70 | 50 | 70 | 0 |

TABLE 2

Bundesmann Test Results

| | Treating Composition | Bundesmann PES | | | | | Bundesmann PA | | | | |
|---|---|---|---|---|---|---|---|---|---|---|---|
| Ex. | (Component C/Component A); (weight ratio) | 1 min | 5 min | 10 min | % ABS | ml pen | 1 min | 5 min | 10 min | % ABS | ml pen |
| EX12 | PCD-1/pSI-HOEA; (65/35) | 3 | 3 | 2 | 12 | 3 | 5 | 5 | 4 | 12 | 24 |
| EX13 | PCD-2/pSI-HOEA; (65/35) | 5 | 4 | 3 | 10 | 2 | 4 | 4 | 4 | 14 | 29 |
| REF1 | PCD-1; (100/0) | 1 | 1 | 1 | 22 | 7 | 4 | 3 | 2 | 16 | 31 |
| REF2 | PCD-2; (100/0) | 2 | 1 | 1 | 19 | 5 | 3 | 3 | 3 | 24 | 50 |

These results clearly demonstrate that fluorine-free treating compositions comprising a polymeric compound, derived from the polymerization of at least one (meth) acrylate monomer in combination with a polycarbodiimide compound, outperform the individual compounds. The treated fibrous substrates according to the invention, comprising a mixture of component C and Component A, not only have initial high water repellency, but surprisingly also good laundering resistance after 20 laundering cycles. Moreover, they even more surprisingly provide excellent Bundesmann ratings. It was further observed that the treatment did not modify the soft feel of the fabrics.

Examples 16 to 20 (EX16 to EX20) and Reference Examples REF 10 to REF 13

The water-based polymer dispersions of Examples EX16 to EX20 and Reference Examples REF 10 to REF 13 having compositions as listed in Table 3, were applied to PES and PA fabrics according to the general procedure "Treatment Procedure via Padding Process, Water-based Dispersions" as given above.

The treated fabrics were tested for their dynamic water repellent properties according to the "Spray Rating (SR)" test outlined above. The properties were tested initially and after 10 or 20 launderings. After the 10 or 20 washing cycles the textile samples were dried in a Miele T-356 tumble drier, setting 'Extra dry' and ironed at 180° C. during 3 seconds. The samples were conditioned overnight at room temperature before testing. The results of spray rating were indicated as SR IN, SR 10L IR, and SR 20L IR, respectively. The results are recorded in Table 3.

TABLE 3

Spray Ratings (0.6% SOF); Water-based Dispersions
(PES: 76.4% WPU; PA: 74.9% WPU)

| Example | Treating Composition (Component C/Component A); (weight ratio) | PES SR IN | PA SR IN | PES SR 10L IR | PA SR 10L IR | PES SR 20L IR | PA SR 20L IR |
|---|---|---|---|---|---|---|---|
| EX16 | PCD-3/p(SI-HOEA)*; (70/30) | 100 | 100 | 90 | 90 | 90 | 90 |
| EX17 | PCD-3/p(SI-HOEA)*; (30/70) | 100 | 100 | 90 | 90 | 90 | 90 |
| EX18 | PCD-3/p(SA-AOI/AOI-MEKO 90/10)*; (70/30) | 100 | 100 | 90 | 90 | 90 | 80 |
| EX19 | PCD-3/p(SI-HOEA)/VCl2/NMAM 70/20/10)*; (70/30) | 100 | 100 | 90 | 80 | 90 | 80 |
| EX20 | PCD-3/p(SI-HOEA)/VCl2/NMAM 70/20/10)*; (30/70) | 100 | 100 | 90 | 90 | 80 | 80 |
| REF10 | PCD-3; (100/0) | 100 | 100 | 80 | 80 | 70 | 70 |
| REF11 | P(SI-HOEA)*; (0/100) | 100 | 90 | 80 | 70 | 50 | 50 |
| REF12 | p(SA-AOI/AOI-MEKO 90/10)*; (0/100) | 100 | 90 | 80 | 70 | 70 | 50 |
| REF13 | p((SI-HOEA)/VCl2/NMAM 70/20/10)*; (0/100) | 100 | 100 | 80 | 70 | 50 | 50 |

These results once more indicate that treated fibrous substrates according to the invention, comprising a mixture of Component C and Component A, not only have initial high water repellency, but surprisingly also good laundering resistance after 20 laundering cycles.

Example 21 (EX21) and Reference Examples REF14 and REF15

In example 21 and Reference Examples REF 14 and REF 15, fibrous substrates were treated with solvent based treating compositions as listed in Table 4. The fabrics were treated according to the general procedure "Treatment Procedure via Padding Process, Solutions in Solvent" given above.

The dynamic water repellency properties of the treated fabrics were tested according to the general procedure for spray rating test as given above. The treated fabrics were not subjected to launderings. Only the initial spray rating values were determined (recorded as SR IN). The results are recorded in Table 4.

TABLE 4

Spray Ratings (0.6% SOF); Solvent-based Dispersions

| Example | Treating Composition (Component C/Component A); (weight ratio) | PES SR IN | PA SR IN |
|---|---|---|---|
| EX21 | PCD-4/pODA (50/50) | 80 | 100 |
| REF14 | PCD-4(100/0) | 70 | 70 |
| REF15 | pODA (0/100) | 50 | 80 |

The results demonstrate that the same good performance can be obtained when the fibrous substrates (e.g., fabrics) are treated with a solvent based treating composition according to the invention.

Examples 22 and 23

The water based polymer dispersions of Examples 22 and 23 were applied to PES and PA fabrics according to the general procedure "Treatment Procedure via Padding Process, Water-based Dispersions" as given above.

The treated PES and PA fabrics were tested for their dynamic water repellent properties according to the "Spray Rating (SR)" test outlined above. The properties were tested initially (IN SR) and after 10 or 20 launderings. After the 10 or 20 washing cycles the textile samples were dried in a Miele T-356 tumble drier, setting 'Extra dry,' and ironed at 180° C. during 3 seconds. The samples were conditioned overnight at room temperature before testing. The results of spray rating were indicated in Table 5 as SR IN, SR 10L IR, and SR 20L IR, respectively.

TABLE 5

Results of Spray Rating

| Example | Treating Composition (Component B/Component A weight ratio) | PES SR IN | PA SR IN | PES SR 10L IR | PA SR 10L IR | PES SR 20L IR | PA SR 20L IR |
|---|---|---|---|---|---|---|---|
| EX22 | (SA-AOI)$_{12}$/SA/PAPI/MEKO (0.6/0.6/3/1.8)/p(SA-AOI/AOI-MEKO)* (70/30) | 100 | 100 | 90 | 90 | 90 | 90 |
| EX23 | (SA-AOI)$_{12}$/SA/PAPI/MEKO (0.6/0.6/3/1.8)/p(SA-AOI/AOI-MEKO)* (30/70) | 100 | 100 | 90 | 80 | 80 | 80 |
| REF16 | p(SA-AOI/AOI-MEKO 90/10)* (0/100) | 100 | 90 | 80 | 70 | 70 | 50 |

These results clearly demonstrate that fluorine-free treating compositions comprising a polymeric compound (according to Component A), derived from the polymerization of at least one (meth)acrylate monomer in combination with a compound (according to Component B) derived from an isocyanate-reactive oligomer, a polyisocyanate and an isocyanate blocking agent, outperform the individual compounds. Furthermore, such treated fibrous substrates not only have initial high water repellency, but surprisingly also good laundering resistance after 20 laundering cycles. In addition, it was observed that the soft feel of the fabric was not negatively affected by the treatment.

Examples 24 to 35 (EX24 to EX35)

The water-based polymer dispersions of Examples EX24 to EX35 having compositions as listed in Table 6, were applied to PES and PA fabrics according to the general procedure "Treatment Procedure via Padding Process, Water-based Dispersions" as given above. The treated PES and PA fabrics were dried/cured in an oven at 175° C. during 2 min. Prior to testing, the treated samples were conditioned overnight at room temperature The treated PES and PA fabrics were tested for their dynamic water repellent properties according to the "Spray Rating (SR)" test outlined above. The properties were tested initially and after 10 launderings. After the 10 washing cycles the textile samples were dried in a Miele T-356 tumble drier, setting 'Extra dry'. The samples were not ironed. The samples were conditioned overnight at room temperature before testing. The results of spray rating were indicated as SR IN and SR 10L TD, respectively. The results are recorded in Table 6.

TABLE 6

Spray Ratings (1% SOF); Water-based Dispersions
(PES: 89.25% WPU; PA: 69.79% WPU)

| Example | Treating Composition (Component B/Component A); (weight ratio) | PES SR IN | PES SR 10L TD | PA SR IN | PA SR10L TD |
|---|---|---|---|---|---|
| EX24 | (isoBMA)$_8$/SA/PAPI/MEKO (0.6/0.6/3/1.8)/p(SI-HOEA); (40/60) | 80 | 80 | 100 | 90 |
| EX25 | (ODA)$_4$/SA/PAPI/MEKO (0.6/0.6/3/1.8)/p(SI-HOEA); (40/60) | 100 | 100 | 90 | 100 |
| EX26 | (SI-HOEA)$_8$/PAPI (1/1)/p(SI-HOEA); (40/60) | 100 | 70 | 100 | 80 |
| EX27 | (SI-HOEA)6/N100/MEKO (0.6/0.6/3/1.8)/p(SI-HOEA); (40/60) | 100 | 90 | 100 | 90 |
| EX28 | (SI-HOEA)$_6$/SA/PAPI/MEKO (0.6/0.6/3/1.8)/p(isoBMA); (40/60) | 70 | 80 | 80 | 90 |
| EX29 | (SI-HOEA)$_6$/SA/PAPI/MEKO (0.6/0.6/3/1.8)/p(ODA); (40/60) | 100 | 100 | 100 | 100 |
| EX30 | (SI-HOEA)$_6$/SA/PAPI/MEKO (0.6/0.6/3/1.8)/p(IUSOFOL 32A); (40/60) | 100 | 90 | 100 | 100 |
| EX31 | (SI-HOEA)$_6$/SA/PAPI/MEKO (0.6/0.6/3/1.8)/p(ODA/GMA 90/10); (40/60) | 100 | 100 | 100 | 100 |
| EX32 | (SI-HOEA)$_6$/SA/PAPI/MEKO (0.6/0.6/3/1.8)/p(SI-HOEA); (90/10) | 100 | 90 | 100 | 100 |
| EX33 | (SI-HOEA)$_6$/SA/PAPI/MEKO (0.6/0.6/3/1.8)/p(SI-HOEA); (60/40) | 100 | 100 | 100 | 100 |
| EX34 | (SI-HOEA)$_6$/SA/PAPI/MEKO (0.6/0.6/3/1.8)/p(SI-HOEA); (40/60) | 100 | 100 | 100 | 100 |
| EX35 | (SI-HOEA)$_6$/SA/PAPI/MEKO (0.6/0.6/3/1.8)/p(SI-HOEA); (10/90) | 100 | 100 | 100 | 100 |

These results again demonstrate that fluorine-free treating compositions comprising a polymeric compound (according to Component A), derived from the polymerization of at least one (meth)acrylate monomer in combination with a compound (according to Component B) derived from an isocyanate-reactive oligomer, a polyisocyanate and an isocyanate blocking agent provide high water repellency, not only initially, but also after several laundering cycles. In addition, also for these compositions it was observed that the soft feel of the fabric was not negatively affected by the treatment.

Examples 36 to 48 (EX36 to EX48)

Water-based polymer dispersions of Examples EX36 to EX48 having compositions as listed in Table 7, were applied to PES and PA fabrics according to the general procedure "Treatment Procedure via Padding Process, Water-based Dispersions" as given above. The treated PES and PA fabrics were dried/cured in an oven at 175° C. during 2 min. Prior to testing, the treated samples were conditioned overnight at room temperature The treated PES and PA fabrics were tested for their dynamic water repellent properties according to the "Spray Rating (SR)" test outlined above. The properties were tested initially and after 10 launderings. After the 10 washing cycles the textile samples were dried in a Miele T-356 tumble drier, setting 'Extra dry'. The samples were not ironed. The samples were conditioned overnight at room temperature before testing. The results of spray rating were indicated as SR IN and SR 10L TD, respectively. The results are recorded in Table 7.

TABLE 7

Spray Ratings (1% SOF); Water-based Dispersions
(PES: 89.25% WPU; PA: 69.79% WPU)

| Example | Treating Composition (Component C/Component A); (weight ratio) | PES SR IN | PES SR 10L TD | PA SR IN | PA SR10L TD |
|---|---|---|---|---|---|
| EX36 | PCD-5/p(SI-HOEA); (40/60) | 80 | 80 | 100 | 90 |
| EX37 | PCD-1/p(SI-HOEA); (40/60) | 100 | 100 | 100 | 100 |
| EX38 | PCD-7/p(SI-HOEA); (40/60) | 100 | 100 | 100 | 100 |
| EX39 | PCD-8/p(SI-HOEA); (40/60) | 80 | 70 | 100 | 90 |
| EX40 | PCD-6/p(isoBMA); (60/40) | 70 | 70 | 85 | 90 |
| EX41 | PCD-6/p(ODA); (60/40) | 100 | 100 | 100 | 100 |
| EX42 | PCD-6/p(ISOFOL 32A); (60/40) | 100 | 90 | 100 | 100 |
| EX43 | PCD-6/p(ODA/GMA 90/10); (60/40) | 80 | 80 | 100 | 100 |
| EX44 | PCD-7/p(SI-HOEA); (60/40) | 100 | 100 | 100 | 100 |
| EX45 | PCD-6/p(SI-HOEA); (10/90) | 100 | 70 | 100 | 80 |
| EX46 | PCD-6/p(SI-HOEA); (40/60) | 100 | 90 | 100 | 90 |
| EX47 | PCD-6/p(SI-HOEA); (60/40) | 100 | 100 | 100 | 100 |
| EX48 | PCD-6/p(SI-HOEA); (90/10) | 100 | 100 | 100 | 100 |

These results again demonstrate that fluorine-free treating compositions comprising a polymeric compound (according to Component A), derived from the polymerization of at least one (meth)acrylate monomer in combination with a compound (according to Component B) derived from an isocyanate-reactive oligomer, a polyisocyanate and an isocyanate blocking agent, in combination with a carbodiimide compound (according to Component C) provide high water repellency to fibrous substrates (e.g., fabrics), not only initially, but also after several laundering cycles.

Examples 49 and 50 (EX49 and EX50)

Water-based polymer dispersions of Examples EX49 and EX50 having compositions as listed in Table 8, were applied to PES and PA fabrics according to the general procedure "Treatment Procedure via Padding Process, Water-based Dispersions" as given above. The treated PES and PA fabrics were dried/cured in an oven at 175° C. during 2 min. Prior to testing, the treated samples were conditioned overnight at room temperature The treated PES and PA fabrics were tested for their dynamic water repellent properties according to the "Spray Rating (SR)" test outlined above. The properties were tested initially and after 10 launderings. After the 10 washing cycles the textile samples were dried in a Miele T-356 tumble drier, setting 'Extra dry'. The samples were not ironed. The samples were conditioned overnight at room temperature before testing. The results of spray rating were indicated as SR IN and SR 10L TD, respectively. The results are recorded in Table 8.

TABLE 8

Spray Ratings (1% SOF); Water-based Dispersions (PES: 89.25% WPU; PA: 69.79% WPU)

| Example | Treating Composition (Component C/Component B/ Component A); (weight ratio) | PES SR IN | PES SR 10L TD | PA SR IN | PA SR10L TD |
|---|---|---|---|---|---|
| EX49 | PCD-6/(SI-HOEA)$_6$/SA/PAPI/MEKO (0.6/0.6/3/1.8)/p(SI-HOEA); (40/30/30) | 100 | 100 | 100 | 100 |
| EX50 | PCD-1/(ODA)$_4$/SA/PAPI/MEKO (0.6/0.6/3/1.8)/p(SI-HOEA); (40/30/30) | 100 | 100 | 100 | 100 |

These results demonstrate that fluorine-free treating compositions comprising a polymeric compound (according to Component A), derived from the polymerization of at least one (meth)acrylate monomer in combination with a carbodiimide compound (according to Component C) provide high water repellency to fibrous substrates (e.g., fabrics), not only initially, but also after several laundering cycles. In addition, it was observed that the soft feel of the fibrous substrates (e.g., fabrics) was not negatively affected by the treatment.

Examples 51 to 54 (EX51 to EX54) and Reference Examples REF18 and REF19

The water-based polymer dispersions of Examples EX51 to EX54 and Reference Examples REF 18 to REF21 having compositions as listed in Table 9, were applied to PES and PA fabrics according to the general procedure "Treatment Procedure via Padding Process, Water-based Dispersions" as given above.

The treated fabrics were tested for their dynamic water repellent properties according to the "Spray Rating (SR)" test outlined above. The properties were tested initially and after 10 or 20 launderings. After the 10 or 20 washing cycles the textile samples were dried in a Miele T-356 tumble drier, setting 'Extra dry' and ironed at 180° C. during 3 seconds. The samples were conditioned overnight at room temperature before testing. The results of spray rating were indicated as SR IN, SR 10L IR, and SR 20L IR, respectively. The results are recorded in Table 9.

TABLE 9

Spray Ratings (1% SOF); Water-based Dispersions (PES: 76.4% WPU; PA: 74.9% WPU)

| Example | Treating Composition (Component B/Component A); (weight ratio) | PES SR IN | PA SR IN | PES SR 10L IR | PA SR 10L IR | PES SR 20L IR | PA SR 20L IR |
|---|---|---|---|---|---|---|---|
| EX51 | UNILIN 350/SA/PAPI/MEKO (0.6/0.6/3/1.8)/p(SI-HOEA); (40/60) | 100 | 100 | 90 | 90 | 90 | 90 |

TABLE 9-continued

Spray Ratings (1% SOF); Water-based Dispersions
(PES: 76.4% WPU; PA: 74.9% WPU)

| Example | Treating Composition (Component B/Component A); (weight ratio) | PES SR IN | PA SR IN | PES SR 10L IR | PA SR 10L IR | PES SR 20L IR | PA SR 20L IR |
|---|---|---|---|---|---|---|---|
| EX52 | ISOFOL 36/PAPI(1/1)/p(SI-HOEA); (40/60) | 100 | 100 | 80 | 90 | 80 | 80 |
| EX53 | SA₃-citric acid/SA/PAPI/MEKO (0.6/0.6/3/1.8)/p(SI-HOEA); (40/60) | 100 | 100 | 90 | 90 | 90 | 90 |
| EX54 | Sorbitan tristearate/SA/PAPI/MEKO (0.6/0.6/3/1.8)/p(SI-HOEA); (40/60) | 100 | 100 | 80 | 100 | 80 | 90 |
| REF18 | p(SI-HOEA); (0/100) | 100 | 100 | 70 | 50 | 0 | 0 |
| REF19 | Sorbitan tristearate/SA/PAPI/MEKO (0.6/0.6/3/1.8); (100/0) | 80 | 90 | 50 | 70 | 50 | 50 |

These results indicate that fibrous substrates according to the invention, treated with a composition comprising a mixture of Component B, comprising a component derived from an alcohol having three linear hydrocarbon groups having 17 or 18 carbon atoms and optionally one or more ester groups and Component A, not only have initial high water repellency, but surprisingly also good laundering resistance after 20 laundering cycles compared to reference examples REF 18 and REF 19

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method of treating a fibrous substrate in an amount sufficient to make the fibrous substrate water repellent, the method comprising applying to the fibrous substrate a fluorine-free treating composition comprising:
   Component (A) comprising one or more polymeric compounds derived from the polymerization of at least one (meth)acrylate monomer comprising at least one hydrocarbon group having from 1 to 60 carbon atoms and at least one isocyanate-derived group; and
   Component (B), wherein:
   Component (B) comprises one or more compounds derived from reaction, in one or more steps, of components comprising:
   (i) at least one isocyanate-reactive oligomer comprising 2 to 20 repeating units, or an alcohol having at least one linear or branched hydrocarbon group having from 16 to 40 carbon atoms and optionally one or more ester groups;
   (ii) at least one polyisocyanate;
   (iii) optionally at least one additional isocyanate-reactive compound; and
   (iv) optionally at least one isocyanate blocking agent;
   wherein the isocyanate-reactive oligomer is made by the radical-initiated reaction of at least one (meth)acrylate monomer, in the presence of at least one mercaptan, comprises at least one hydrocarbon group having from 1 to 60 carbon atoms and at least one isocyanate-derived group.

2. The method of claim 1, wherein the fluorine-free treating composition comprises:
   from 1 wt-% to 99 wt-% of Component A, based on the total weight of Component A and Component B; and
   from 1 wt-% to 99 wt-% of Component B, based on the total weight of Component A and Component B.

3. The method of claim 1, wherein the one or more polymeric compounds of Component A are derived from the polymerization of at least one (meth)acrylate monomer having at least one of the following formulas:

$$R^1\text{—OC(O)—C}(R^2)\text{=CH}_2 \quad \text{(Formula 0)}$$

$$R^1\text{—NH—C(O)O-}L^1\text{-OC(O)C}(R^2)\text{=CH}_2 \quad \text{(Formula I);}$$

$$R^3\text{-}X^1\text{-C(O)NH-}L^2\text{-OC(O)C}(R^4)\text{=CH}_2 \quad \text{(Formula II); and}$$

$$R^5\text{-}X^2\text{-C(O)NH-}Q\text{-NHC(O)O-}L^3\text{-OC(O)C}(R^6)\text{=CH}_2 \quad \text{(Formula III);}$$

wherein:
$R^1$, $R^3$, and $R^5$ are independently a hydrocarbon group having from 1 to 60 carbon atoms;
$R^2$, $R^4$, and $R^6$ are independently H or $CH_3$;
$L^1$, $L^2$, and $L^3$ are independently a branched or straight chain alkylene group having 2 to 10 carbon atoms, an arylene group, or a combination thereof;
$X^1$ and $X^2$ are independently O, S, —NH, or —N($R^7$), wherein $R^7$ is a hydrocarbon group having 1 to 20 carbon atoms; and
Q is an isocyanate residue.

4. The method of claim 1, wherein the one or more polymeric compounds of Component A additionally include units derived from a (meth)acrylate monomer with one or more functional groups capable of undergoing additional reactions.

5. The method of claim 1, wherein the one or more compounds of Component B comprises a blocked isocyanate group.

6. The method of claim 1, wherein the (meth)acrylate monomer for making the isocyanate-reactive oligomer used in making the one or more compounds of Component B has at least one of the following formulas:

$$R^1\text{—OC(O)—C}(R^2)\text{=CH}_2 \quad \text{(Formula 0)}$$

$$R^1\text{—NH—C(O)O-}L^1\text{-OC(O)C}(R^2)\text{=CH}_2 \quad \text{(Formula I)}$$

$$R^3\text{-}X^1\text{-C(O)NH-}L^2\text{-OC(O)C}(R^4)\text{=CH}_2 \quad \text{(Formula II); or}$$

$$R^5\text{-}X^2\text{-C(O)NH-}Q\text{-NH—C(O)O-}L^3\text{-OC(O)C}(R^6)\text{=CH}_2 \quad \text{(Formula III);}$$

wherein:
- $R^1$, $R^3$, and $R^5$ are independently a hydrocarbon group having from 1 to 60 carbon atoms;
- $R^2$, $R^4$, and $R^6$ are independently H or $CH_3$;
- $L^1$, $L^2$, and $L^3$ are independently a branched or straight chain alkylene group having 2 to 10 carbon atoms, an arylene group (in some embodiments, an arylene group having 5 to 12 carbon atoms), or a combination thereof;
- $X^1$ and $X^2$ are independently O, S, —NH, or —N($R^7$), wherein $R^7$ is a hydrocarbon group having 1 to 20 carbon atoms; and
- Q is a divalent isocyanate residue.

7. The method of claim 1, wherein the isocyanate-reactive oligomer for making the one or more compounds of Component B is made by the oligomerization of a (meth)acrylate monomer in the presence of a mercaptan, wherein the molar ratio of the mercaptan to the (meth)acrylate is 1:4 to 1:20.

8. The method of claim 1, wherein the (meth)acrylate monomer used in the preparation of the compounds of Components A and/or B comprises at least one hydrocarbon group having from 12 to 60 carbon atoms.

9. A fibrous substrate treated by the method of claim 1.

10. The fibrous substrate of claim 9, which is selected from the group of textile, leather, carpet, paper, and nonwoven fabrics.

* * * * *